United States Patent
Chandhoke et al.

(10) Patent No.: US 7,849,416 B2
(45) Date of Patent: Dec. 7, 2010

(54) SYSTEM AND METHOD FOR GRAPHICALLY CREATING A SEQUENCE OF MOTION CONTROL, MACHINE VISION, AND DATA ACQUISITION (DAQ) OPERATIONS

(75) Inventors: Sundeep Chandhoke, Austin, TX (US); Nicolas Vazquez, Austin, TX (US); David W Fuller, Austin, TX (US); Christopher Cifra, Austin, TX (US)

(73) Assignee: National Instruments Corporation, Austin, TX (US)

( * ) Notice: Subject to any disclaimer, the term of this patent is extended or adjusted under 35 U.S.C. 154(b) by 2164 days.

(21) Appl. No.: 10/051,442

(22) Filed: Jan. 18, 2002

(65) Prior Publication Data

US 2002/0126151 A1    Sep. 12, 2002

Related U.S. Application Data

(63) Continuation-in-part of application No. 09/595,003, filed on Jun. 13, 2000.

(51) Int. Cl.
G06F 3/048 (2006.01)
(52) U.S. Cl. .................. 715/771; 715/704; 715/763
(58) Field of Classification Search ............... 715/771, 715/704, 763
See application file for complete search history.

(56) References Cited

U.S. PATENT DOCUMENTS

| | | | |
|---|---|---|---|
| 5,481,712 A | | 1/1996 | Silver et al. |
| 5,481,741 A | | 1/1996 | McKaskle et al. |
| 5,911,070 A | | 6/1999 | Solton et al. |
| 5,940,296 A | * | 8/1999 | Meyer .................. 700/83 |
| 5,977,992 A | * | 11/1999 | Branscomb ............. 345/530 |
| 6,226,783 B1 | * | 5/2001 | Limondin et al. ......... 717/104 |
| 6,298,474 B1 | * | 10/2001 | Blowers et al. ........... 717/104 |
| 6,442,442 B1 | * | 8/2002 | Weinhofer ............... 700/86 |
| 6,522,346 B1 | * | 2/2003 | Meyer .................. 715/771 |
| 6,545,663 B1 | * | 4/2003 | Arbter et al. ............ 345/158 |
| 6,763,515 B1 | * | 7/2004 | Vazquez et al. .......... 717/109 |
| 6,801,850 B1 | * | 10/2004 | Wolfson ................ 701/209 |

OTHER PUBLICATIONS

US 6,094,526, Marrion et al. (withdrawn).
Optilab Image Processing and Analysis Software for the Apple Macintosh™ II, User's Manual, dated 1990.

(Continued)

*Primary Examiner*—Sara England
(74) *Attorney, Agent, or Firm*—Meyertons Hood Kivlin Kowert & Goetzel, P.C.; Jeffrey C. Hood; Jason L. Burgess

(57) ABSTRACT

A system and method for developing a prototype that comprises a sequence of motion control, machine vision, and/or data acquisition (DAQ) "MC/MV/DAQ" operations. A MC/MV/DAQ prototyping environment may be designed to enable a user to easily and efficiently develop/prototype a MC/MV/DAQ sequence (i.e., a sequence of operations which includes one or more motion control, machine vision, and/or DAQ operations) without requiring the user to perform programming, e.g., without needing to write or construct code in any programming language. For example, the environment may provide a graphical user interface (GUI) enabling the user to develop/prototype the MC/MV/DAQ sequence at a high level, by selecting from and configuring a sequence of MC/MV/DAQ operations using the GUI.

65 Claims, 28 Drawing Sheets

OTHER PUBLICATIONS

MacUser, John Rizzo, Image Analyst and Enhance, Jul. 1990, pp. 55-58.

SPIE—The International Society for Optical Engineering, Steven Rosenthal and Larry Stahlberg, "Integrated Approach to Machine Vision Application Development", vol. 1386, Nov. 8, 1990, pp. 158-162.

Automatix News Release, www.applefritter.com/macclones/automatix/newsrelease, Vision for Process Feedback and Control, Jul. 3, 2000, pp. 1-3.

IPLab, Serious Image Processing for the Macintosh II, 1990.

SPIE—The International Society for Optical Engineering, Michael S. Mort and Robert J. Fontana, "Low Cost Image Analysis Workstation Which is Menu Driven and Extensible," vol. 1232, Feb. 4, 1990, pp. 380-389.

IPLab™, User's Guide, Signal Analytics Corporation, 1991.

MacGuide Magazine, vol. 2, Issue 4, Stuart Gitlow, M.D., "X-Ray Vision," Jun. 1989, pp. 89-94.

Ric Ford, Optimage Processes Scientific Images, 1994.

Signal Analytics Corp., News Release, "Signal Analytics Brings Powerful Scientific Image Processing to the Macintosh II", Feb. 1, 1990 (2 pgs.).

Advanced Imaging, Special Report: Imaging and the Macintosh/Robust Image Databases, Apr. 1991, pp. 18-32.

IPLab, "Serious Scientific Image Processing for the Macintosh II", 1992 (4 pgs.).

IPLab, "Gives You Unparalleled Value", 1992, (6 pgs.).

Signal Analytics Corp., "IPLab Brings Affordable Scientific Image Processing to the Macintosh II", estimated 1990 (2 pgs.).

Automatix Inc., "A Seminar on Machine Vision & Image Analysis", 1993, (46 pgs.).

National Instruments, Measurement and Automation Catalogue, Interactive Vision Software, 1999, pp. 518-520.

MacUser, "Ultimage and IPLab Spectrum", Jul. 1991, (5 pgs.).

"IMAQ Vision Builder Tutorial," National Instruments , Jan. 1999.

SILMA Products—CimStation Robotics from Internet site "www.adept.com/Silma/products/pd-cimstationrobo.html," May 24, 2001, 4 pages.

SILMA Products—Production Pilot from Internet site "www.adept.com/Silma/products/pd-productionpilot.html," May 24, 2001, 4 pages.

Newtonium, RoboWorks from Internet site www.newtonium.com/public_html/Products/RoboWorks/RoboWorks.htm, Mar. 30, 2002, 3 pages.

National Instruments "The Measurement and Automation Catalog 2002" pp. 97 and 580-594.

Computor "Motion Builder Start-Up Guide& Tutorial" Oct. 1996, 91 pages.

Computor Motion Architect User Guide, Aug. 1994, 23 pages.

GE Fanuc Automation "Software Solutions" 2002, 8 pages.

GE Industrial Systems CIMPLICITY Machine Edition—Motion Developer, Drawings, Dec. 6, 2001, 4 pages.

GE Fanuc Automation CIMPLICITY Machine Edition, © 2000, 4 pages.

Servo Catalogue "Motion Builder: Making Motion Control Programming Easy", undated, pp. 86-87.

GE Industrial Systems CIMPLICITY Machine Edition—Motion Developer, Product Information, 2002, 2 pages.

The Measurement and Automation Catalog 2001; National Instruments Corporation; pp. 52-85, 109, 244-267, 306-340, 644-666, and 690-700.

* cited by examiner

SYSTEM AND METHOD FOR GRAPHICALLY CREATING A SEQUENCE OF MOTION CONTROL, MACHINE VISION, AND DATA ACQUISITION (DAQ) OPERATIONS

CONTINUATION DATA

This application is a continuation-in-part of U.S. patent application Ser. No. 09/595,003 titled "System and Method for Automatically Generating a Graphical Program to Implement a Prototype," filed Jun. 13, 2000, whose inventors were Nicolas Vazquez, Jeffrey L. Kodosky, Ram Kudukoli, Kevin L. Schultz, Dinesh Nair, and Christophe Caltagirone.

FIELD OF THE INVENTION

The present invention relates to the field of computer-based motion control, computer-based machine vision, and computer-based data acquisition (DAQ). In particular, the invention relates to a system and method for graphically creating a sequence of motion control, machine vision, and data acquisition operations without requiring user programming.

DESCRIPTION OF THE RELATED ART

Computer-based motion control involves precisely controlling the movement of a device or system. Computer-based motion control is widely used in many different types of applications, including applications in the fields of industrial automation, process control, test and measurement automation, robotics, and integrated machine vision, among others. A typical computer-based motion system includes components such as the moving mechanical device(s), a motor with feedback and motion I/O, a motor drive unit, a motion controller, and software to interact with the motion controller.

The motor is commonly a stepper motor or a servo motor. Stepper motors are discrete motion devices that move to positions that relate directly to the number of input control pulses, at a velocity that relates directly to the pulse rate. Servo motors are continuous motion devices that use feedback signals to provide position and velocity control in a closed-loop environment. Motors typically have many wire coils oriented in specific magnetic positions within their housing. By pulsing or steadily controlling current through different motor coils in a known pattern, electromagnetic fields develop in the motor, causing incremental or continuous motion.

The motion controller is often a motion control plug-in board that is connected to an expansion slot or bus of a computer system. The motion controller generates control signals to control the motor and may have various processing components, such as a CPU and/or DSP, for performing tasks related to the motion control. A motor drive is typically located between the motion controller and the motor. Motor drive power devices convert the control signals generated by the motion controller into power signals that are provided to the motor connected to the drive.

Motion control application development typically has a steep learning curve. A user needs to have specialized knowledge of motion control motors, drives, and controllers. Programming a motion controller requires the user to be familiar with motion control terms and driver application programming interface (API). This can be very daunting, especially for users who are new to the world of motion control. Thus, it would be desirable to provide a system and method enabling users to develop motion control applications more easily.

In particular, it would be desirable to enable a user to easily and efficiently develop/prototype a motion control (or motion control plus other instrumentation technology) application without requiring the user to perform programming, e.g., without needing to write or construct code in any programming language. For example, it would be desirable to provide a system which includes a graphical user interface (GUI) enabling the user to develop/prototype the motion control application at a high level, by selecting from and configuring a sequence of motion control operations using the GUI.

Motion control applications often involve other types of instrumentation technologies in addition to motion control, e.g., to implement a test and measurement, industrial automation, process control, or other type of application. In particular, applications that utilize motion control often incorporate data acquisition (DAQ) functionality as well, e.g., to acquire and analyze data. As one example, DAQ functionality may be used to acquire test data for a product on an assembly line. The test data may then be analyzed for quality control purposes, and motion control functionality may be used to place the product in an appropriate bin based on the results of the analysis.

Machine vision is another technology often used in conjunction with motion control. As one example, motion control functionality may be utilized to move products through a pre-determined path, and machine vision functionality may be used to acquire images of the products at various points throughout the path. The images may then be analyzed, e.g., to ensure that the products are labeled appropriately, are free from scratches and other defects, etc.

Since machine vision and DAQ technologies are so often used together with motion control technology, it would be desirable to enable a user to easily and efficiently develop/prototype an application that uses all of these technologies.

SUMMARY OF THE INVENTION

One embodiment of the invention comprises a system and method for developing a prototype that comprises a sequence of motion control, machine vision, and/or data acquisition (DAQ) operations. The abbreviation "MC/MV/DAQ" is used herein to refer to "motion control/machine vision/DAQ". Various embodiments of a MC/MV/DAQ prototyping environment application are described herein. The MC/MV/DAQ prototyping environment may be designed to enable a user to easily and efficiently develop/prototype a MC/MV/DAQ sequence (i.e., a sequence of operations which includes one or more motion control, machine vision, and/or DAQ operations) without requiring the user to perform programming, e.g., without needing to write or construct code in any programming language. For example, the environment may provide a graphical user interface (GUI) enabling the user to develop/prototype the MC/MV/DAQ sequence at a high level, by selecting from and configuring a sequence of MC/MV/DAQ operations using the GUI.

According to one embodiment of the method, a graphical user interface of the MC/MV/DAQ prototyping environment may be displayed, wherein the graphical user interface provides graphical access to a set of operations. The set of operations may include one or more operations related to motion control, one or more operations related to machine vision (or image analysis), one or more operations related to DAQ, and possibly other types of operations as well.

In various embodiments, any of various types of motion control operations may be provided. For example, the set of operations may include operations such as: a reference operation (to establish home and index), a straight-line move operation, an arc move operation, a contoured move operation, a gearing operation, etc.

Any of various types of DAQ operations may also be provided. For example, the DAQ operations may include operations related to digital I/O, analog input, analog output, signal conditioning, calibration and configuration (e.g., to calibrate and configure specific devices), counting operations, etc.

Any of various types of machine vision or image analysis operations may also be provided. Exemplary functions related to machine vision and image analysis include:

filtering functions for smoothing, edge detection, convolution, etc.

morphology functions for modifying the shape of objects in an image, including erosion, dilation, opening, closing, etc.

thresholding functions for selecting ranges of pixel values in grayscale and color images particle filtering functions to filter objects based on shape measurements a histogram function that counts the total number of pixels in each grayscale value and graphs it a line profile function that returns the grayscale values of the pixels along a line drawn through the image with a line tool and graphs the values particle analysis functions that computes such measurements on objects in an image as their areas and perimeters a 3D view function that displays an image using an isometric view in which each pixel from the image source is represented as a column of pixels in the 3D view, where the pixel value corresponds to the altitude.

an edge detection function that finds edges along a line drawn through the image with a line tool a pattern matching function that locates regions of a grayscale image that match a predetermined template a shape matching function that searches for the presence of a shape in a binary image and specifies the location of each matching shape a caliper function that computes measurements such as distances, areas, and angles based on results returned from other image processing functions a color matching function that quantifies which colors and how much of each color exist in a region of an image and uses this information to check if another image contains the same colors in the same ratio User input to the graphical user interface may be received, wherein the user input specifies a desired sequence of the MC/MV/DAQ operations. For each operation added to the MC/MV/DAQ sequence, the user may configure or customize the operation, e.g., by interacting with a graphical panel or dialog. In the preferred embodiment, the user is not required to specify or write any program source code to implement the MC/MV/DAQ sequence. Instead, the MC/MV/DAQ sequence may be specified graphically by interacting with the graphical user interface of the MC/MV/DAQ prototyping environment.

The MC/MV/DAQ prototyping environment may also enable the user to preview various aspects of any motion control performed by the sequence, e.g., velocity profile, acceleration profile, position plots, etc., in advance before commanding the motor to perform the sequence. The environment may also enable simulation of the motion control, thus enabling users to perform offline development and prototyping.

The specified sequence of MC/MV/DAQ operations may then be performed. Performing the sequence of MC/MV/DAQ operations may comprise performing each operation in the sequence. For example, for the motion control operations in the sequence, the computer system may interface with one or more motors (or motion controllers) to command the motors (or motion controllers) to perform the motion control operations configured by the user. Most motion control operations in the sequence may cause a motion control device coupled to the computer system to perform a movement, such as a straight-line movement, arc movement, contoured movement, etc. Other operations may relate to the motion control performed by the sequence, but may not actually cause the motion control device to perform a movement, such as a reference operation, gearing operation, etc.

For the DAQ operations in the sequence, the computer system may interface with a DAQ device coupled to the computer system to perform the DAQ operations configured by the user. For example, a DAQ operation may command the DAQ device to acquire data from an analog input channel or may cause signal conditioning to be performed on such data.

For the machine vision operations in the sequence, the computer system may interface with an image acquisition device coupled to the computer system to acquire images as configured by the user. Also, the machine vision operations may cause the computer system to analyze such acquired images.

In one embodiment, each operation in the MC/MV/DAQ sequence may be performed sequentially. In another embodiment, the user may specify conditional branches which may result in some steps being skipped or performed in different orders, e.g., depending on results of performing previous steps.

In one embodiment, the MC/MV/DAQ prototyping environment application may also be operable to automatically, i.e., programmatically, generate program code implementing the MC/MV/DAQ sequence. For example, the environment may generate a standalone program, such as a graphical program or a text-based program, operable to perform the MC/MV/DAQ sequence. When executed, the generated program code may have the same functionality as when the MC/MV/DAQ sequence is executed under control of the MC/MV/DAQ prototyping environment. The user may also modify the generated program code as desired, e.g., to develop a customized or optimized MC/MV/DAQ application.

In another embodiment, the MC/MV/DAQ sequence may be developed in the MC/MV/DAQ prototyping environment and may then be performed from a separate application development environment (ADE). In this embodiment, the sequence may be executed under control of the ADE, but a separate program implementing the sequence may not be generated, or code implementing the sequence may be generated, but the code may not be persistently saved and presented to the user as a standalone program. For example, the user may not want to see the program code generated for the sequence, but may still want to execute the sequence from the ADE. In one embodiment, the MC/MV/DAQ prototyping environment may provide an application programming interface (API) which enables a caller program to invoke execution of a particular MC/MV/DAQ sequence by the MC/MV/DAQ prototyping environment.

In another embodiment, the MC/MV/DAQ prototyping environment application may be operable to programmatically configure one or more embedded devices to perform the MC/MV/DAQ sequence. For example, configurable hardware of the embedded device(s) may be configured to perform the MC/MV/DAQ operations included in the sequence. The configurable hardware may include any type of configurable logic or programmable hardware, such as FPGA hardware. In one embodiment, program code may first be programmatically generated based on the sequence, and this program code may then be converted to a format that can be used to program the embedded device hardware.

BRIEF DESCRIPTION OF THE DRAWINGS

A better understanding of the present invention can be obtained when the following detailed description of the preferred embodiment is considered in conjunction with the following drawings, in which.

Figure 1:
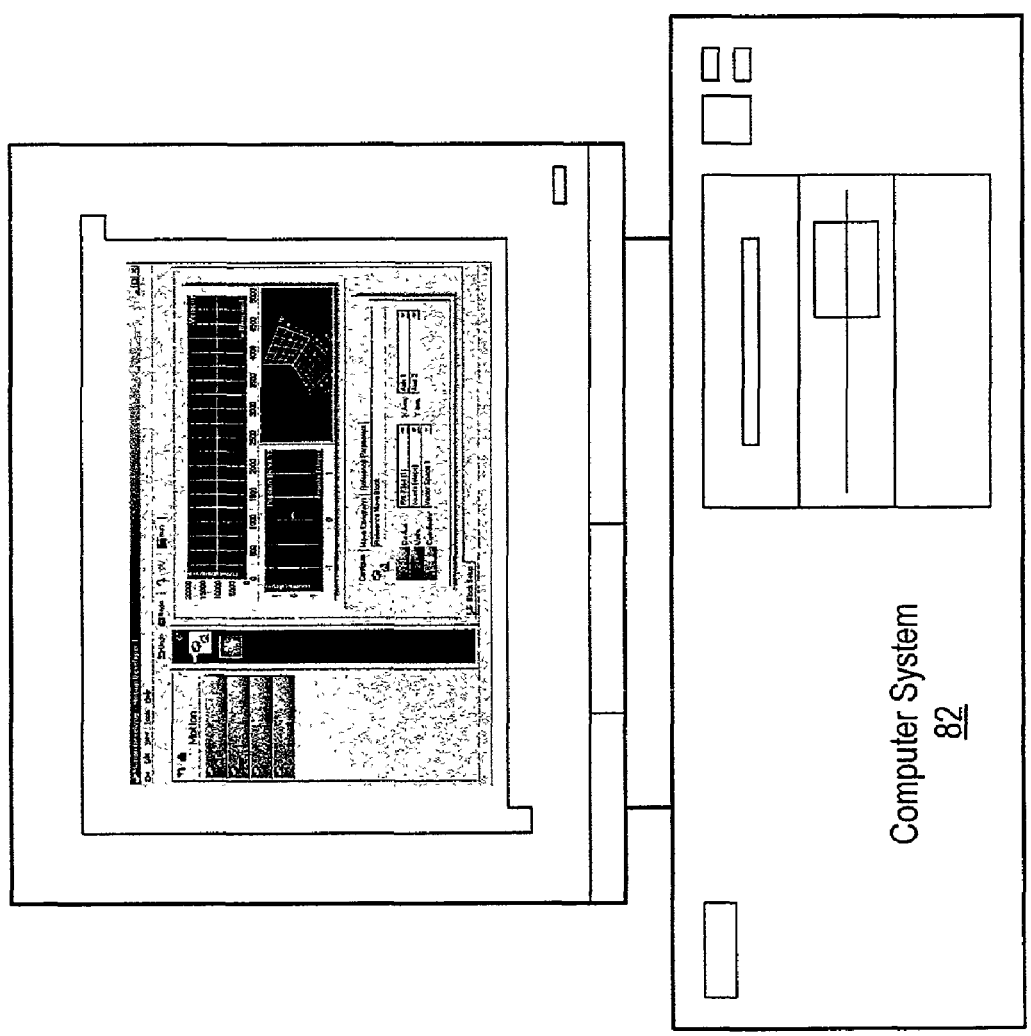
FIG. 1 illustrates a computer system that may execute a prototyping environment application for developing a sequence of motion control, machine vision, and/or DAQ (MC/MV/DAQ) operations.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/499,503 titled "System and Method for Configuring a Programmable Hardware Instrument to Perform Measurement Functions Utilizing Estimation of the Hardware Implementation and Management of Hardware Resources" filed Feb. 7, 2000.

U.S. patent application Ser. No. 09/617,600 titled "Graphical Programming System with Distributed Block Diagram Execution and Front Panel Display," filed Jun. 13, 2000.

U.S. patent application Ser. No. 09/518,492 titled "System and Method for Programmatically Creating a Graphical Program," filed Mar. 3, 2000.

U.S. patent application Ser. No. 09/587,682 titled "System and Method for Automatically Generating a Graphical Program to Perform an Image Processing Algorithm," filed Jun. 6, 2000.

U.S. patent application Ser. No. 09/595,003 titled "System and Method for Automatically Generating a Graphical Program to Implement a Prototype," filed Jun. 13, 2000.

U.S. patent application Ser. No. 09/745,023 titled "System and Method for Programmatically Generating a Graphical Program in Response to Program Information," filed Dec. 20, 2000.

FIG. 1—Computer System

FIG. 1 illustrates a computer system 82. In one embodiment, the computer system 82 may execute a motion control prototyping environment application for developing a sequence of motion control operations. A motion control sequence is also referred to herein as a "prototype". The motion control prototyping environment may be designed to enable a user to easily and efficiently develop/prototype a motion control sequence without requiring the user to perform programming, e.g., without needing to write or construct code in any programming language. For example, the environment may provide a graphical user interface (GUI) enabling the user to develop/prototype the motion control sequence at a high level, by selecting from and configuring a sequence of motion control operations using the GUI.

The motion control prototyping environment may also enable the user to preview the "geometry" of the motion, e.g., velocity profile, acceleration profile, position plots, etc., in advance before commanding the motor to perform the sequence of moves. The environment may also enable simulation of the motion control sequence, thus enabling users to perform offline development and prototyping.

After configuring and previewing the motion control sequence, the user may request the motion control prototyping environment to perform the motion control sequence.

Performing the motion control sequence may comprise interfacing with one or more motors (or motion controllers) coupled to the computer system to command the motor (or motion controller) to perform the sequence of motion control operations configured by the user.

In another embodiment, in addition to providing motion control operations for inclusion in a sequence, the motion control prototyping environment may provide other types of operations as well, including machine vision and data acquisition (DAQ) operations. In this embodiment, the motion control prototyping environment may be referred to as a MC/MV/DAQ prototyping environment. (The abbreviation "MC/MV/DAQ" is used herein to refer to "motion control/machine vision/DAQ".) Although the majority of this specification uses the term "motion control prototyping environment" rather than the term "MC/MV/DAQ prototyping environment," it is noted that a "motion control prototyping environment" may not be limited to developing sequences or prototypes involving motion control only, but may also be used to develop sequences or prototypes including operations related to other technologies, and, in particular, may be used to develop prototypes or sequences which integrate motion control, machine vision, and DAQ functionality.

In one embodiment, the motion control prototyping environment application (or MC/MV/DAQ prototyping environment application) may also be operable to automatically, i.e., programmatically, generate program code implementing the motion control sequence (or MC/MV/DAQ sequence). For example, the environment may generate a standalone program, such as a graphical program or a text-based program, operable to perform the motion control sequence. When executed, the generated program code may have the same functionality as when the motion control sequence is executed under control of the motion control prototyping environment. The user may also modify the generated program code as desired, e.g., to develop a customized or optimized motion control application (or MC/MV/DAQ application).

In another embodiment, the motion control sequence (or MC/MV/DAQ sequence) may be developed in the motion control (or MC/MV/DAQ) prototyping environment and may then be performed from a separate application development environment (ADE). In this embodiment, the sequence may be invoked under control of the ADE, but a separate program implementing the sequence may not be generated, or code implementing the sequence may be generated, but the code may not be persistently saved and presented to the user as a standalone program. For example, the user may not want to see the program code generated for the sequence, but may still want to execute the sequence from the ADE or from a program implemented in the ADE. In one embodiment, the motion control prototyping environment may provide an application programming interface (API) which enables a caller program to invoke execution of a particular sequence by the motion control prototyping environment.

Various aspects of the motion control prototyping environment are described in more detail below.

The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

The computer system 82 may include a memory medium(s) on which one or more computer programs or software components may be stored according to one embodiment of the present invention. For example, the memory medium may store a motion control prototyping environment application (or portion of such an application) such as described above. The memory medium may also store one or more sequences created using the motion control prototyping environment application. The memory medium may also store one or more programs, including graphical programs and/or text-based programs, automatically generated by the motion control prototyping environment application based on a sequence. The memory medium may also store an application development environment operable to invoke (or operable to create a program that invokes) a motion control sequence developed in the motion control prototyping environment. The memory medium may also store operating system software, as well as other software for operation of the computer system 82.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In the present application, the term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a graphical user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program or VI, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments that may be used to create and/or execute graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

Prototypes in General

A motion control sequence developed in a motion control prototyping environment is one example of what is referred to herein as a "prototype". Prototyping environments may be used to develop prototypes for any of various other types of applications, in addition to motion control. In general, a "prototyping environment" may refer to a specialized application that provides an environment that is conducive to rapidly and conveniently prototyping a problem solution, preferably without requiring the user to write code in a programming language or minimizing the amount of code the user would otherwise have to write.

A prototyping environment may integrate various capabilities in order to aid developers of problem solutions, depending on the particular problem domain. For example, a prototyping environment may provide a library of operations that are specific to a problem domain (such as the library of motion control operations discussed above) and may enable the user to select and execute various operations from the library. The prototyping environment may include a graphical user interface that is streamlined for interactively experimenting with various parameters associated with the selected operations and seeing the effects of the adjusted parameters. A prototyping environment may also include capabilities for simulating real-world objects or processes. A prototyping environment may be used to generate a sequence, solution, or script, also called a prototype, which represents an algorithm or process designed by the user in the prototyping environment.

In addition to motion control, prototyping environments may be utilized for many other problem domains. For example, a prototyping environment for image processing may enable a user to load or acquire an image and apply various image processing operations to the image, such as filtering operations, morphology operations, edge detection operations, etc. Such a prototyping environment may enable the user to build a script including various operations that are applied to images, e.g., for use in a machine vision, pattern matching, shape matching, or other imaging application. Other examples of prototyping environments include:

- a sound processing environment for applying various audio operations to a sound clip, e.g., in order to analyze the sound clip, eliminate background noise, etc.
- an instrumentation environment for interacting with hardware instruments, e.g., in order to initialize an instrument, acquire data from the instrument, analyze the acquired data, etc.
- a circuit design environment for developing and testing circuit designs, e.g., for programmable logic devices Since prototyping environments are usually designed for ease of use and are specialized for users familiar with a particular problem domain, they may enable users to create a computer-implemented solution to a problem without requiring the users to utilize or understand traditional programming techniques. For example, the prototyping environment may aid the user in creating a sequence or script (called a prototype) and offer other guidance to help the user in creating the solution.

Figure 2A:
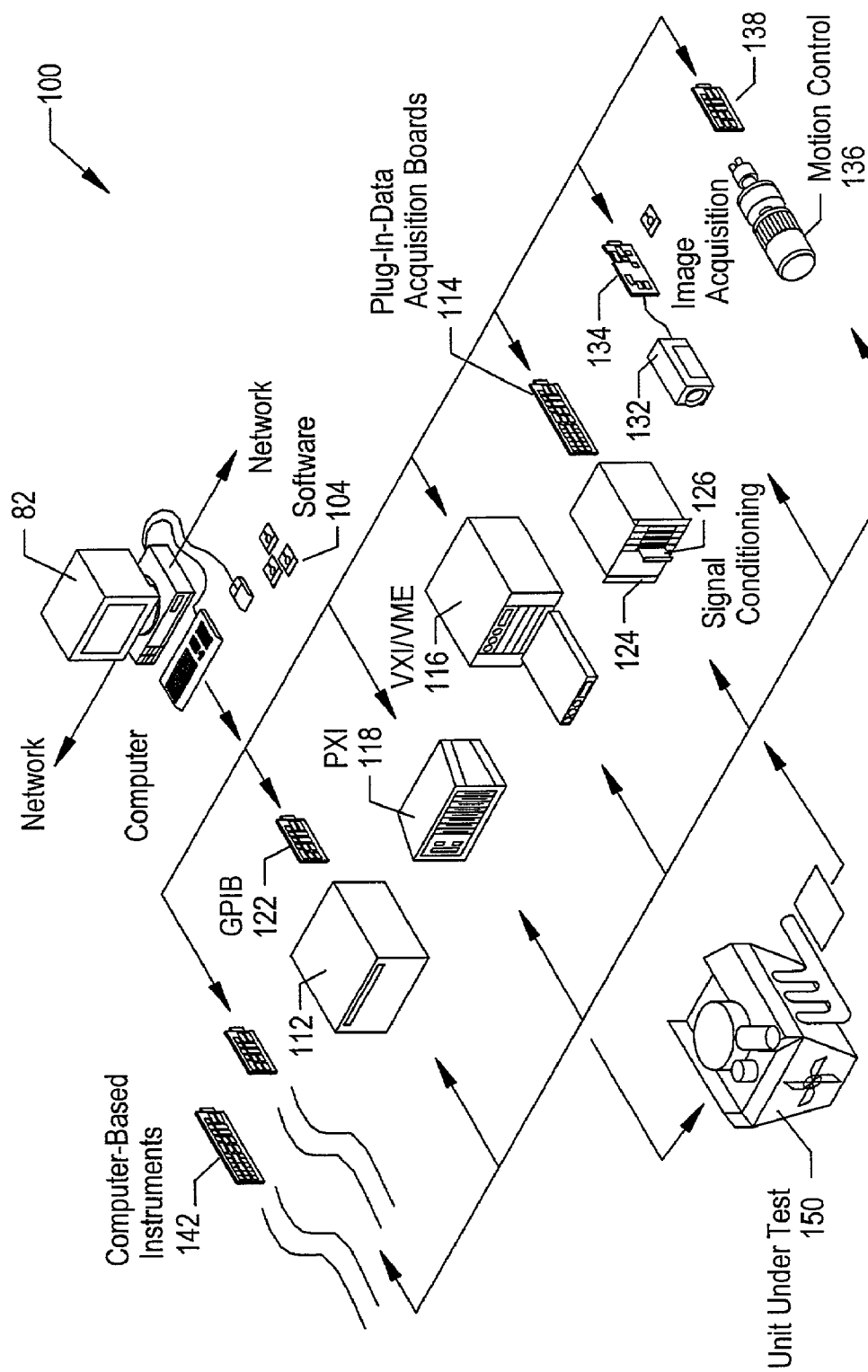
FIGS. 2A and 2B illustrate representative instrumentation and process control systems including various I/O interface options.
Figure 2B:
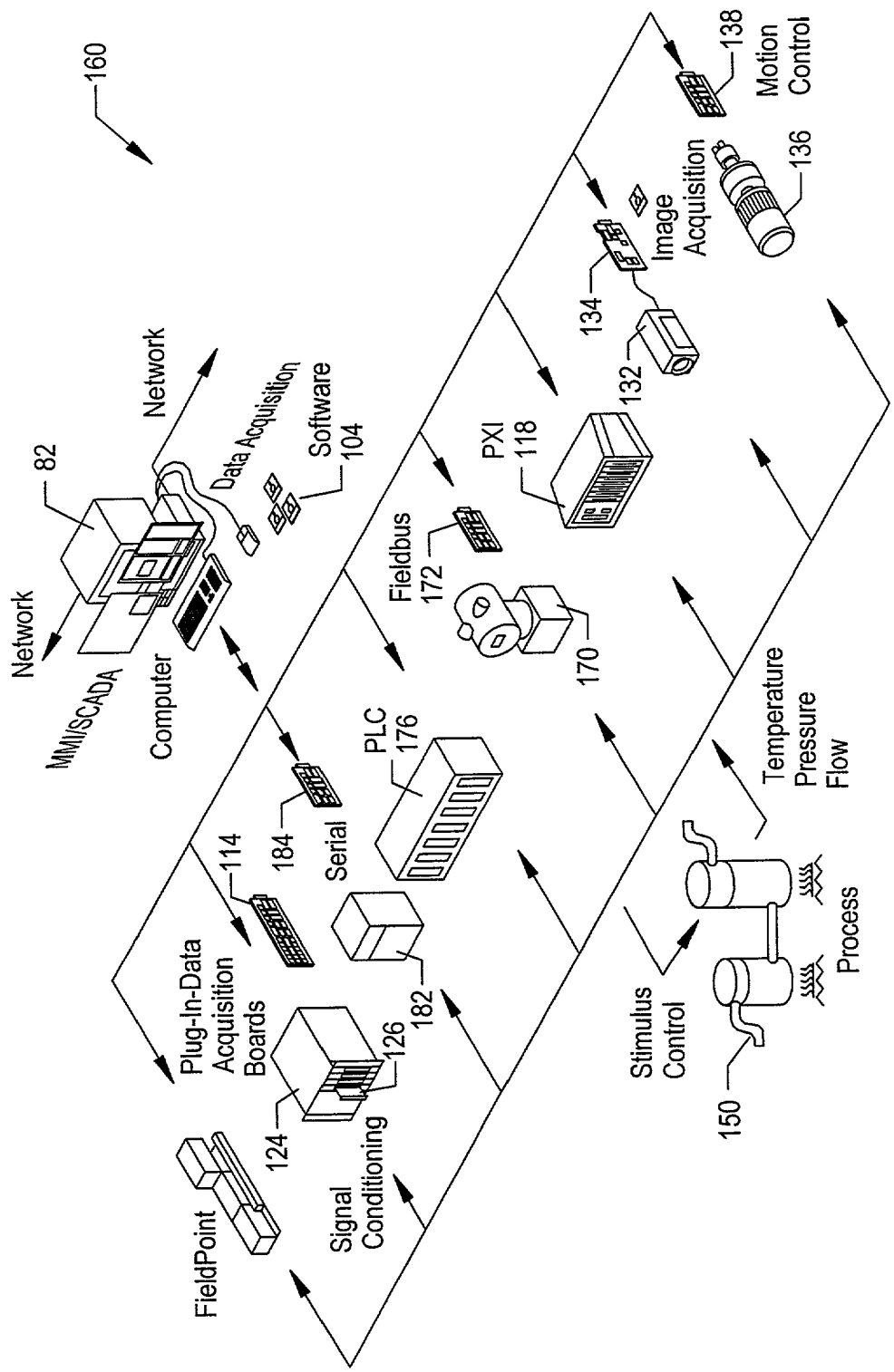

FIGS. 2A and 2B—Instrumentation and Industrial Automation Systems

FIG. 2A illustrates an exemplary instrumentation control system 100 which may implement embodiments of the invention. The system 100 includes a host computer 82 that comprises a CPU, a display screen, memory, and one or more input devices such as a mouse or keyboard as shown. The host computer 82 may connect to one or more instruments to analyze, measure, or control a unit under test (UUT) or process 150.

In particular, the host computer 82 may interface with a motion control device 136 via an associated motion control interface card 138. The host computer 82 may execute a motion control sequence developed in a motion control prototyping environment such as described herein to command the motion control device 136 to perform the motion control operations of the sequence. For example, the motion control device 136 may be involved in analyzing, measuring, or controlling the unit under test (UUT) or process 150.

The host computer 82 may also be coupled to a data acquisition (DAQ) board 114, which may interface through signal conditioning circuitry 124 to the UUT. In one embodiment, the signal conditioning circuitry 124 may comprise an SCXI (Signal Conditioning eXtensions for Instrumentation) chassis comprising one or more SCXI modules 126. The sequence developed in the prototyping environment described herein may include one or more DAQ operations. Thus, when the host computer 82 executes the sequence, the DAQ operations may control the DAQ board 114, e.g., to cause the DAQ board 114 to acquire data from the UUT.

Similarly, the sequence may include one or more machine vision operations which cause the host computer 82 to acquire images via the video device or camera 132 and associated image acquisition (or machine vision) card 134.

The instrumentation control system 100 may include other types of instruments as well, such as a GPIB instrument 112 and associated GPIB interface card 122, a VXI instrument 116, a PXI instrument 118, and/or one or more computer based instrument cards 142, among other types of devices.

The GPIB instrument 112 may be coupled to the computer 82 via the GPIB interface card 122 provided by the computer 82. In a similar manner, the video device 132 may be coupled to the computer 82 via the image acquisition card 134, and the motion control device 136 may be coupled to the computer 82 through the motion control interface card 138.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. These devices may also be connected to the computer 82 through a serial bus or through other means.

The VXI chassis or instrument 116 may be coupled to the computer 82 via a VXI bus, MXI bus, or other serial or parallel bus provided by the computer 82. The computer 82 may include VXI interface logic, such as a VXI, MXI or GPIB interface card (not shown), which interfaces to the VXI chassis 116. The PXI chassis or instrument may be coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical instrumentation control systems an instrument will not be present of each interface type, and in fact many systems may only have one or more instruments of a single interface type, such as only GPIB instruments.

The instruments may be coupled to a unit under test (UUT) or process 150, or may be coupled to receive field signals, typically generated by transducers. The system 100 may be used in motion control application, a data acquisition and control application, a test and measurement application, an image processing or machine vision application, a process control application, a man-machine interface application, a simulation application, and/or a hardware-in-the-loop validation application.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 includes a host computer 82 that comprises a CPU, a display screen, memory, and one or more input devices such as a mouse or keyboard as shown. The host computer 82 may connect to one or more devices or instruments to interact with a process or device 150 to perform an automation function, such as MMI (Man Machine Interface), SCADA (Supervisory Control and Data Acquisition), portable or distributed data acquisition, process control, advanced analysis, or other control.

In particular, the host computer 82 may interface with a motion control device 136 via an associated motion control interface card 138. The host computer 82 may execute a motion control sequence developed in a motion control prototyping environment such as described herein to command the motion control device 136 to perform the motion control operations of the sequence. For example, the motion control device 136 may be involved in performing the automation function performed by the industrial automation system 160.

The host computer 82 may also be coupled to a data acquisition (DAQ) board 114, which may interface through signal conditioning circuitry 124 to the UUT. In one embodiment, the signal conditioning circuitry 124 may comprise an SCXI (Signal Conditioning extensions for Instrumentation) chassis comprising one or more SCXI modules 126. The sequence developed in the prototyping environment described herein may include one or more DAQ operations. Thus, when the host computer 82 executes the sequence, the DAQ operations may control the DAQ board 114, e.g., to cause the DAQ board 114 to acquire data from the UUT.

Similarly, the sequence may include one or more machine vision operations which cause the host computer 82 to acquire images via the video device or camera 132 and associated image acquisition (or machine vision) card 134.

The industrial automation system 160 may include one or more other devices as well, such as a PXI instrument 118, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 134 may be connected to the computer 82 as described above. The serial instrument 182 may be coupled to the computer 82 through a serial interface card 184, or through a serial port, such as an RS232 port, provided by the computer 82. The PLC 176 may couple to the computer 82 through a serial port, Ethernet port, or a proprietary interface. The fieldbus interface card 172 may be comprised in the computer 82 and may interface through a fieldbus network to one or more fieldbus devices. Each of the DAQ card 114, the serial card 184, the fieldbus card 172, the image acquisition card 134, and the motion control card 138 are typically plugged in to an I/O slot in the computer 82 as described above. However, these cards 114, 184, 172, 134, and 138 are shown external to computer 82 for illustrative purposes. In typical industrial automation systems a device will not be present of each interface type, and in fact many systems may only have one or more devices of a single interface type, such as only PLCs. The devices may be coupled to the device or process 150.

As used herein, the term "instrument" is intended to include any of the devices that are adapted to be connected to a computer system as shown in FIGS. 2A and 2B, traditional "stand-alone" instruments, as well as other types of measurement and control devices. The term "measurement function" may include any type of data acquisition, measurement or control function, such as that implemented by the instruments shown in FIGS. 2A and 2B. For example, the term "measurement function" includes acquisition and/or processing of an image. In the embodiments of FIGS. 2A and 2B above, one or more of the various instruments may couple to the computer 82 over a network, such as the Internet.

Graphical software programs which perform functions such as motion control, measurement, instrumentation control, industrial automation, or simulation, such as in the applications shown in FIGS. 2A and 2B, may be referred to as virtual instruments.

Figure 3:
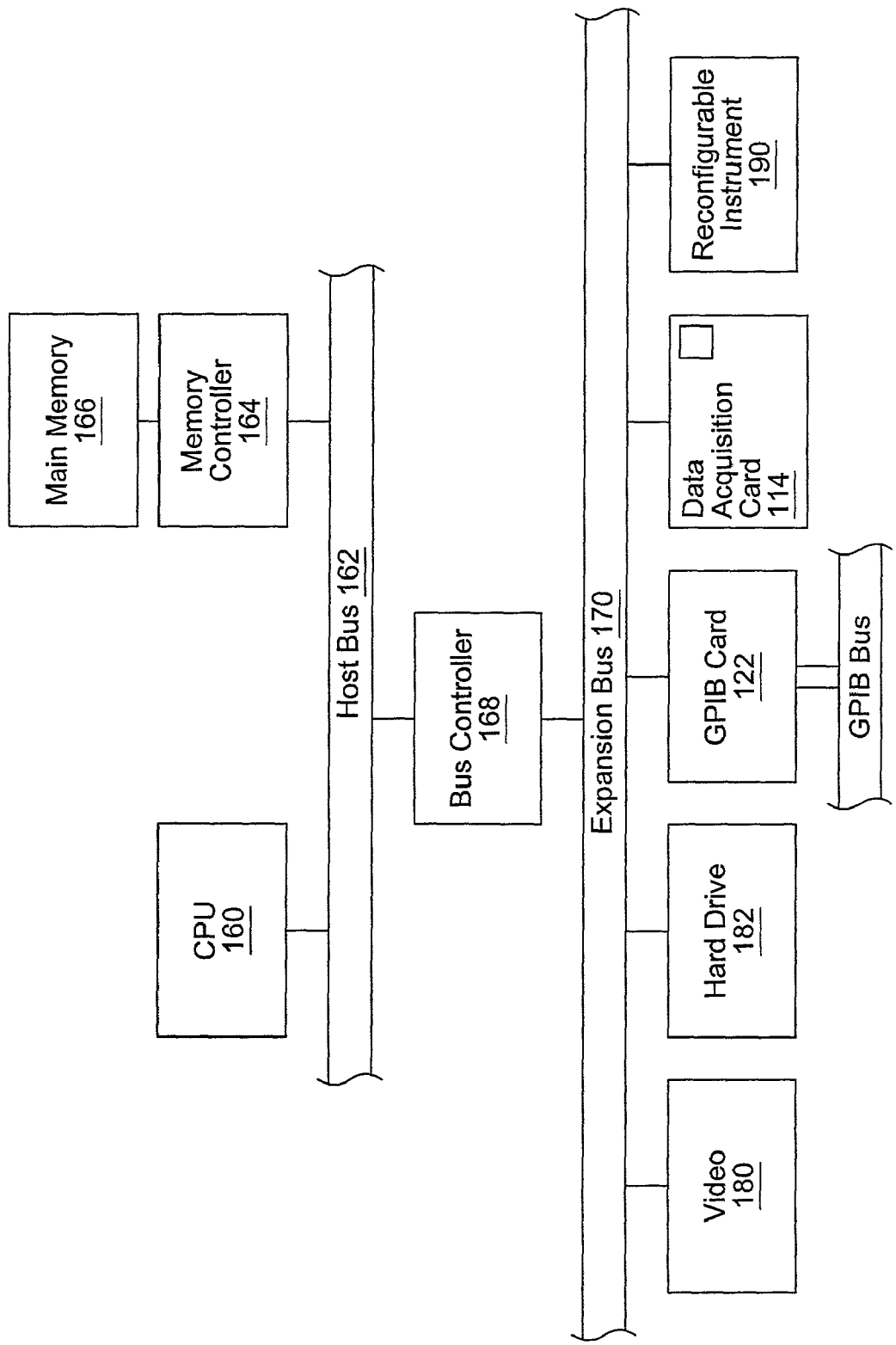
FIG. 3 is a block diagram representing one embodiment of the computer system illustrated in FIGS. 1, 2A, and/or 2B.

FIG. 3—Computer System Block Diagram

FIG. 3 is a block diagram representing one embodiment of the computer system 82 illustrated in FIGS. 1, 2A, and/or 2B. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. In one embodiment, the main memory 166 may store a motion control prototyping environment application for graphically creating, configuring, simulating, and/or performing a sequence of motion control operations (or MC/MV/DAQ operations). In another embodiment, the main memory 166 may store a program that was automatically, i.e., programmatically generated by the motion control prototyping environment, wherein the program is operable to perform a motion control sequence. In one embodiment, the main memory 166 may store an application development environment in which a motion control sequence created in a motion control prototyping environment may be executed. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

A reconfigurable instrument 190 may also be connected to the computer. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114. In one embodiment, at least a portion of the motion control sequence may execute on the reconfigurable instrument 190.

Figure 4:
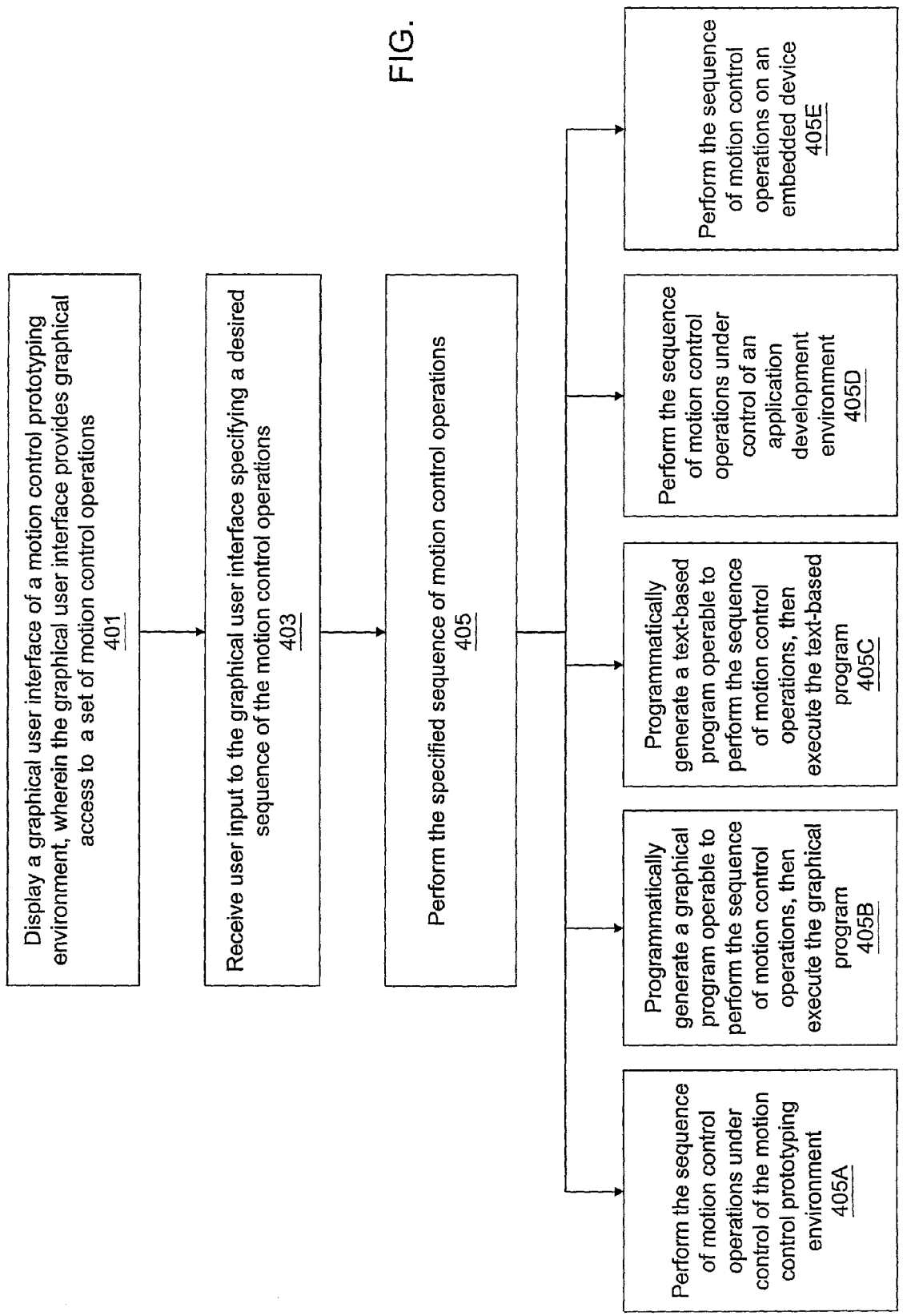
FIG. 4 is a flowchart diagram illustrating one embodiment of a method for creating and performing a motion control (or MC/MV/DAQ) sequence.

FIG. 4—Creating and Performing a Motion Control (or MC/MV/DAQ) Sequence

FIG. 4 is a flowchart diagram illustrating one embodiment of a method for creating and performing a motion control (or MC/MV/DAQ) sequence. It is noted that FIG. 4 represents an exemplary embodiment, and various alternative embodiments are contemplated. Also, the steps of FIG. 4 may be performed in various orders or multiple times, and steps may be combined, added, or omitted, etc.

In step 401, a graphical user interface of a motion control (or MC/MV/DAQ) prototyping environment may be displayed, wherein the graphical user interface provides graphical access to a set of motion control operations. One embodiment of such a graphical user interface is described below with reference to FIGS. 6A-6F. In various embodiments, any of various motion control operations may be provided. For example, the set of operations may include operations such as: a reference operation (to establish home and index), a straight-line move operation, an arc move operation, a contoured move operation, a gearing operation, etc. These operations are described below.

As noted above, in one embodiment, the motion control prototyping environment may provide access to other types of operations as well, e.g., machine vision and DAQ operations. Any of various types of DAQ operations may also be provided. For example, the DAQ operations may include operations related to digital I/O, analog input, analog output, signal conditioning, calibration and configuration (e.g., to calibrate and configure specific devices), counting operations, etc.

Any of various types of machine vision or image analysis operations may also be provided. Exemplary functions related to machine vision and image analysis include:

filtering functions for smoothing, edge detection, convolution, etc.

morphology functions for modifying the shape of objects in an image, including erosion, dilation, opening, closing, etc.

thresholding functions for selecting ranges of pixel values in grayscale and color images particle filtering functions to filter objects based on shape measurements a histogram function that counts the total number of pixels in each grayscale value and graphs it a line profile function that returns the grayscale values of the pixels along a line drawn through the image with a line tool and graphs the values particle analysis functions that computes such measurements on objects in an image as their areas and perimeters a 3D view function that displays an image using an isometric view in which each pixel from the image source is represented as a column of pixels in the 3D view, where the pixel value corresponds to the altitude.

an edge detection function that finds edges along a line drawn through the image with a line tool a pattern matching function that locates regions of a grayscale image that match a predetermined template a shape matching function that searches for the presence of a shape in a binary image and specifies the location of each matching shape a caliper function that computes measurements such as distances, areas, and angles based on results returned from other image processing functions a color matching function that quantifies which colors and how much of each color exist in a region of an image and uses this information to check if another image contains the same colors in the same ratio In step 403, user input to the graphical user interface may be received, wherein the user input specifies a desired sequence of the motion control (or MC/MV/DAQ) operations. One embodiment of step 403 is described in detail below with reference to FIG. 5. For each operation added to the motion control sequence, the user may configure or customize the operation, e.g., by interacting with a graphical panel or dialog to configure properties or parameters for the operation. In the preferred embodiment, the user is not required to specify or write any program source code to implement the motion control sequence. Instead, the motion control sequence may be specified graphically by interacting with the graphical user interface of the motion control prototyping environment. As described below, the motion control prototyping environment preferably enables the user to preview or simulate the motion control sequence before the sequence is actually performed by a motion control device.

In response to the user input specifying the sequence of motion control operations, information representing the specified sequence of motion control operations may be stored, e.g., in a data structure representing the sequence. For example, the data structure may specify information regarding the sequence, such as names or other identifiers that identify the operations in the sequence. The data structure may also specify information regarding various properties or parameter values configured for one or more operations in the sequence.

In step 405, the specified sequence of motion control operations may be performed. Performing the sequence of motion control operations may comprise performing each operation in the sequence. Motion control operations in the sequence may cause a motion control device coupled to the computer system to perform a movement, such as a straight-line movement, arc movement, contoured movement, etc. Other operations may relate to the motion control performed by the sequence, but may not actually cause the motion control device to perform a movement, such as a reference operation, gearing operation, etc.

If the sequence includes DAQ operations, the computer system may interface with a DAQ device coupled to the computer system to perform the DAQ operations configured by the user. For example, a DAQ operation may command the DAQ device to acquire data from an analog input channel or may cause signal conditioning to be performed on such data.

If the sequence includes machine vision operations, the computer system may interface with an image acquisition device coupled to the computer system to acquire images as configured by the user. Also, the machine vision operations may cause the computer system to analyze such acquired images.

In one embodiment, each operation in the motion control sequence may be performed sequentially. In another embodiment, the user may specify conditional branches which may result in some steps being skipped or performed in different orders, e.g., depending on results of performing previous steps. The user may also specify other types of constructs, such as iteration, looping, jumps, etc.

In various embodiments, the sequence may be performed in any of various ways, as described below. For example, as shown in step 405A, in one embodiment the sequence may be performed under control of the motion control prototyping environment. In other words, the motion control prototyping environment may be operable to interface with a motion control device, DAQ device, and/or image acquisition device connected to the computer system to command the device(s) to perform the sequence of operations. In one embodiment, the motion control prototyping environment may perform the sequence of operations by accessing the stored information representing the sequence of motion control operations to determine program instructions corresponding to motion control operations in the sequence and may then execute the program instructions. For example, the motion control prototyping environment may access a library of software routines corresponding to various operations. For each operation included in the sequence, the motion control prototyping environment may execute or invoke the appropriate software routine. If the user configured parameter values or properties for the operations, then the parameter values may be passed to the software routine to cause the software routine to execute properly as configured by the user.

As shown in step 405B, in another embodiment, rather than performing the sequence under control of the motion control prototyping environment, a graphical program operable to perform the sequence may be automatically, i.e., programmatically generated based on the sequence. This graphical program may then be executed to perform the sequence. The generated graphical program may include various interconnected nodes or icons which visually represent the sequence of MC/MV/DAQ operations configured by the user and which are executable to perform the sequence of MC/MV/DAQ operations.

The graphical program may be programmatically generated with little or no user input received during the generation process. In one embodiment, the graphical program is programmatically generated with no user input required. In another embodiment, the user may be prompted for certain decisions during or prior to the programmatic generation, such as the type of graphical program to generate, the look and feel of a user interface for the graphical program, the number or degree of comments contained within the graphical program, etc.

In one embodiment, the prototyping environment may interact with another application to programmatically generate the graphical program, such as a graphical programming development environment application. For example, the graphical programming development environment may provide an application programming interface (API) for programmatically generating graphical programs.

As shown in step 405C, in another embodiment, a text-based program operable to perform the motion control sequence may be automatically, i.e., programmatically generated, and may then be executed. The text-based program may include program code in any of various text-based programming languages, such as C, C++, Visual C++, Visual Basic, Java, Pascal, etc. The generated text-based program may include various functions or methods which are executable to perform the sequence of MC/MV/DAQ operations configured by the user.

After a graphical program or text-based program has been generated based on a motion control sequence in step 405B or 405C respectively, the user may modify the generated program code as desired, e.g., to develop a customized or optimized motion control application. For example, the user may utilize an application development environment separate from the motion control prototyping environment to interactively modify the generated program.

As shown in step 405D, in another embodiment, the sequence of MC/MV/DAQ operations may be performed under control of an application development environment. In this embodiment, the sequence may be executed under control of the ADE, but a separate program implementing the sequence may not be generated, or code implementing the sequence may be generated, but the code may not be persistently saved and presented to the user as a standalone program. For example, the user may not want to see the program code generated for the sequence, but may still want to execute the sequence from the ADE or from a program implemented in the ADE. In one embodiment, the motion control prototyping environment may provide an application programming interface (API) which enables a caller program to invoke execution of a particular motion control sequence by the motion control prototyping environment.

As shown in step 405E, in another embodiment, the sequence of motion control operations may be performed on an embedded device. For example, configurable hardware of the embedded device may be configured to perform the motion control operations included in the sequence. The configurable hardware may include any type of configurable logic or programmable hardware, such as FPGA hardware. In one embodiment, the embedded device may comprise a motion control device including configurable hardware which may be programmed to perform motion control operations in the sequence.

In one embodiment, program code implementing the sequence may first be generated, e.g., as shown in steps 405B and 405C, and this program code may then be used to facilitate programming of the embedded device to perform the motion control sequence. Performing the sequence on an embedded device is described in more detail below.

Figure 5:
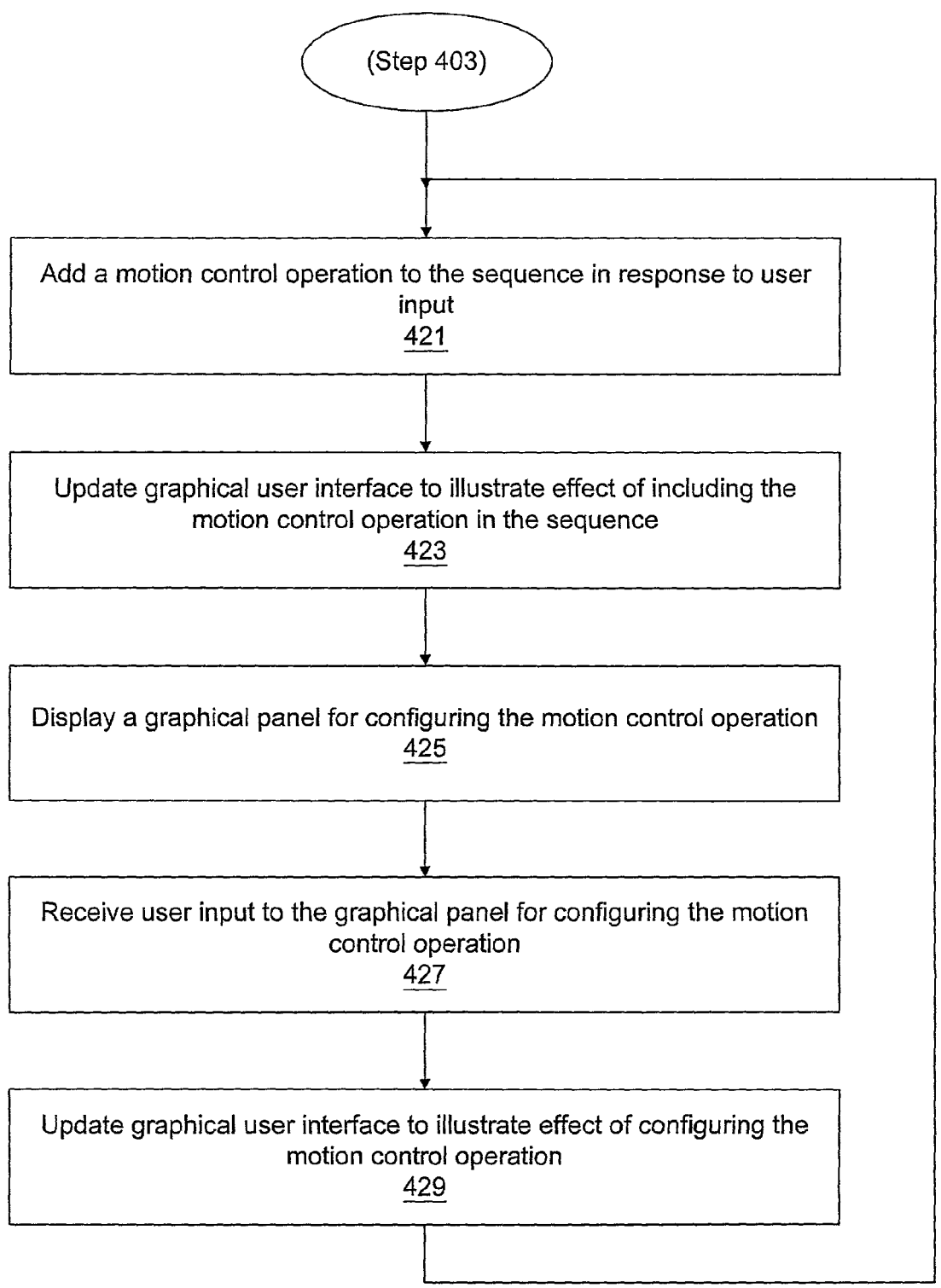
FIG. 5 is a flowchart diagram illustrating one embodiment of step 402 of FIG. 4, in which user input specifying a desired sequence of motion control (or MC/MV/DAQ) operations is received to the graphical user interface of the prototyping environment.

FIG. 5—Specifying a Sequence of Motion Control (or MC/MV/DAQ) Operations

FIG. 5 is a flowchart diagram illustrating one embodiment of step 403, in which user input specifying a desired sequence of motion control (or MC/MV/DAQ) operations is received to the graphical user interface of the motion control prototyping environment.

In step 421, a MC/MV/DAQ operation may be added to the sequence in response to user input. In various embodiments, the user may interact with the graphical user interface of the motion control prototyping environment in any of various ways to select a MC/MV/DAQ operation. For example, in one embodiment, a plurality of buttons may be displayed, each button corresponding to a particular operation. The user may press the appropriate button to add the desired operation. In another embodiment, a plurality of icons may be displayed, each icon corresponding to a particular operation. The user may select the appropriate icon to add the desired operation, e.g., by dragging and dropping the icon onto an area of the display screen representing the sequence. In other embodiments, the user may utilize menu, keyboard, and/or voice commands to add the motion control operation to the sequence. Step 421 preferably does not involve the user specifying or writing any program code. In other words, the user preferably interacts with the graphical user interface at a high level to add the desired MC/MV/DAQ operation to the sequence.

Figure 6A:
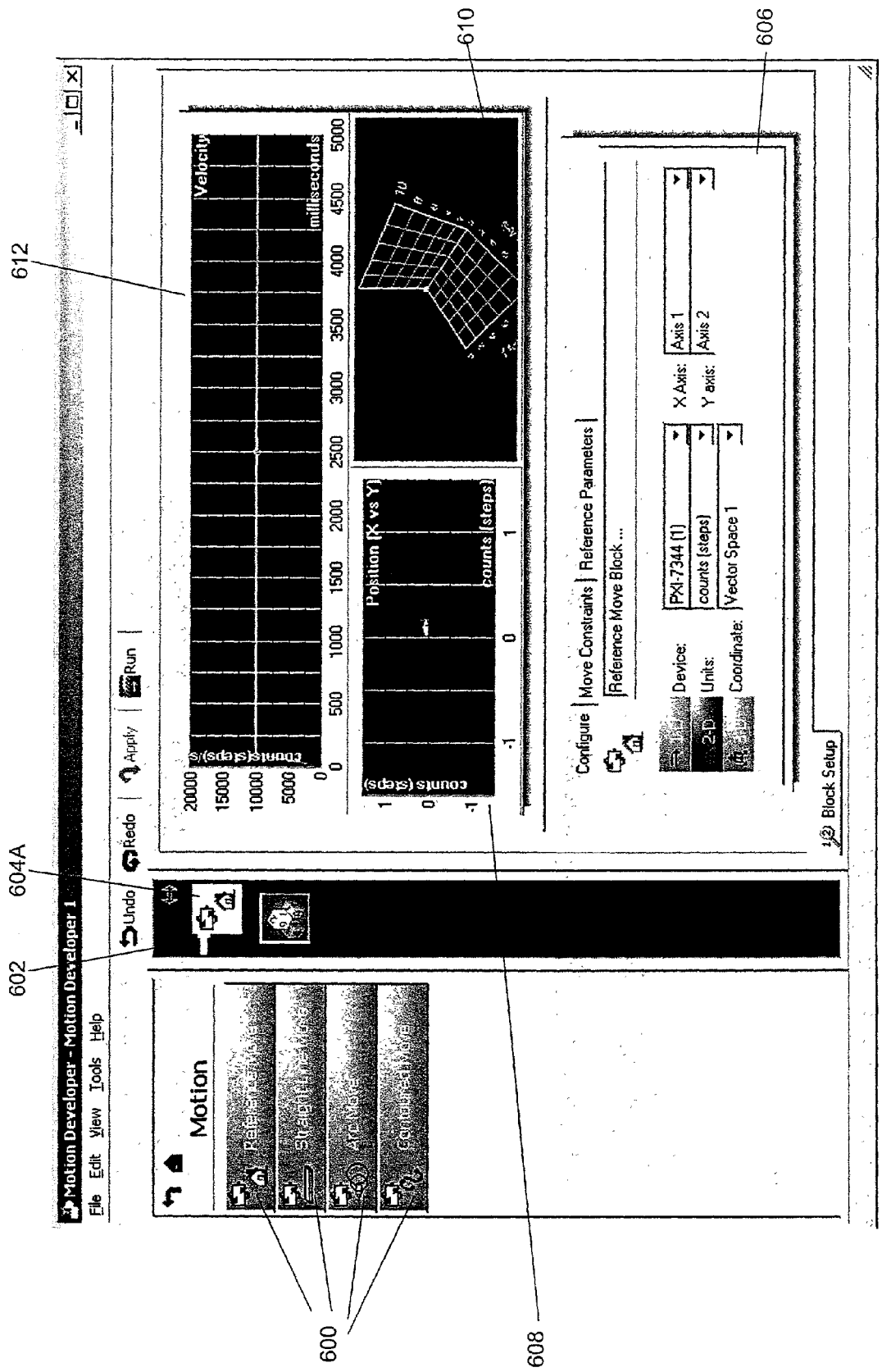
FIGS. 6A-6F illustrate an exemplary graphical user interface (GUI) for one embodiment of a motion control prototyping environment application.

In one embodiment, the sequence of MC/MV/DAQ operations that the user selects may be represented to the user graphically, e.g., as a sequence of icons. For example, as shown in FIG. 6A, one area of the graphical user interface may display an icon strip comprising a plurality of icons. Each icon may correspond to a MC/MV/DAQ operation in the sequence and may visually indicate that operation. In another embodiment, the sequence of operations may be represented textually, e.g., as a list of names of the operations, such as "Straight-line move", "Arc move", etc.

If the operation added to the sequence was a motion control operation, then in step 423, the graphical user interface of the motion control prototyping environment may be updated to illustrate the effect of adding the new motion control operation selected in step 421 to the sequence. As described in detail below, the graphical user interface may display one or more views of the sequence, such as a two-dimensional and/or three-dimensional view of the cumulative movement specified by the sequence, as well as other types of views, such as a graph indicating a velocity profile for the sequence. Thus, in step 423 these views may be updated to illustrate the effect of the new motion control operation.

Each operation may have various associated properties, attributes, or parameters affecting the operation. For example, an arc move motion control operation may have parameters or properties such as a radius, a start angle, and a travel angle. These parameters may initially have default values, e.g., 180 degrees for the travel angle of an arc move. In step 423, the graphical user interface may be updated according to these default values. In steps 425 and 427, the user may configure these parameters to customize the function performed by each operation.

In the preferred embodiment, the user may configure the parameters of the MC/MV/DAQ operations graphically, without having to write any program code. Thus, in step 425, a graphical panel for configuring the MC/MV/DAQ operation may be displayed. This panel may be automatically displayed in response to adding the operation to the sequence, or the panel may be displayed in response to user input requesting to configure the operation. In step 427, user input for configuring the MC/MV/DAQ operation may be received to the graphical panel. For example, the panel may include various user interface elements for changing parameter or property values of the operation, such as numeric GUI controls, check boxes, etc.

If the operation selected in step 421 was a motion control operation, then in step 429, the graphical user interface may then be updated again to illustrate the effect of configuring the motion control operation. For example, if the user changed a travel angle parameter of an arc move operation, then one or more views of the motion control sequence may be updated to visually reflect the new travel angle performed by the arc move operation.

As indicated by the flowchart arrow from step 429 to step 421, the process described above may be repeated for new operations the user adds to the sequence. New operations may be added any place within the sequence, e.g., at the beginning, end, or between two other operations. The user may select any operation in the sequence to view or edit its configuration. As the user changes the sequence, the graphical views illustrating the motion and other characteristics may be updated accordingly.

Thus, the method of FIG. 5 enables the user to easily prototype a sequence of MC/MV/DAQ operations without requiring the user to write program code. The method also enables the user to preview the motion of the sequence without requiring the motion to actually be performed by a motion control device. For example, the MC/MV/DAQ sequence may be developed on a first computer system that does not have a coupled motion control device and may then be transferred to and performed by a second computer system coupled to a motion control device.

FIGS. 6A-6F: Exemplary Graphical User Interface

FIGS. 6A-6F illustrate an exemplary graphical user interface (GUI) for a motion control prototyping environment application such as described above. In the particular embodiment illustrated in FIGS. 6A-6F, the prototyping environment provides access to motion control operations only. However, as discussed above, other embodiments of the prototyping environment may provide access to machine vision and DAQ operations as well. In addition, in various embodiments, the graphical user interface may take any of various forms, and the GUI illustrated in FIGS. 6A-6F is exemplary only.

As shown in FIG. 6A, the GUI includes several buttons 600 which the user may press to add a new motion control operation to the motion control sequence, such as a reference operation, a straight-line move operation, an arc move operation, or a contoured move operation.

The GUI also includes an icon strip 602 that displays icons representing the operations currently in the motion control sequence. In FIG. 6A, the motion control sequence includes only one operation, a reference move operation represented by the icon 604A.

The GUI also includes a graphical panel 606 that enables the user to configure a currently selected motion control operation. The properties displayed on the graphical panel 606 may differ for each possible type of move operation. In FIG. 6A, the only operation currently in the motion control sequence is selected, i.e., the reference move operation. Thus, the graphical panel 606 displays properties of this reference move operation. As shown, the graphical panel includes multiple tabs labeled, "Configure", "Move Constraints", and "Reference Parameters". The user may select the desired tab to view/edit the desired properties of the selected operation.

The GUI also includes three views of the motion that the sequence is configured to perform. These include a two-dimensional view 608 and a three-dimensional view 610 of the cumulative movement specified by the sequence, as well as a graph 612 indicating a velocity profile for the sequence. Since no actual movement is performed by the reference operation, these views do not yet indicate any motion.

Figure 6B:
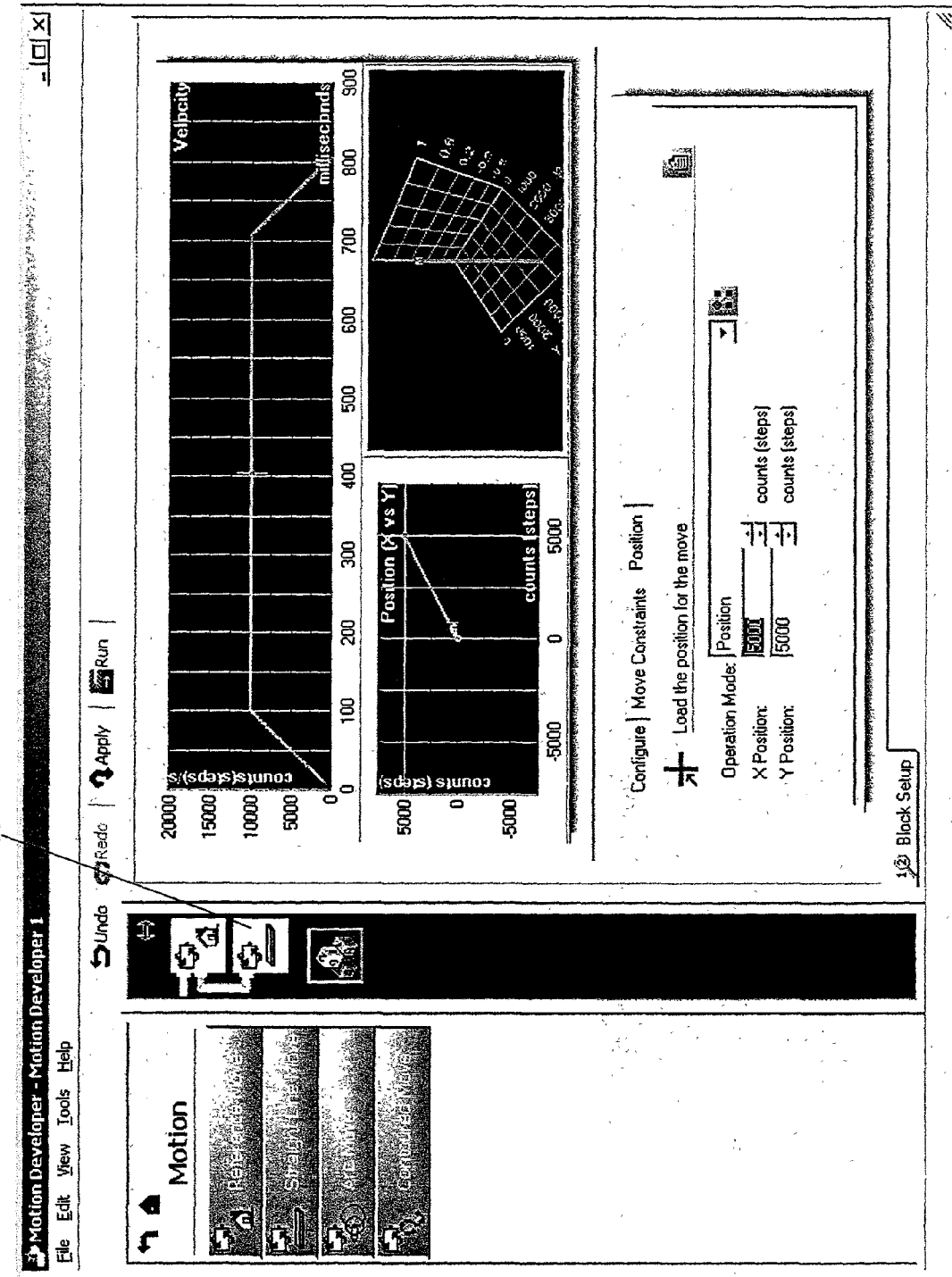

FIG. 6B illustrates the GUI after the user has included a straight-line move operation in the sequence, represented by the icon 604B in the icon strip 602. In FIG. 6B, this straight-line move operation is currently selected, and the "Position" tab of the graphical panel 606 displays some of its properties. When the move is initially added to the sequence, it may have default property values, such as the illustrated values of 5000 for both the X and Y positions. (The X and Y position values specify the desired ending location for the motion control device performing a straight-line move from the starting location.) In one embodiment, the user may configure the default property values to use when an operation is initially added to a sequence. The views 608, 610, and 612 visually indicate the effect of performing the straight-line move operation, as it is currently configured.

Figure 6C:
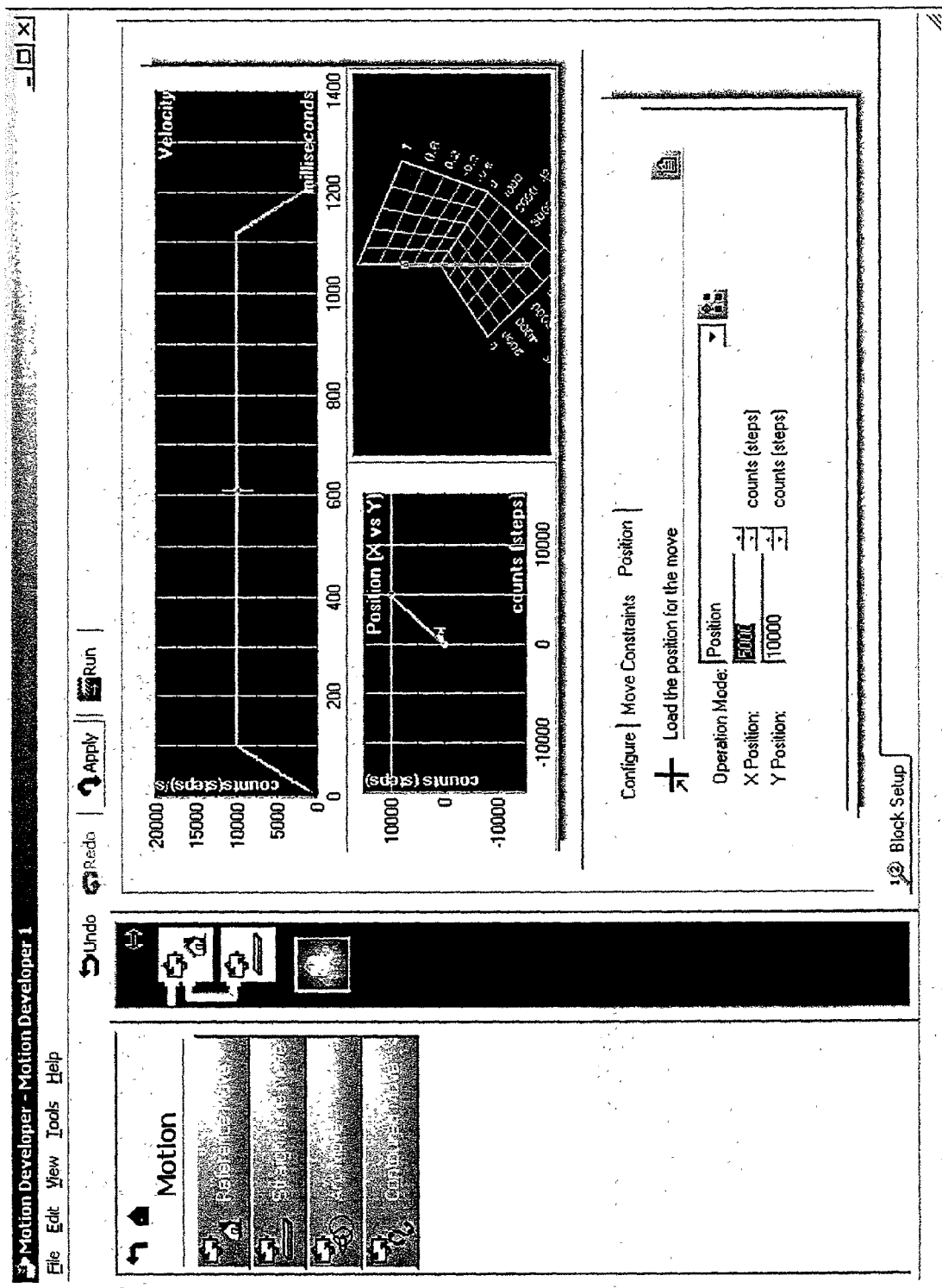

In FIG. 6C, the user has changed the Y position property value from 5000 to 10000. Note that the views 608 and 610 are updated to illustrate the new Y position.

Figure 6D:
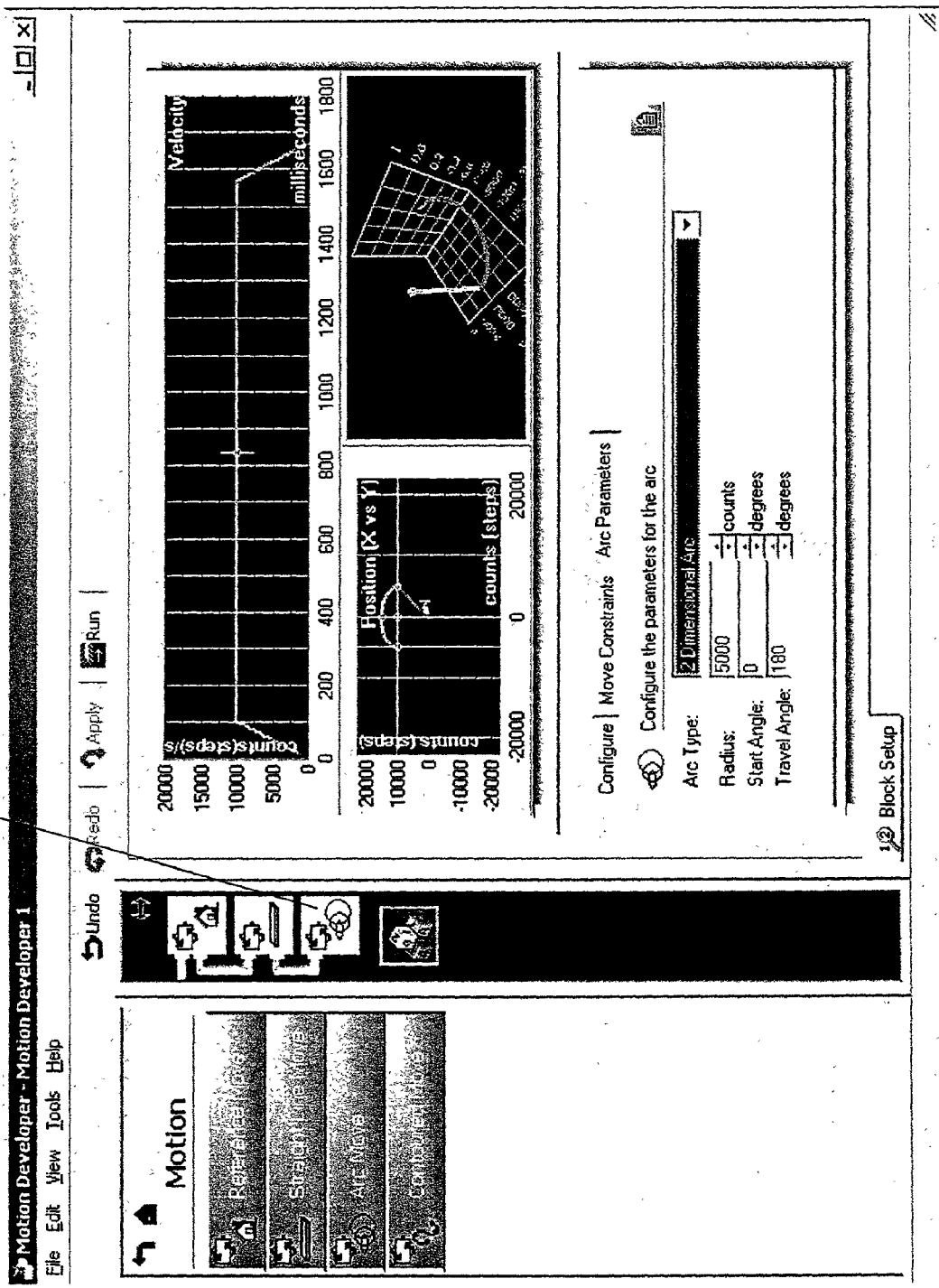

FIG. 6D illustrates the GUI after the user has included a two-dimensional arc move operation in the sequence, represented by the icon 604C in the icon strip 602. In FIG. 6D, this arc move operation is currently selected, and the "Arc Parameters" tab of the graphical panel 606 displays some of its properties. When the move is initially added to the sequence, it may have default property values, such as the illustrated values of 5000 for the radius, 0 for the start angle, and 180 for the travel angle. The views 608, 610, and 612 visually indicate the effect of performing the cumulative movement of the sequence as it is currently configured, i.e., the effect of performing the straight-line move operation followed by the arc move operation.

Figure 6E:
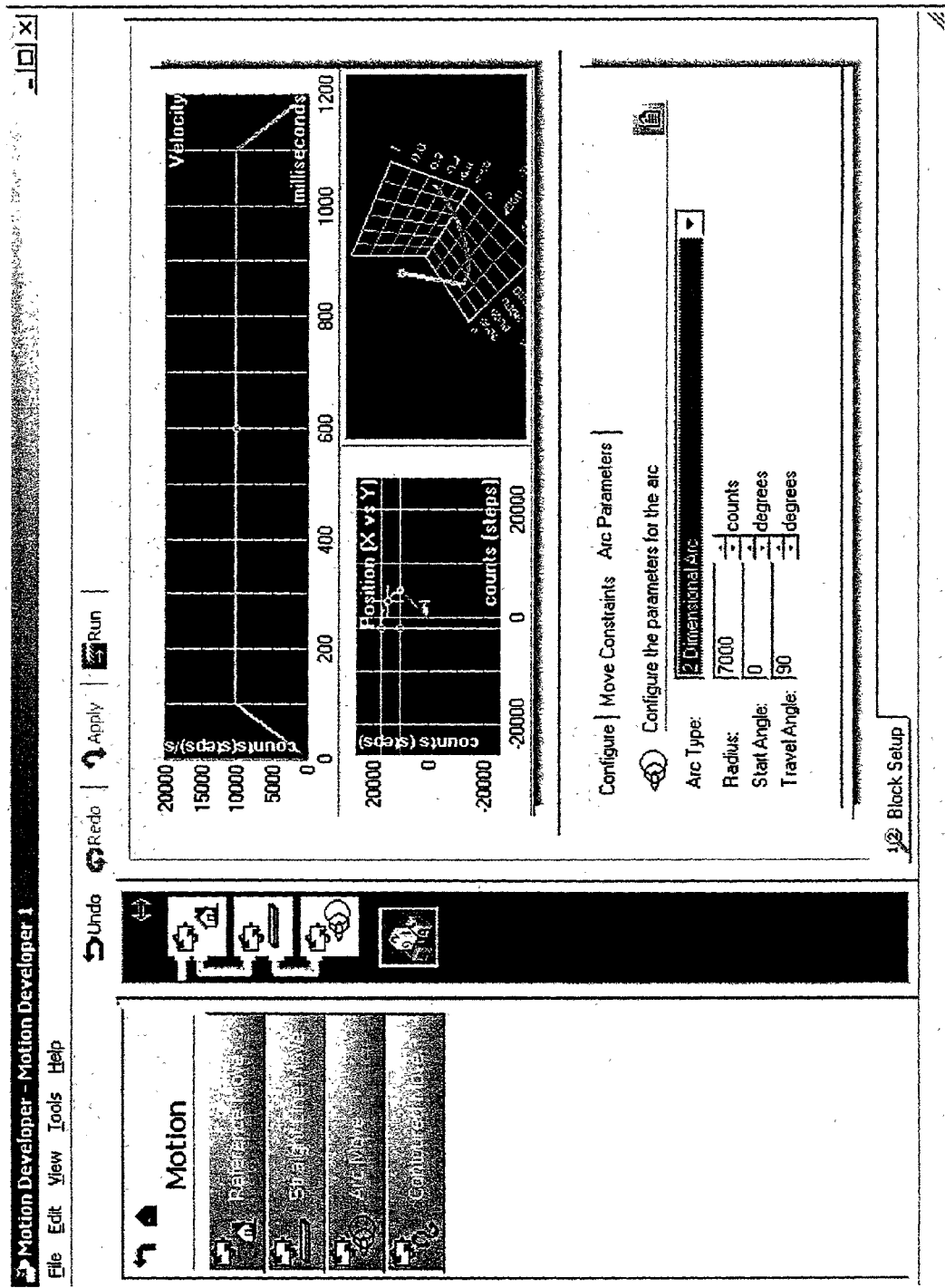

In FIG. 6E, the user has changed the radius property value from 5000 to 7000 and the travel angle property value from 180 to 90. Note that the views 608 and 610 are updated to illustrate the new motion performed by the motion control sequence.

Figure 6F:
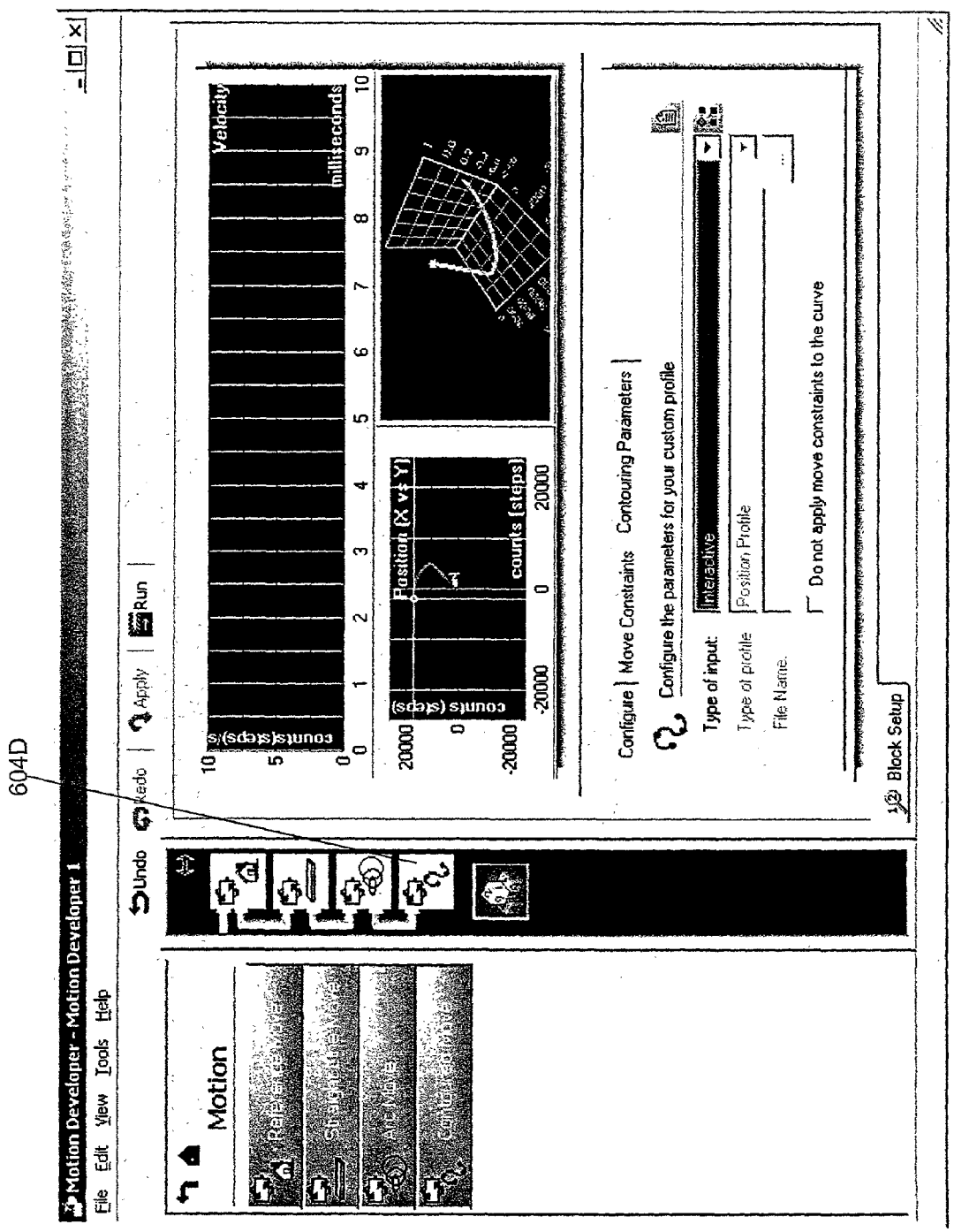

FIG. 6F illustrates the GUI after the user has included a contoured move operation in the sequence, represented by the icon 604D in the icon strip 602.

Motion Control Operations

This section describes possible motion control operations which the user can include and configure in a motion control sequence, according to one embodiment.

Straight Line Move Operation—This operation performs a straight-line move in 1-D, 2-D, or 3-D space. The user can choose a controller, the axes for his "motion space" and specify the move constraints such as velocity, acceleration, deceleration, and jerk. The user may utilize a graphical panel to specify desired values for these properties. The user may also graphically edit the position and velocity profiles for the operation and view the changes caused to the property values.

Arc Move Operation—This operation performs an arc in 2-D or 3-D space. The user can choose a controller, the axes for his "motion space" and specify the move constraints such as velocity, acceleration, deceleration, and jerk. The user may utilize a graphical panel to specify desired values for these properties. The user may also graphically edit the position and velocity profiles for the operation and view the changes caused to the property values.

Contoured Move Operation—This operation performs a custom-profiled move for 1-D, 2-D, or 3-D space. Once the user has inserted a contouring step into the prototype script, the user can select a file with coordinates that depict the geometry of the position profile or move the motors/actuators and record their positions to create a splined geometry. After this the user can specify move constraints such as maximum velocity, maximum acceleration, maximum deceleration and maximum jerk that the mechanical system can tolerate while moving in the geometry specified. After that the method will remap the coordinates keeping the geometry intact by ensuring that at no instant the specifications of the move constraints are violated.

Reference Operation—This operation may be used for initialization purposes. It allows the user to specify the reference for his axis or axes in 1-D, 2-D or 3-D space. This operation may cause the motion controller to find the home switch and/or the encoder index for the axis or axes specified.

Gearing Configuration Operation—This operation allows an axis to be electronically geared to a feedback device or another axis. It may also allow users to specify a CAM table if supported by the motion control hardware.

Views Provided by the Motion Control Prototyping Environment

As described above, the graphical user interface of the motion control prototyping environment may display one or more views of the motion produced by the motion control sequence or of various characteristics of this motion, such as velocity and acceleration profiles. This section describes a set of views provided by the motion control prototyping environment, according to one embodiment.

2D Position view—This view may display the entire position profile for the motion control sequence in a two-dimensional display. The user can edit the position data of operations in the sequence by interacting graphically with the data displayed in this view. The user may also edit the position data by entering text data into the graphical panels for configuring the operations. The user may select to view and edit the position data in the XY, YZ, or the ZX plane. The view 608 shown in FIG. 6A illustrates one example of a 2D position view.

Velocity view—This view may display the trapezoidal/S-curve or custom profile (only applicable if a contoured move operation is currently selected) of the velocity for the selected operation. The user may edit the velocity profile data of operations in the sequence by interacting graphically with the data displayed in this view. The user may also edit the velocity profile data by entering text data into the graphical panels for configuring the operations.

Acceleration view—This view may display the profile of the acceleration/deceleration for the selected operation. This view may be editable only if a contoured move operation is selected.

In addition to these views the motion control prototyping environment may provide tools available to display other information, such as:

Status Tool—This tool may display status information for each axis/vector space, e.g., in a separate window or tab. This provides a way to monitor the status of the motion control hardware.

Real World View Tool—This tool may display a real world view of the setup of the motion control system, e.g., in a separate window or tab. For example, a selection of stages/cartesian robot models may be provided so that the user can view the motion in the real mechanical sense of his system.

Previewing Motion Performed by a Motion Control Sequence

The motion control prototyping environment may enable the user to preview various aspects of the motion performed by a motion control sequence in one or more preview windows, e.g., a velocity profile, an acceleration profile, position plots, etc., in advance before commanding the motor to perform the sequence of moves. For example, the 2D and 3D position views discussed above may enable the user to preview the motion in two and three dimensions, respectively.

The preview window(s) may be updated dynamically as the user interacts with the motion control prototyping environment to create and edit the sequence. For example, after each new operation the user adds to the sequence, the motion control prototyping environment may update the preview window(s) to visually indicate the effect of adding the new operation. Also, when the user edits or changes an operation, the motion control prototyping environment may update the preview window(s) to visually indicate the change.

Velocity moves may display a velocity profile, and spatial moves may display displacement versus time for one axis moves, planar displacement for two axis moves, and 3D Cartesian displacement for three axis moves. Spatial moves may also take into account configured acceleration and deceleration profiles. Captures and breakpoints may be displayed along the trajectory.

The user may also be able to edit the motion by interacting directly with the preview windows. For example, in response to receiving user input to the 2D position view to specify a new location within an XY plane, the motion control prototyping environment may change properties of one or more operations in the motion control sequence such that the operations are updated to be operable to control a device to travel to the new location.

In one embodiment, the preview window(s) may display data for all of the operations in the motion control sequence. For example, if there are three move operations in the sequence, a preview window displaying position data may plot the trajectory for all three of the move operations. In another embodiment, the preview window(s) may display data for only a subset of the operations in the motion control sequence. For example, the user may select one or more operations which he desires to preview.

In one embodiment, the preview window(s) may display the information in the preview window(s) such that the user can view the entire cumulative motion at a glance. For example, if the sequence includes three motion control operations, the preview window(s) may indicate the motion trajectory of all three operations.

In another embodiment, the user may be able to request the motion control prototyping environment to simulate the motion trajectory such that the trajectory is interactively traced out in the preview window(s) as the user watches. For example, the preview window(s) may initially be empty (or may only display a coordinate grid), and the motion trajectory may gradually be plotted in the preview window(s). This may help the user to understand how the motion control device moves through space over time. This type of simulation may aid the user in performing offline development and prototyping; in other words, the user may watch a simulation of the motion even if no motion control device is coupled to the computer system.

The motion control prototyping environment may provide the user with various options relating to the speed at which the motion trajectory is interactively traced out in the preview window(s). For example, in some cases the user may desire for the trajectory to be drawn at a speed such that the time taken to draw the complete trajectory is the same as the time the actual motion would take if performed by the real motion control hardware. In other cases, the user may desire to speed up and/or slow down the drawing speed. For example, if the actual motion would take five minutes to complete on the real hardware, the user may request the motion control prototyping environment to draw the trajectory faster in the preview window, to increase the efficiency of previewing the sequence.

The motion control prototyping environment may also allow the user to configure the scale at which the trajectory is drawn in the preview window(s). For example, in some cases the user may desire to view the entire motion space at once, e.g., to achieve an overview of the overall sequence. At other times, the user may desire to "zoom in" to certain portions of the motion space. For example, if one portion of the motion sequence involves performing very small and complex movements, the user may request to zoom in to magnify the preview for that portion of the sequence.

In one embodiment, in response to the user selecting each motion control operation, the motion control prototyping environment may generate program instructions operable to implement the selected operation. These program instructions may be displayed to the user, e.g., in a separate program window. As the user selects new operations or modifies existing operations, the displayed program instructions may be updated to reflect the user's actions. Also, the user may interact with the preview window as described above to affect various aspects of the motion control operations. The displayed program instructions may also be updated in response to such user input to the preview window.

For example, in one embodiment, the program window may display a graphical program (or portion of a graphical program) implementing the selected operations. Thus, in this embodiment, the motion control prototyping environment may interactively generate a graphical program to implement the motion control operations, as the user specifies the operations, rather than generating a graphical program to implement the operations once all the operations have been selected and configured. The displayed graphical program may be interactively updated when the user interacts with the preview window to affect the motion control. For example, in the above example of the user interacting with the 2D position view to specify a new location within an XY plane, the graphical program may be modified to reflect the new location. This may be done in any of various ways, depending on how the location is represented in the graphical program. As one example, an input wire representing the location may be modified to reflect the new value.

In another embodiment, the program window may display a text-based program (or portion of a text-based program) implementing the selected operations. For example, the text-based program may include text-based language code such as function or method calls as well as possibly including programming constructs such as loops, conditional statements, etc. The displayed text-based language code may be interactively updated when the user interacts with the preview window to affect the motion control. For example, in the above example of the user interacting with the 2D position view to specify a new location within an XY plane, the text-based language code may be modified to reflect the new location. This may be done in any of various ways, depending on how the location is represented in the text-based program. As one example, a parameter to a function or method call representing the location may be modified to reflect the new value.

Breakpoints/High Speed Capture

In one embodiment, the user may be able to specify various breakpoints in the motion control sequence. When the motion control sequence is performed, the current position of the axis and the velocity of the move may be recorded at the breakpoint.

The user may specify the breakpoints in various ways. For example, in one embodiment, the user may specify associate a breakpoint with a move by specifying the coordinates at which to perform the breakpoint. In another embodiment, the user may specify a breakpoint graphically. For example, the user may click on a point within the 2D view to specify that a breakpoint should be performed at that point. After the user has created the breakpoint graphically in this manner, he may fine-tune the location of the breakpoint, e.g., by utilizing a text-box to type precise coordinates.

The user may also be able to enable high-speed capture to be performed at a particular time during a move. For example, this may comprise writing a value to a general purpose digital output port on the motion controller before a move has been started or after a move has been completed.

In one embodiment, the GUI of the motion control prototyping environment may provide separate operations for inclusion in the motion control sequence for configuring breakpoints, enabling high-speed capture, and enabling writing to the digital output on the motion controller. Thus, in this embodiment, the user may add the desired operation to the motion control sequence rather than configuring another operation already in the sequence, e.g., a move operation, to perform the breakpoint/high-speed capture/write operation. This may help to keep the motion trajectory performed by the sequence separate from other aspects of the sequence.

Events

In various embodiments, the sequence of execution for the operations in a motion control sequence may be controlled according to any of various techniques or computation models. In one embodiment, an event model is utilized. An event may comprise an occurrence that causes a block in a sequence to execute. Each operation in a motion control sequence may register various events (generators) with the motion control prototyping environment. Each operation may also be operable to listen for various events (consumers). Thus, when a first operation (generator) generates an event, a second operation (consumer) listening for that event may be triggered and may execute in response to the event.

In one embodiment, a first operation must be next to a second operation in the motion control sequence if the first operation consumes an event generated by the second operation. Thus, for example, if the generator of the event is the first operation in the sequence, the consumer of the event must be the second operation in the sequence, so that the two operations are chained together. In another embodiment, generator/consumer operations may not need to be next to each other in the sequence. Thus, for example, the first operation in the sequence could generate an event that triggers execution of the fifth operation in the sequence.

One particular advantage of an event mechanism such as described above is its utility for multi-starting axes in motion. For example, if the user needs to start two axes (not part of a vector space) simultaneously, then the user may configure a first operation to generate a synchronized start event and configure a second operation to be the consumer of the synchronized start event. Once the first operation generates the synchronized start event, the second operation may execute and send an atomic start to the motion controller that starts both the axes simultaneously at the driver/firmware level.

In various embodiments, any of various types of events may be supported by the motion control prototyping environment. For example, supported events may include a Synchronized Start Event, a Synchronized Stop Event, a Position Breakpoint Event, a High Speed Capture Event, a Move Complete Event, a Blend Complete Event, a Motion Error Event, a Following Error Event, a Reference Found Event, etc.

Error Handling

In one embodiment, the motion control prototyping environment may provide a monitoring tool that allows the user to monitor status information on all the axes, such as following error, axis off status, etc. Errors generated during performance of the motion control sequence may be logged to a log window, and the motion control operation that experienced the error may stop execution.

Plug-In Architecture

In one embodiment, the motion control prototyping environment may be constructed according to a plug-in architecture which allows new motion control drivers to be easily added into the environment. This may allow an abstraction so that the motion control prototyping environment continues to work with future motion APIs and/or third party plug-ins. The driver plug-ins may be based on a registration scheme that allows the plug-ins to be loaded at runtime. In addition to driver plug-ins, different stage/cartesian robot models may also be plugged in and displayed in the real-world view tool described above.

Use Case 1—Wafer Defect Inspection

Several exemplary use cases are presented below to further illustrate how a motion control prototyping environment such as described above may be utilized to solve real-world motion control problems.

The first use case pertains to wafers to be inspected for defects. The wafers are retrieved from a cassette carrier and loaded on an inspection table by a robotic handler. The wafers are then rotated and moved laterally along their radius while a fixed laser beam is directed at the wafer surface. Scattered laser light is collected by multiple detectors and fed to an analysis system. The wafers are removed by another robot and put in output cassettes according to their defect levels.

This application may be implemented using a sequence in the motion control prototyping environment with four move operations:

a) A straight-line move operation that moves the robotic arm over the inspection table. A value maybe written to a digital output bit before the move is performed to lift the wafer. Another value may be written to a digital output bit after the move is performed to release the wafer.

b) A straight-line move operation to move the robotic arm away from the inspection table to its initial position.

c) A straight-line move operation to cause the rotary stage on the inspection table to rotate the wafer while the laser beam is directed at its surface. The laser can be activated by writing a value to another digital output bit on the motion controller before this move starts, and may be shut off with another write value after the move is performed.

d) A straight-line move operation that moves the rotating assembly laterally. This operation may be synchronized with the rotary motion, e.g., using a "synchronized start" event such as described above.

After the analysis step, the wafer may be moved by another robotic arm to either a "defect" parts tray or a "good" parts tray. These operations may be respectively performed by two other motion control sequences. One sequence may move the robotic arm to the position that corresponds with the "defect" parts tray and the other may move the robotic arm to the position that corresponds to the "good" parts tray. Based on the analysis of the wafer, the appropriate sequence may be executed. For example, the analysis of the wafer may be performed by a program written in or executing under control of an application development environment (ADE). As described above, the program may be operable to invoke a sequence to run under control of the motion control prototyping environment. Thus, the program may invoke the appropriate sequence to cause the wafer to be placed in the appropriate tray, depending on the results of the wafer analysis.

Alternatively, the motion control prototyping environment may programmatically generate program code to implement the sequences developed in the motion control prototyping environment, as described above. The user may then customize the generated program code, e.g., to add code for performing the wafer analysis and for causing the appropriate portion of the automatically generated code to execute in response the results of the analysis. Thus, in this example, the user's program may implement the entire application without requesting the motion control prototyping environment to execute part of the application.

To facilitate this application, the motion control operations may be synchronized with other types of operations such as data acquisition (DAQ) operations. For example, the sequence may include a DAQ operation that causes a DAQ device to acquire the intensity of the laser beam. At every scan, the DAQ operation may trigger the high-speed capture on the motion device. This may cause synchronized position-intensity readings that make it easy to map the wafer with the defects.

Use Case 2—Glue Dispensing

The second example use case pertains to glue that needs to be applied to the sole of a shoe. The glue gun is installed on a fixture including two motors. The glue needs to be dispensed consistently; thus, the 2D-vector velocity at which the glue gun traverses the path of the sole must be constant throughout the move.

This application may be implemented using a sequence in the motion control prototyping environment with two operations:
 a) a reference move operation to move the X and Y axes into their reference starting positions.
 b) a contoured move operation to follow the path of the sole. Position data describing the shape of the sole may be read in. This data may then be used to plot the profile of the move in 2D space. Based on the move constraints such as velocity, acceleration, deceleration and jerk, the points read in may be re-mapped to achieve the desired velocity profile. On execution, the Contoured move operation may send the points to the motion controllers that causes the 2D vector to move through the desired space at constant velocity.

Use Case 3—Capturing Images While Moving

The third example use case pertains to capturing images while moving. It is required to take images while an XY stage is moving through a pre-determined sequence. Images may be taken based on the hardware triggering the camera.

This application may be implemented using a sequence in the motion control prototyping environment with two or more operations. The move profile may be defined, e.g., using straight-line, blended, and/or contoured moves. Breakpoints may then be set at the appropriate points within the position plot where the camera needs to be triggered. This enables the breakpoints in the hardware at those positions. When the move operations are executed, the breakpoints may trigger the camera, causing it to capture the images at the desired positions.

If image analysis needs to be performed on a captured image after a breakpoint has occurred, the analysis may be performed in any of various ways. For example, the sequence developed in the motion control prototyping environment may be integrated with other program code. For example, a program operable to perform the image analysis may be written, wherein the program is operable to invoke a sequence for execution in the motion control prototyping environment, or the user may request the motion control prototyping environment to generate standalone code implementing the sequence and may then modify the generated code to include the image analysis logic, as described above.

Alternatively, in one embodiment, the motion control prototyping environment may provide image analysis operations in addition to motion control operations. Thus, the user may develop a sequence that also includes the appropriate image analysis operations for analyzing the images. Thus, in this case, the user may develop a solution for the application entirely within the motion control prototyping environment. This may advantageously enable the user to work at a high-level, by using the GUI of the prototyping environment to implement the application, rather than using a programming language.

Use Case 4—Testing Resistors

The fourth example use case pertains to retrofitting a system used to test resistors. Assume that the potentiometer head is currently moved manually, and the resistance value of the resistor is tested using a DAQ device. It may be desirable to automate the system using a motor that can move the potentiometer head automatically. Using a single axis, the potentiometer head can be moved in a sinusoidal fashion at different frequencies, and analysis of resistance readings can be performed in conjunction with a DAQ device.

This application may be implemented using a sequence in the motion control prototyping environment, wherein the sequence includes a contoured move operation. A table of position values describing the sinusoidal motion may be loaded, and the contoured move operation may cause the desired sinusoidal motion. For different frequencies, different tables can be specified.

Similarly as described above, the motion control performed by the sequence may be integrated with other code, e.g., code that implements DAQ analysis functions. For example, a separate program including the DAQ analysis functions may invoke execution of the motion control sequence within the motion control prototyping environment, or the motion control prototyping environment may automatically generate code which the user can customize by adding the DAQ analysis functions. In another embodiment, the motion control prototyping environment may also enable the user to include DAQ operations in the sequence, as described above. Thus, in this case, the user may develop a solution for the application entirely within the motion control prototyping environment.

Use Case 5—Flying Welding

The fifth example use case pertains to a flying welding application. The objective is to weld one spot on a part moving on a conveyor belt. The welding gun is installed on a linear arm controlled by a linear motor. The welding needs to happen without stopping the conveyor belt.

This application may be implemented using a sequence in the motion control prototyping environment as follows:
 A reference move operation to move the arm to its starting position waiting for a part.
 A gearing operation which may start on a high-speed capture trigger. This operation gears the linear axis to an encoder mounted on the conveyor belt. The gearing ratio is set at 2:1.
 A wait block to wait for a predetermined amount of time, to allow the linear arm to be positioned over the piece to be welded.
 A gearing configuration operation to change the gear ratio to 1:1. It writes to a digital output bit to start the welding. The arm may now move at the same speed as the conveyor and perform the welding while moving.
 Another gearing operation to shut off the welding flame by writing to the digital output and then disable gearing.

Programmatic Generation of a Graphical Program

As described above with reference to step 405B of FIG. 4, in one embodiment, a graphical program operable to perform the motion control (or MC/MV/DAQ) sequence developed in the motion control prototyping environment may be automatically, i.e., programmatically generated. In various embodiments, this programmatic generation may be performed in any of various ways. In one embodiment, the motion control prototyping environment application may include functionality for both creating the motion control sequence and generating the graphical program. In another embodiment, the motion control prototyping environment application may interface with another program to request the graphical program to be generated, e.g., according to a client/server methodology.

As described above, the graphical program may be programmatically generated with little or no user input received during the generation process. In one embodiment, the graphical program is programmatically generated with no user input required. In another embodiment, the user may be prompted for certain decisions during or prior to the programmatic generation, such as the type of graphical program to generate, a file name or location for the graphical program, the look and feel of a user interface for the graphical program, the number or degree of comments contained within the graphical program, etc.

Various objects may be included in the generated graphical program, such as nodes and/or programmatic structures (e.g., loops, case structures, etc.) to include in a block diagram of the graphical program. The graphical program may also include a user interface portion including various user interface objects, such as one or more user interface panels having controls for specifying user input to the graphical program and/or indicators for displaying output from the graphical program. As described above, block diagram objects in a graphical program are typically interconnected so as to visually indicate functionality of the program. Thus, generating the graphical program may also comprise connecting or wiring together the block diagram objects appropriately. Also, the positions and/or sizes of the objects may be specified (e.g., to create an easily readable block diagram), among other properties or configuration of the objects (e.g., configuration of data types, parameters, etc.).

Programmatically generating the graphical program may comprise generating one or more files or data structures defining or representing the graphical program. When a user interactively develops a graphical program from within a graphical programming environment, the graphical programming environment may create one or more program files. For example, the program files may specify information such as a set of nodes included in the graphical program, interconnections among these nodes, programmatic structures such as loops, etc. Also, the program files may store various data structures, e.g., in binary form, which the graphical programming environment uses to directly represent the graphical program. Thus, in programmatically generating the graphical program, one or more files or data structures representing the graphical program may be programmatically generated, wherein these files may be structured or formatted appropriately for a particular graphical programming development environment.

In various embodiments, any of various types of graphical programs may be generated. The generated graphical program may be targeted toward a particular graphical programming development environment. Thus, in programmatically generating the program, files may be created that are formatted in a manner expected by the targeted graphical programming development environment. This may be desirable or necessary, for example, when the graphical programming development environment includes a runtime environment that is required for the generated graphical program to execute. Examples of graphical programming development environments include LabVIEW, BridgeVIEW, DasyLab, and DiaDem from National Instruments, VEE from Agilent, Simulink from The MathWorks, Softwire from Measurement Computing, Inc., Sanscript from Northwoods Software, WiT from Coreco, and Vision Program Manager from PPT Vision, among others.

In one embodiment, a database may be utilized in programmatically generating the graphical program, wherein the database stores information specifying how to generate graphical source code to implement each possible MC/MV/DAQ operation. In one embodiment, the targeted graphical programming development environment may provide nodes that correspond directly to MC/MV/DAQ operations in the sequence. For example, to implement a straight-line move operation included in the sequence, a corresponding straight-line move node may be included in the graphical program, wherein the node is executable to cause a motion control device to perform the configured straight-line move. For example, properties of the straight-line move operation that were configured graphically in the motion control prototyping environment, such as the X position value, the Y position value, etc., may be specified as parameters to the straight-line move node.

In another embodiment, there may not be a graphical program node directly corresponding to one or more of the operations in the motion control sequence. Thus, these operations may need to be implemented using a combination of nodes provided by the graphical programming development environment. For example, in one embodiment, a straight-line move operation may be implemented using a plurality of low-level nodes operable to send appropriate control signals to a motion control device to cause the device to perform a straight-line move. In this example, the graphical source code programmatically generated for the straight-line move operation may include programming constructs such as loops, timers, etc., operable to receive feedback from the motion control device and to cause the device to move to the correct location.

In one embodiment, the program that generates the graphical program based on the motion control sequence may be a self-contained program that includes all executable logic necessary for programmatically generating the new graphical program. In another embodiment, a client/server programming model may be utilized, in which the client portion creates and/or processes the motion control sequence information and determines the graphical program to be generated based on this information (i.e., determines the block diagram objects to be included in the program, the interconnections among these objects, etc.). The client portion may then call an API provided by the server portion to request the server portion to perform the actual creation of the graphical program, e.g., by creating files and/or other data structures representing the graphical program. The server portion may execute on the same computer system as the client portion or may execute on a different computer system, e.g., a different computer system connected by a network. In one embodiment, the server portion may be an instance of a graphical programming development environment application, which provides an API enabling client programs to programmatically create and/or edit graphical programs.

The program that generates the graphical program based on the motion control sequence may itself be constructed using any of various programming languages, methodologies, or techniques, e.g., may itself be a graphical program, may be a text-based program, or may be constructed using a combination of graphical and text-based programming environments.

Figure 7:
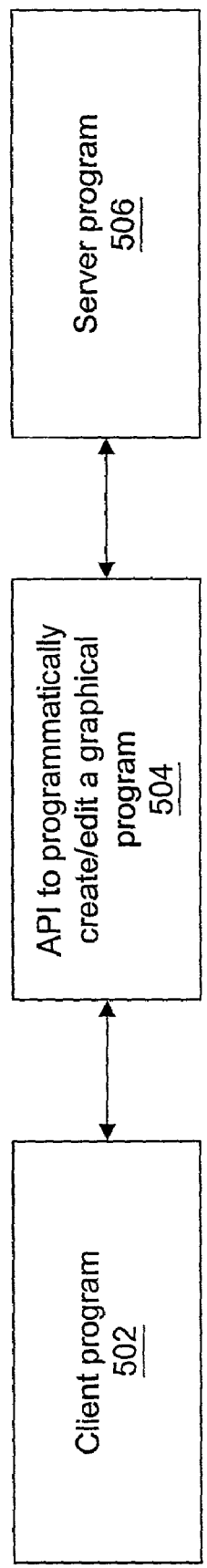
FIG. 7 is a block diagram illustrating the abstract relationship between a client program, an API to programmatically create/edit a graphical program, and a server program.
Figure 8A:
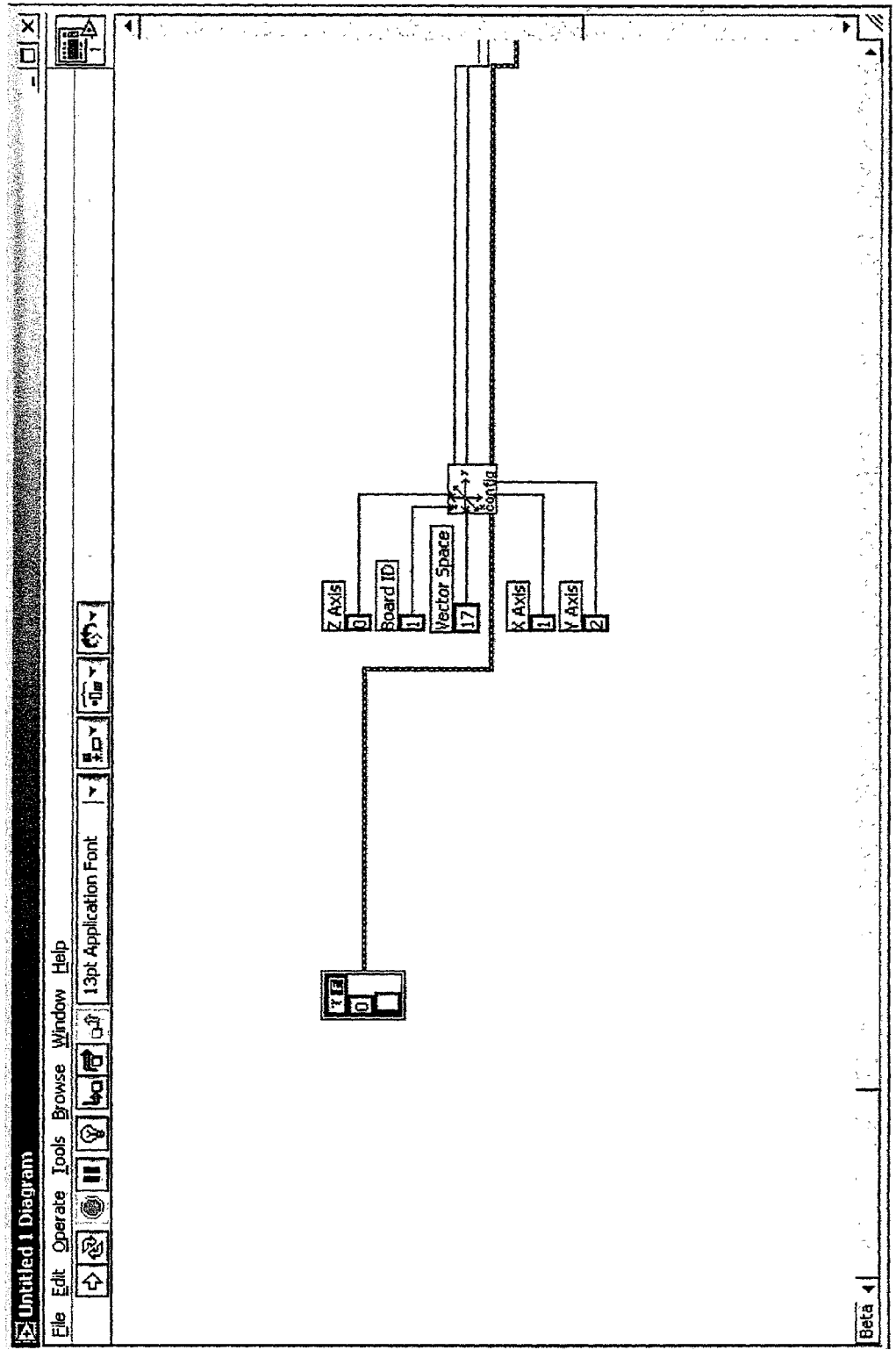
FIGS. 8A-8G illustrate a graphical program executable to implement the motion control sequence described with reference to FIGS. 6A-6F.
Figure 8B:
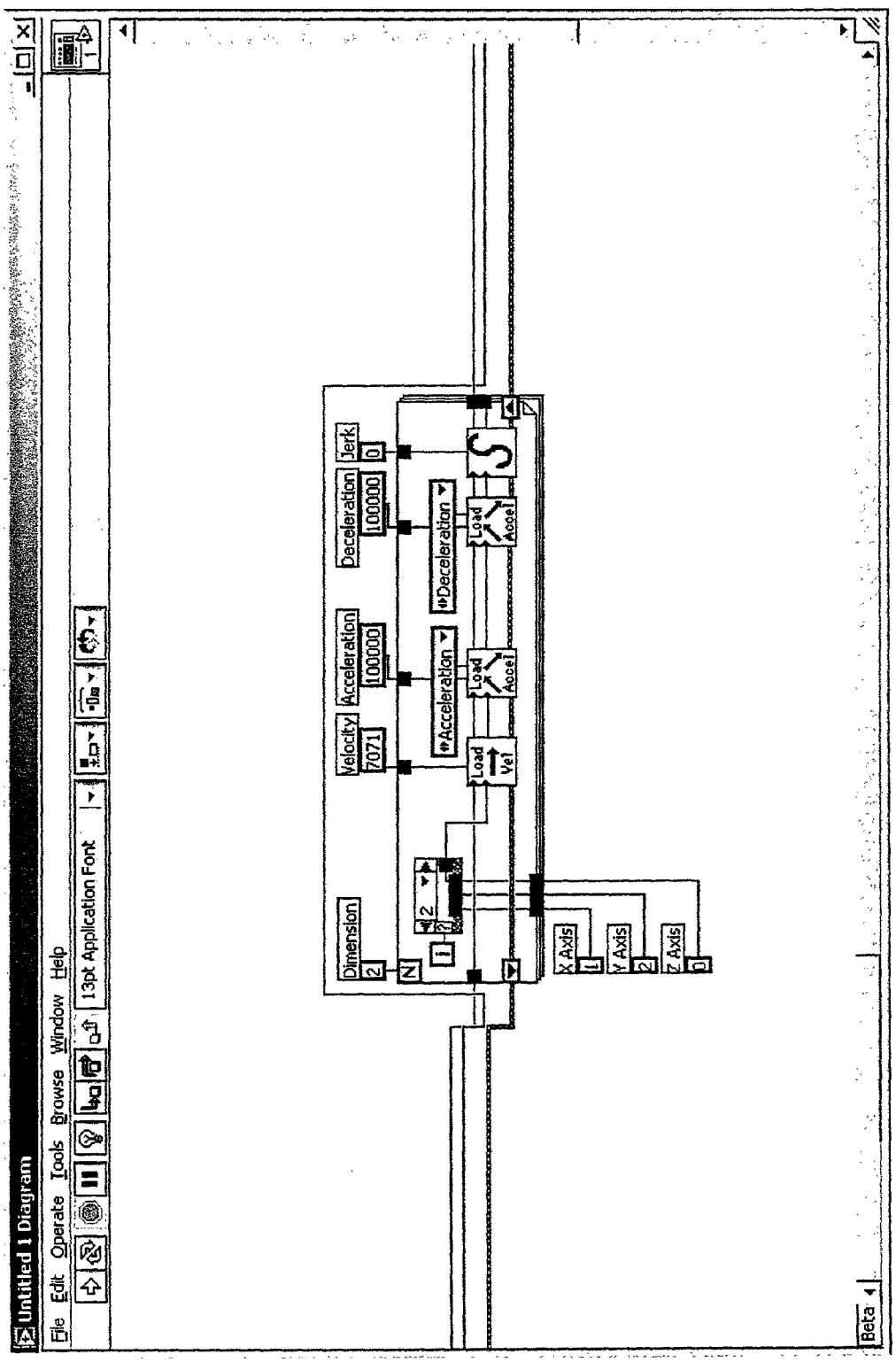
Figure 8C:
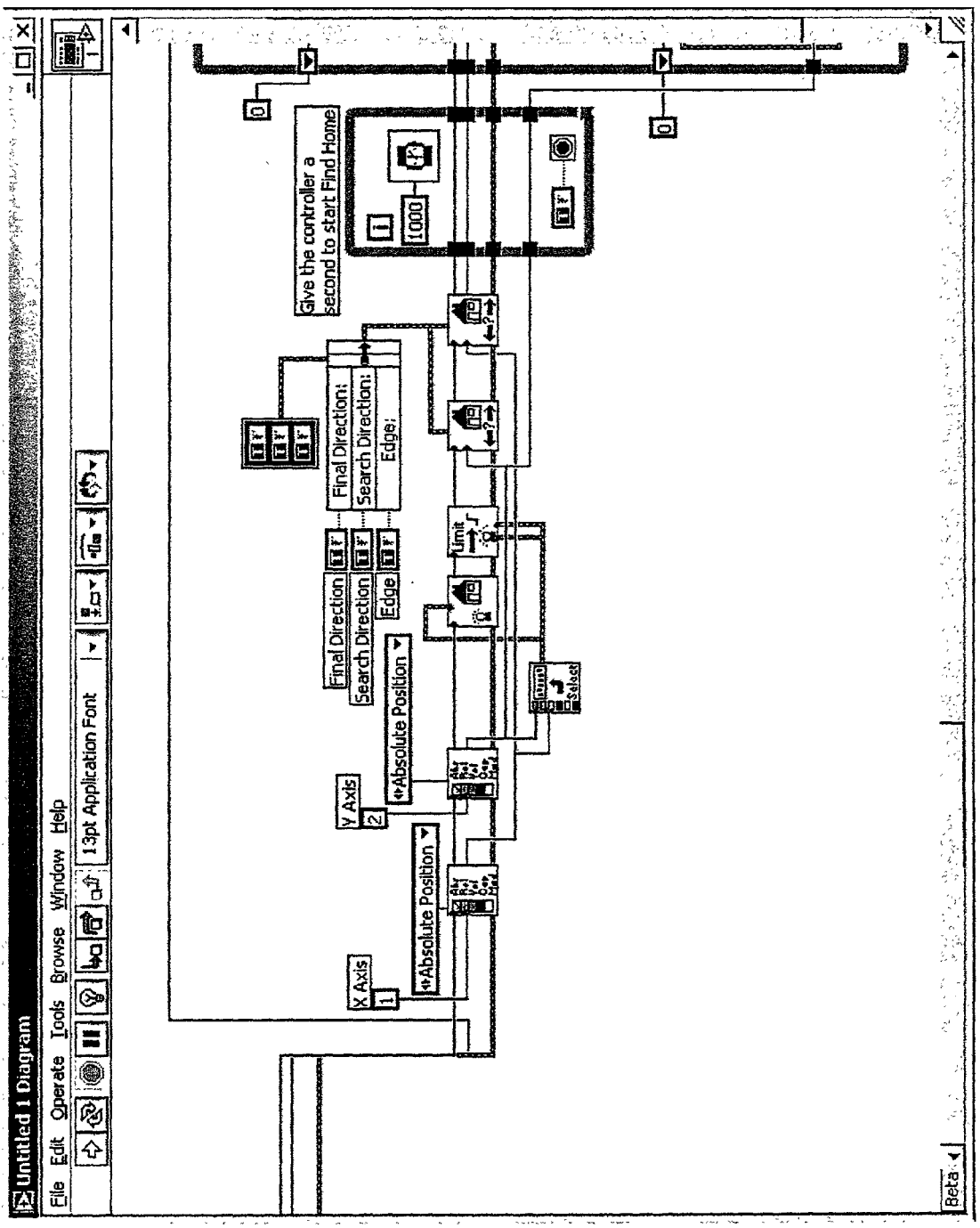
Figure 8D:
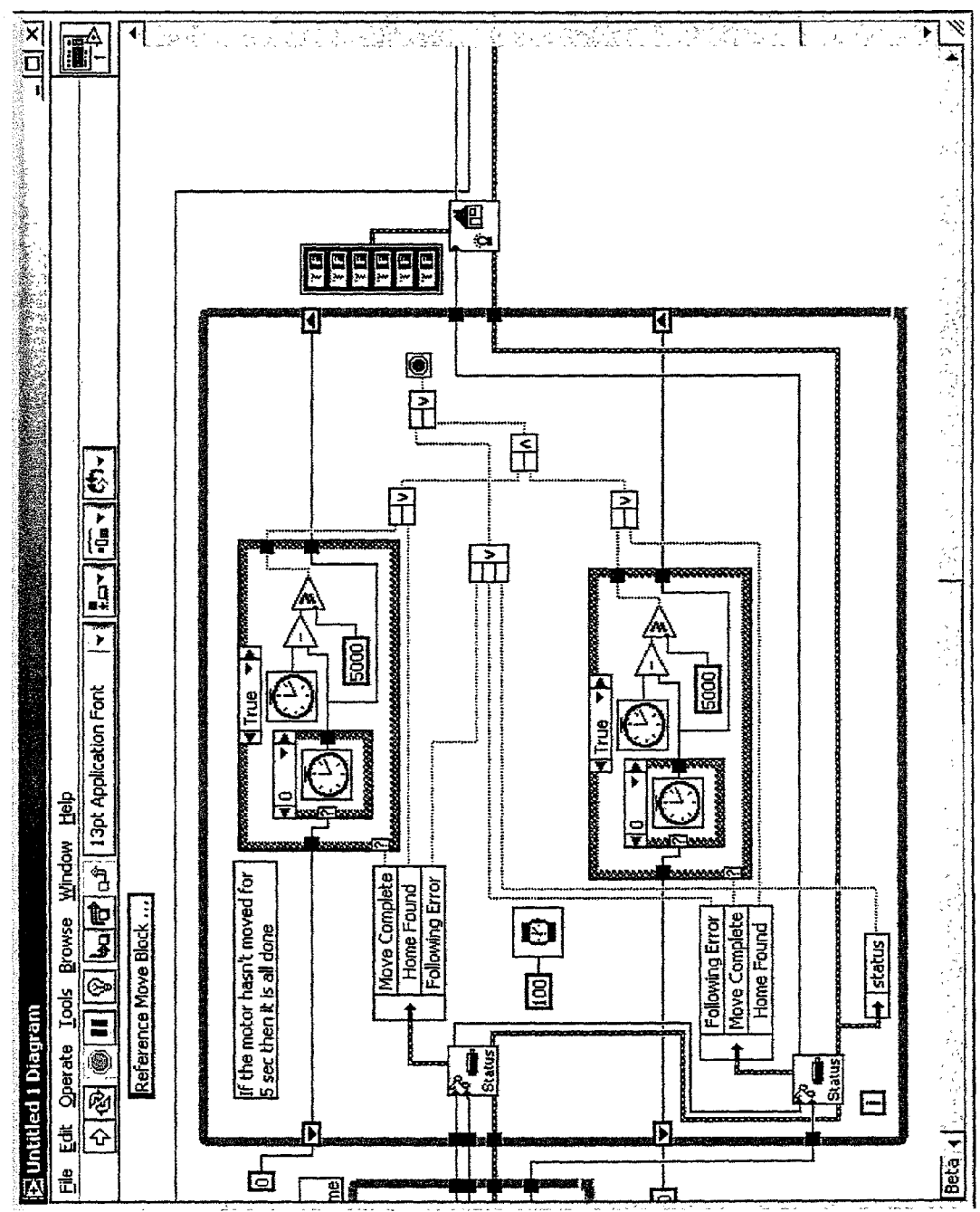
Figure 8E:
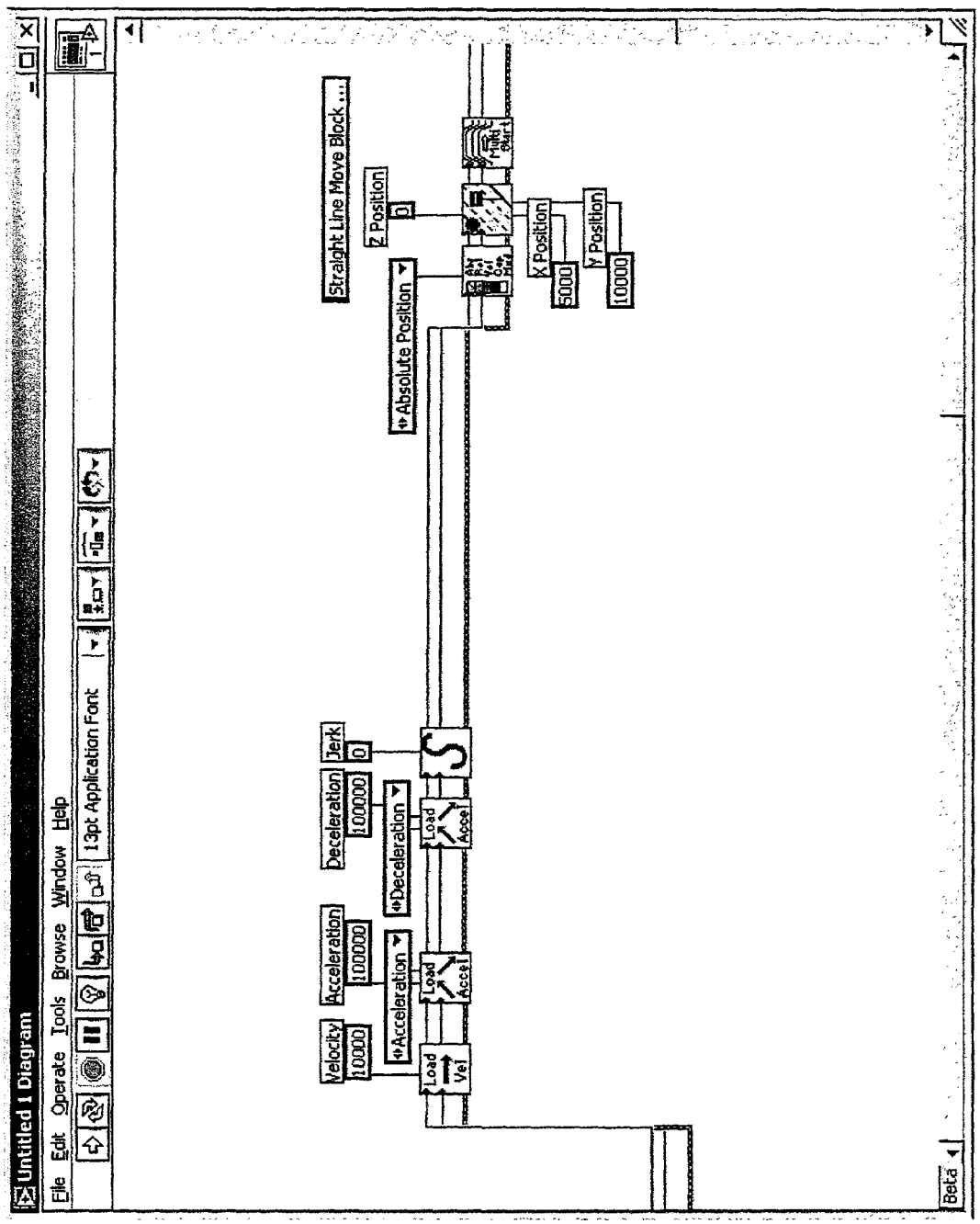
Figure 8F:
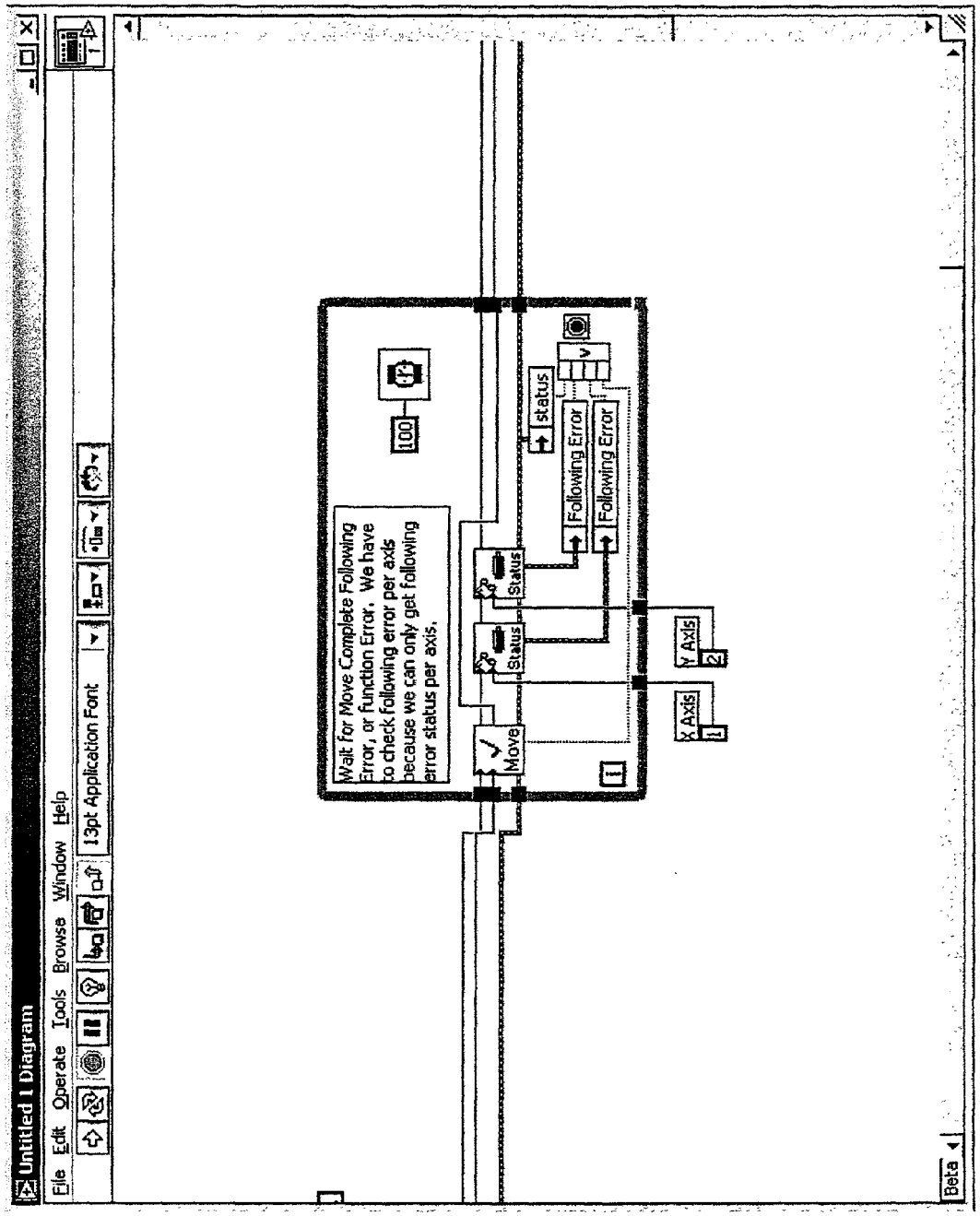
Figure 8G:
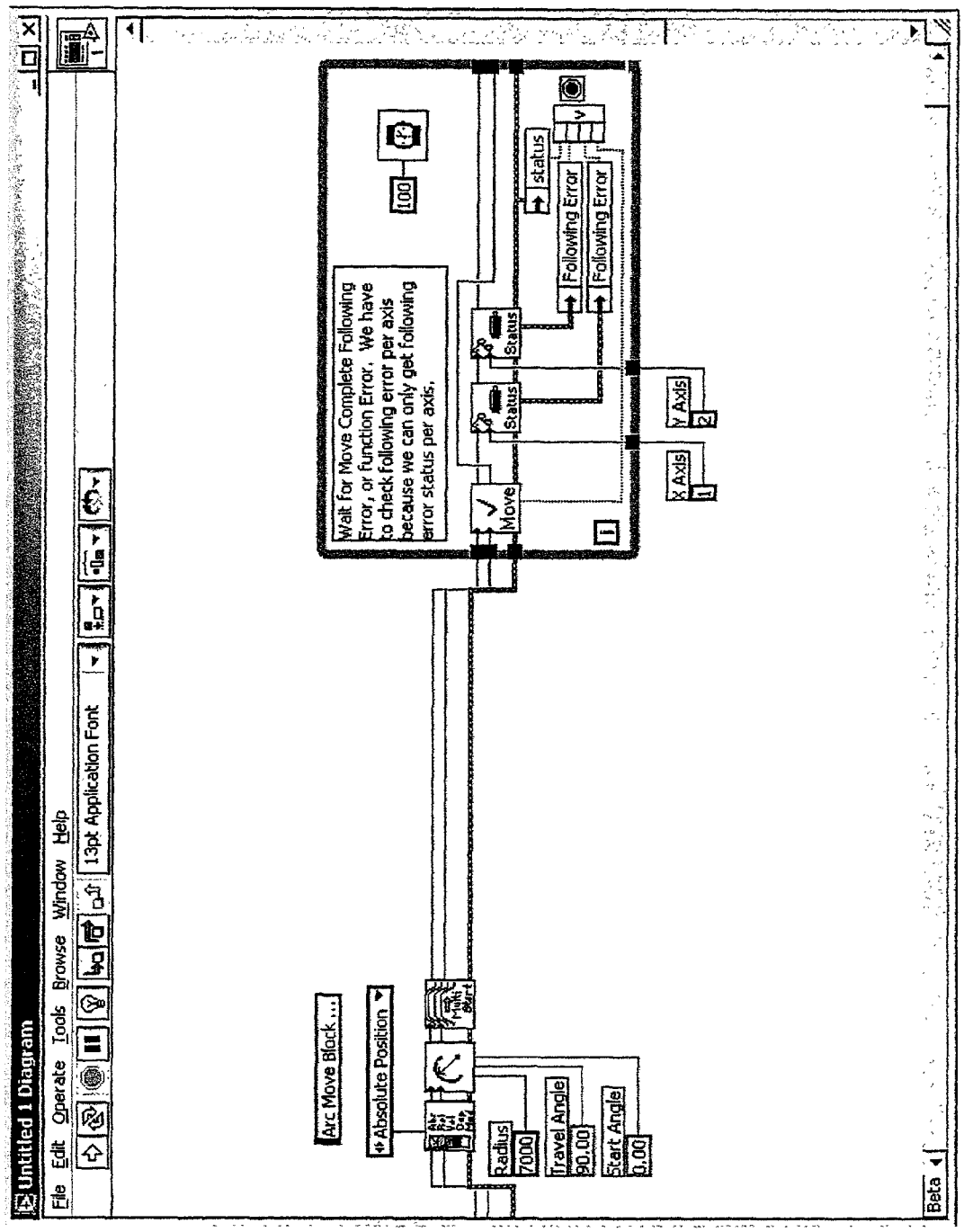

FIG. 7—Client/Server Implementation

As described above, in one embodiment, a client/server model may be utilized in programmatically generating a graphical program to implement a motion control sequence. The server program may provide an application programming interface (API) which the client program can use to programmatically generate the graphical program. One embodiment of such a client/server implementation is described below.

For each node, programmatic structure, user interface element, or other object of the graphical program, the client program may call the API to programmatically add the object to the graphical program, connect the object to other objects of the graphical program, etc. Any necessary files or other constructs needed by the graphical programming environment in order to use the generated graphical program may be automatically created by the server program as a result of calling the API.

FIG. 7 is a block diagram illustrating the abstract relationship between a client program 502, an API 504 to programmatically create/edit a graphical program, and a server program 506. It is noted that the API block represents the abstract notion of the API presented by the server program 506, and in various embodiments the API block 504 may not represent any actual code. Also, in actual embodiments, various layers may exist which implement the elements of the FIG. 7 relationship. For example, the client program 502 may be a part of a larger software application (e.g., the motion control prototyping environment application), the server program 506 may receive information sent by the client program 502 via an intermediate server, etc.

As noted above, the client program 502 may be any of various types of programs. For example, the client program 502 may be a graphical program. The client program 502 may also be a text-based program such as a C++ program, a Visual Basic program, a Java program, etc., or any combination of these or other languages. The client program 502 may execute independently or may execute within an execution subsystem of an application development environment.

The client program 502 may call the API 504 in any of various ways. For example, wherein the client program 502 comprises a graphical program, the client graphical program may include graphical nodes corresponding to the API 504. A client graphical program may also interface with text-based code which calls the API 504.

The client program 502 may also call the API 504 in various other ways. For example, the server program 506 may expose a component such as an ActiveX component, CORBA component, JavaBeans component, etc., and the client program 502 may obtain a reference to the object to invoke functions or methods of the API 504. The API 504 may also be integrated with the language or development environment of the client program 502, e.g., as a library.

Through the API 504, the client program 502 may communicate with the server program 506. The server program 506 is operable to perform the actions indicated by the API calls. For example, the server program may be operable to create a new graphical program, add objects to the graphical program, connect graphical program objects, etc. The API calls may also enable the client program 502 to request an existing graphical program to be modified. Thus, in one embodiment, in response to the user editing an existing motion control sequence, a graphical program corresponding to the motion control sequence may be programmatically modified to reflect the changes.

LabVIEW API

The server program 506 of FIG. 7 is preferably an instance of a graphical programming development environment. In one embodiment, the server program 506 is an instance of the LabVIEW graphical programming development environment.

The LabVIEW environment provides specialized support for developers of instrumentation and industrial automation applications, and a LabVIEW graphical program may be referred to as a "virtual instrument" or "VI". The LabVIEW environment comprises functionality referred to as "VI Server" which enables client programs to communicate with the LabVIEW environment. The VI Server functionality enables client programs to create or edit a LabVIEW graphical program or VI.

A client program which requests LabVIEW to generate/edit a VI may itself be a graphical program or VI. A client VI may include particular nodes in the client VI block diagram which utilize the VI Server functionality of a LabVIEW instance to request the LabVIEW instance to obtain information of an existing VI, create a new VI, add objects to the VI, etc. These nodes and exemplary uses of the nodes are described in U.S. patent application Ser. No. 09/745,023, titled "System and Method for Programmatically Generating a Graphical Program in Response to Program Information", which was incorporated by reference above.

LabVIEW also provides components such as ActiveX components which enable text-based programs, such as Visual Basic programs, Visual C++ programs, etc., to access the VI Server functionality. In the preferred embodiment, these components enable text-based client programs to perform all of the VI server functions that graphical client programs can perform.

FIGS. 8A-8G: Example of Programmatically Generated Graphical Program

As described above, in various embodiments, the programmatically generated graphical program may be associated with any of various graphical programming development environments, and the graphical source code included in the graphical program may vary depending on the particular development environment. FIGS. 8A-8G illustrate exemplary graphical source code which may be programmatically generated for the LabVIEW graphical programming development environment. These figures illustrate a graphical program executable to implement the motion control sequence described above with reference to FIGS. 6A-6F. (FIGS. 8A-8G illustrate a single graphical program, but the size of the program requires it to be separated into multiple drawings.) For more information on the operation of the illustrated LabVIEW graphical source code, please refer to the LabVIEW user documentation, available from National Instruments Corp., which is hereby incorporated by reference.

Stepwise Programmatic Generation of a Graphical Program

In one embodiment, a graphical program may be programmatically generated from a completed motion control sequence. For example, after the user has created the motion control sequence within the motion control prototyping environment and configured the sequence as desired, the user may request a graphical program implementing the sequence to be programmatically generated.

Figure 9:
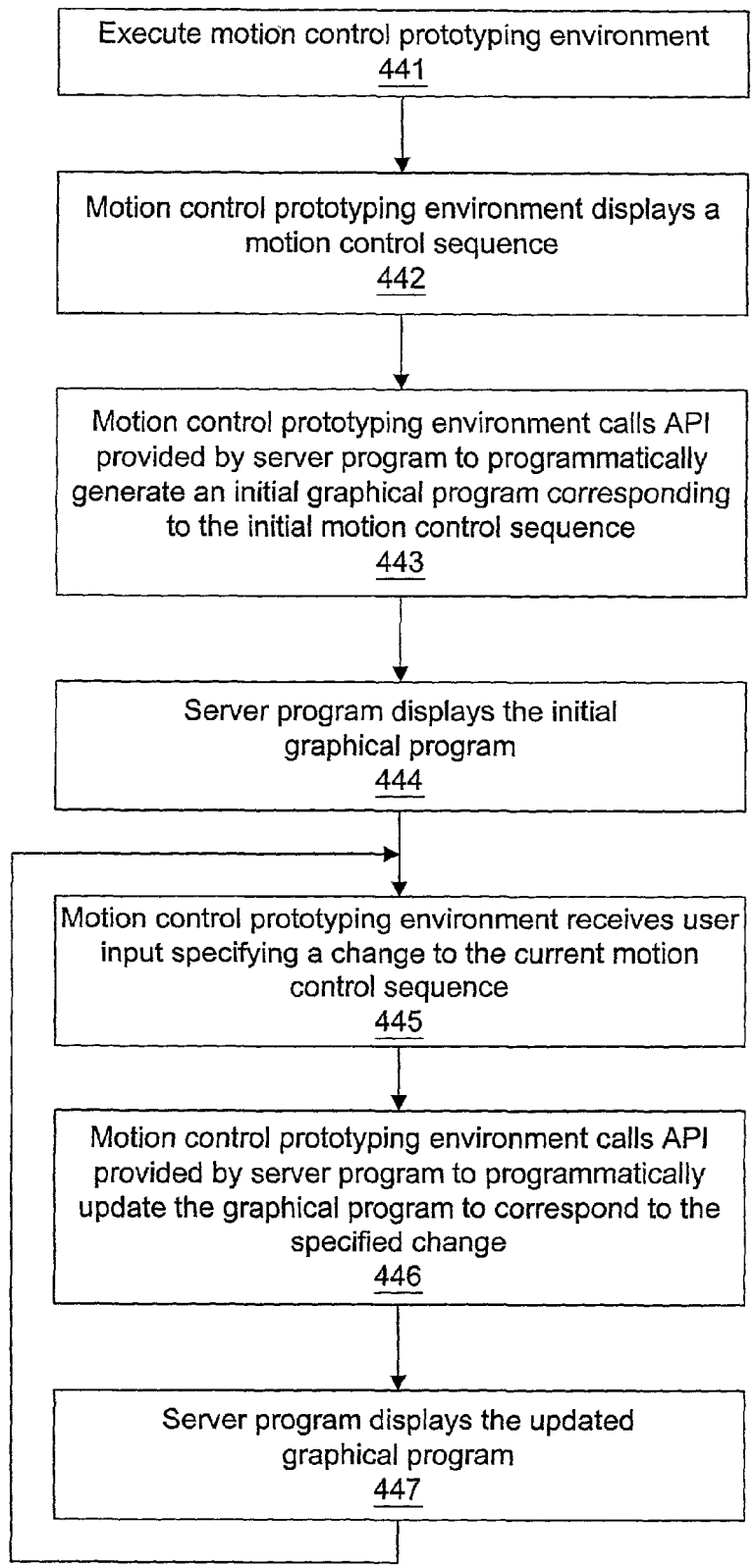
FIG. 9 is a flowchart diagram illustrating one embodiment of a method for dynamically (programmatically) updating a graphical program as a user interactively changes a motion control sequence on which the graphical program is based.

In another embodiment, a graphical program may be programmatically generated and updated as the motion control sequence is being constructed. In other words, for each interactive change that a user makes to the motion control sequence, the graphical program may be updated to reflect this change. FIG. 9 is a flowchart diagram illustrating one embodiment of a method for dynamically (programmatically) updating a graphical program as a user interactively changes a motion control sequence on which the graphical program is based.

In step 441, a motion control prototyping environment may be executed. As described above, the motion control prototyping environment may enable the user to interactively create and configure a motion control sequence. The motion control prototyping environment may include a graphical user interface that displays the current state of the motion control sequence as the sequence is constructed.

In step 442, the motion control prototyping environment may display an initial motion control sequence. For example, when the motion control prototyping environment first launches or when the user requests to create a new motion control sequence, the prototyping environment may display an initial motion control sequence. For example, this initial motion control sequence may simply be empty, having no included motion control operations, or may include one or more default operations, such as a reference operation to establish home and index. The user may then add and configure desired operations to the sequence.

In step 443, the motion control prototyping environment may call an API provided by a server program to programmatically generate an initial graphical program corresponding to the initial motion control sequence. As described above, the server program may be a graphical programming development environment application. In addition to programmatically generating the initial graphical program, the server program may also be operable to display the initial graphical program, e.g., in a separate window, as shown in step 444. Thus, a user constructing a new motion control sequence via the motion control prototyping environment may be able to view the initial graphical program corresponding to the initial motion control sequence. Where the initial motion control sequence in the motion control prototyping environment is simply empty, the graphical program may also be empty. For example, the server program may simply display a blank block diagram window for the graphical program. Where the initial motion control sequence includes one or more operations, graphical program nodes corresponding to these operations may be displayed.

In step 445, the motion control prototyping environment may receive user input specifying a change to the current motion control sequence. Various types of possible changes include: adding a new motion control (or MC/MV/DAQ) operation to the sequence, deleting an existing motion control operation from the sequence, changing properties of a motion control operation in the sequence, etc.

In step 446, in response to the motion control sequence change performed in step 445, the motion control prototyping environment may programmatically update the graphical program to correspond to the specified change, e.g., by calling an API of the server program to perform the update. Thus, the API may enable not only the creation of a new graphical program, but may also allow modifications to an existing graphical program.

In step 447, the server program may display the updated graphical program (or may re-display the updated graphical program in an existing window). Thus, as the user interactively changes the motion control sequence, the corresponding graphical program may be automatically changed also, such that the user can immediately see the results of the change. As indicated by the flowchart loop from step 447 to step 445, the process of the user changing the motion control sequence and automatically updating the graphical program in response may be an iterative process.

Programmatically Modifying a Graphical Program

After a graphical program to implement a motion control sequence has been generated, the user may desire to modify the motion control sequence. The generated graphical program may then be updated in response. In one embodiment, the existing graphical program may simply be discarded, and a new graphical program may be generated based on the updated sequence. However, in another embodiment, the existing graphical program may be programmatically modified to reflect the change made to the motion control sequence. For example, if the user has made changes or additions to the graphical program, it may be advantageous to programmatically modify the affected portion of the graphical program, preserving the user's changes. Also, the ability to programmatically modify the graphical program may be useful for interactive stepwise creation of the graphical program, such as described above with reference to FIG. 9.

Programmatic modification of a graphical program may be performed similarly as programmatic generation of a graphical program, e.g., by calling an API of a server program operable to perform specified modifications. For example, the API may enable a client to request that objects be added to or deleted from the graphical program, to request that connections between graphical program nodes be changed, to request that various properties of objects in the graphical program be changed, etc.

As described above, after a graphical program has been generated based on a motion control sequence, the user may modify the generated program code as desired, e.g., to develop a customized or optimized motion control application. For example, the user may utilize a separate graphical programming development environment to interactively modify the generated program.

In one embodiment, a programmatically generated graphical program may be "locked", requiring the user to explicitly unlock the graphical program before any modifications to the graphical program can be made within the graphical programming development environment (or before certain portions of the graphical program can be interactively modified). Locking the graphical program may ensure that the program's graphical source code is in a state known to or expected by the motion control prototyping environment, thus facilitating programmatic modification of the graphical program.

If the user desires to modify the generated graphical program, the user may request to unlock the graphical program. However, in certain implementations, doing so may break the association between the motion control sequence and the graphical program, such that the graphical program can no longer be automatically updated in response to a change to the motion control sequence.

Figure 10:
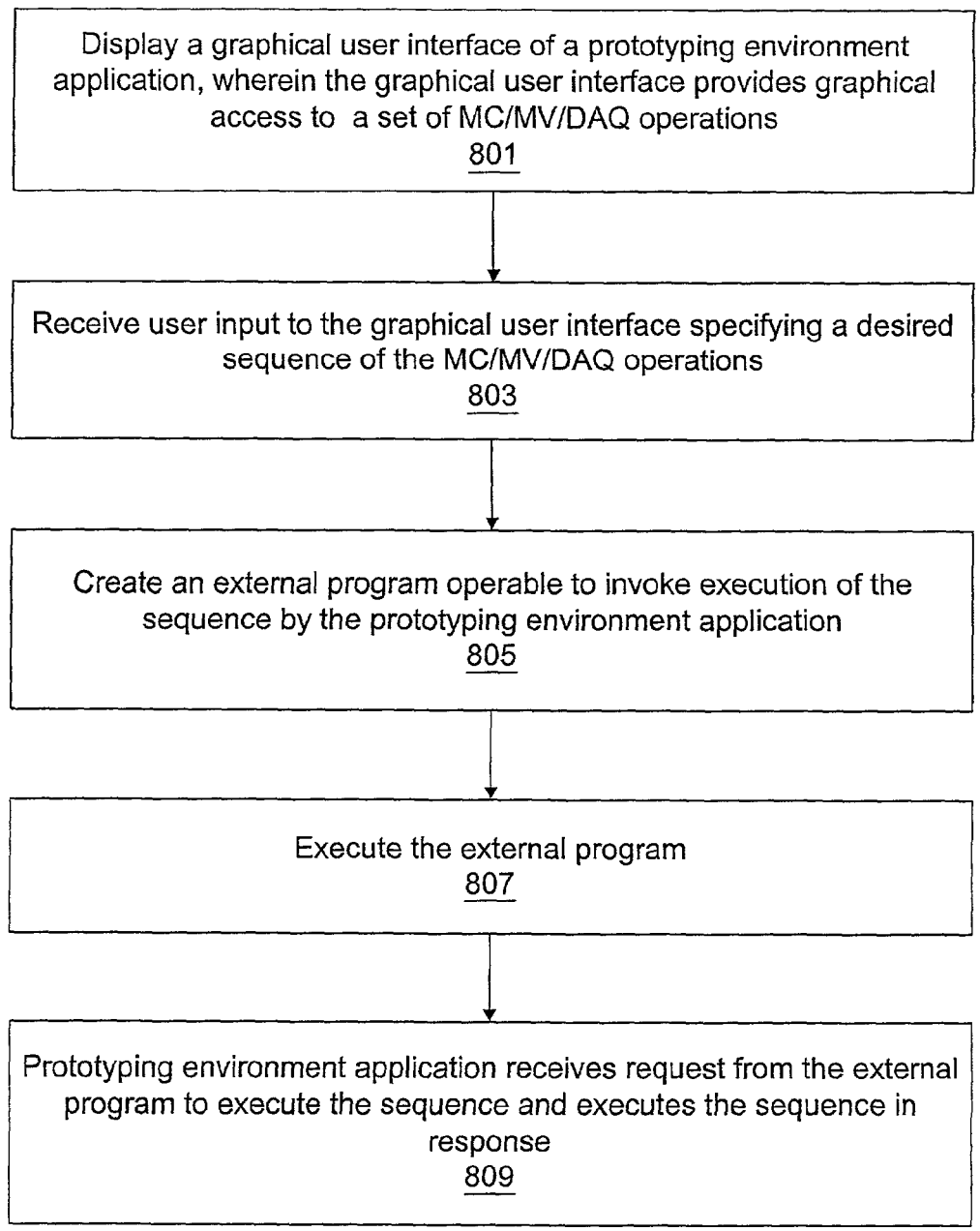
FIG. 10 is a flowchart diagram illustrating one embodiment of a method for invoking execution of a sequence created in a prototyping environment application from an external program.

FIG. 10—Invoking Execution of a Sequence from an External Program

As discussed above with reference to FIG. 4, in one embodiment, the user may desire to integrate a MC/MV/DAQ sequence with other program code, but may not necessarily want to generate a separate program implementing the sequence. For example, the user may desire to perform "black box execution" of the sequence, wherein a user-created program invokes execution of the sequence, but the sequence executes under control of the prototyping environment application. FIG. 10 is a flowchart diagram illustrating one embodiment of a method for invoking execution of a sequence created in a prototyping environment application.

In step 801, a graphical user interface of the prototyping environment application may be displayed, wherein the graphical user interface provides graphical access to a set of MC/MV/DAQ operations, as described above.

In step 803, user input specifying a desired sequence of the MC/MV/DAQ operations may be received to the graphical user interface, as described above.

In step 805, the user may create an external program operable to invoke execution of the sequence by the prototyping environment application. In various embodiments, the user may create any of various types of programs, including a graphical program or a text-based program. For example, in one embodiment the external program may be created using a text-based application development environment (ADE) such as Visual Basic, Visual C++, a Java ADE, or any of various others. In another embodiment the external program may be created using a graphical programming development environment such as LabVIEW, VEE, Simulink, or any of various others.

The prototyping environment application may provide an application programming interface (API) which enables the external program to invoke execution of a particular sequence. For example, in the case of a graphical program, the user may include a node in the graphical program and configure the node with information identifying the sequence of operations, e.g., a name or filename of the sequence. During execution of the graphical program, the node may be operable to call the prototyping environment application to request the prototyping environment application to execute the sequence. In another embodiment, the prototyping environment application may be operable to programmatically, i.e., automatically, generate a graphical program that is operable to invoke execution of the sequence. For example, the programmatically generated graphical program may include a node configured to call the prototyping environment application, similarly as if the graphical program were created by a user as described above.

In the case of a text-based program, the user may include an API function or method call in the program and may configure the function or method with information, e.g., a parameter, specifying the desired sequence to invoke, such as a name or filename of the sequence. In another embodiment, the prototyping environment application may be operable to programmatically, i.e., automatically, generate a text-based program that is operable to invoke execution of the sequence. For example, the programmatically generated text-based program may include a function or method configured to call the prototyping environment application, similarly as if the text-based program were created by a user as described above.

In step 807, the external program may be executed. Executing the external program may comprise executing the function or method (or node) operable to request execution of the sequence.

In step 808, the prototyping environment application may receive the request from the external program to execute the sequence and may execute the sequence in response. Thus, the user may create an external program operable to perform any of various functionality, including functionality that is not available from within the prototyping environment application. However, the prototyping environment application may still control execution of the sequence. In various embodiments, the sequence may execute either synchronously or asynchronously with respect to the external program.

Figure 11:
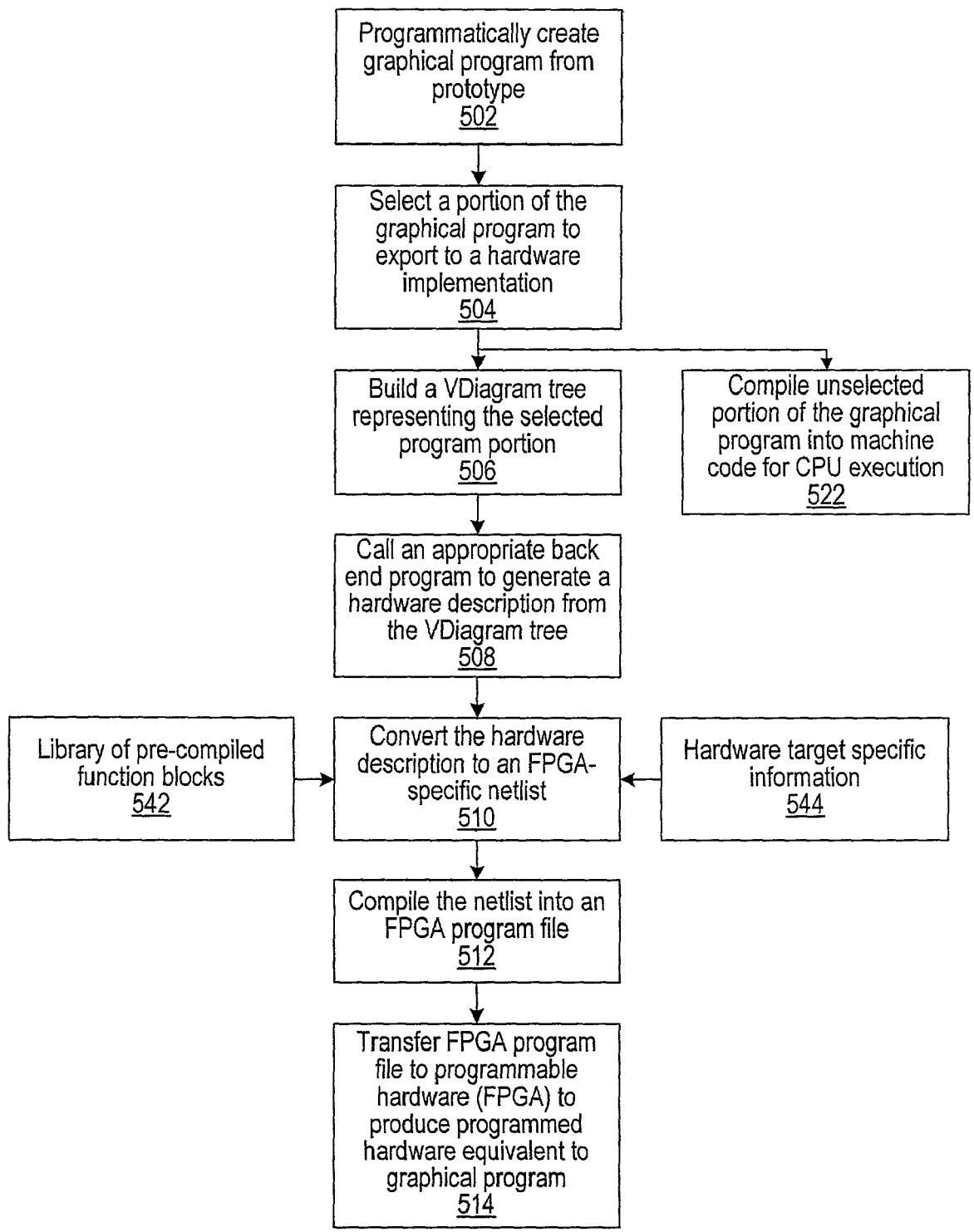
FIG. 11 is a flowchart diagram illustrating one embodiment of a method for programming an FPGA device to perform a motion control sequence.

FIG. 11—Executing a Sequence on an Embedded Device

In some cases it may be desirable to perform a motion control sequence that was developed in the motion control prototyping environment on an embedded device. FIG. 11 is a flowchart diagram illustrating one embodiment of a method for programming an FPGA device to perform a motion control sequence. For example, configurable hardware of the embedded device may be configured to perform the motion control operations included in the sequence. The configurable hardware may include any type of configurable logic or programmable hardware, such as FPGA hardware. In one embodiment, the embedded device may comprise a motion control device including configurable hardware which may be programmed to perform motion control operations included in the motion control sequence. For example, the motion control devices involved in performing the example Use Cases described above could be configured to perform motion control sequences as onboard programs.

The programmed hardware may be operable to perform the motion control sequence just as if the hardware were being controlled by a program executing on an external computer system coupled to the hardware. However, hardware programmed with an onboard program may be operable to perform the sequence at speeds far exceeding that of traditional general-purpose processor platforms.

In one embodiment, program code may first be programmatically generated based on the sequence, and this program code may then be converted to a format that can be used to program the embedded device hardware. In one embodiment, the program code that is programmatically generated may comprise a graphical program (step 405B of FIG. 4). In another embodiment, the program code that is programmatically generated may comprise a text-based program (step 405C of FIG. 4).

As discussed above, prototyping environments may be used to develop prototypes to solve problems related to any of various types of other applications, in addition to motion control. Thus, the method of FIG. 11 is not limited to motion control sequences, and may be used to program embedded hardware according to any of various kinds of prototypes developed in any of various prototyping environments.

As shown in step 502, a graphical program may first be programmatically, i.e., automatically, generated from the prototype, e.g., after the user has developed the prototype in the prototyping environment. For example, programmatic generation of a graphical program based on a motion control sequence is discussed above. In the preferred embodiment, the graphical program comprises a graphical data flow diagram which included interconnected nodes or icons visually indicating functionality of the program. This graphical data flow diagram may be directly compilable into machine language code for execution on a computer system.

When the user is ready to execute the program on FPGA hardware, the user may instruct the system to compile the design for the FPGA hardware. Unfortunately, some graphical programming constructs may not be efficiently implemented in FPGA hardware. For example, file I/O is a task that is usually better left to the general-purpose host processor. Thus, in one embodiment, the program may be bisected into hardware portions and software portions.

In step 504, the user may select a first portion of the graphical program for conversion to a hardware implementation. This first portion of the graphical program which is desired for hardware implementation preferably comprises portions of the graphical program, e.g., particular subprograms, which require a fast or deterministic implementation and/or are desired to execute in a stand-alone hardware unit. In general, portions of the graphical program which are desired to have a faster or more deterministic execution are selected in step 504 and converted into the hardware implementation in steps 506-514.

In step 522 the remaining portions of the graphical program which were not selected in step 504 may be compiled into machine code for execution on a CPU, such as the host CPU in the computer 82 of FIGS. 2A and 2B. The first portion of the program selected in step 504 preferably excludes program portions involving supervisory control and display. This enables the supervisory control and display portions to execute on the host CPU, which is optimal for these elements of the program.

In one embodiment, during creation of the prototype in the prototyping environment, the user may specify portions of the prototype which are to be exported to the hardware description format for conversion into a hardware implementation. For example, for a motion control sequence, the user may specify properties of one or more of the motion control operations which indicate that the operations are to be converted to the hardware implementation. In another embodiment, the user may select which portions to export to the hardware implementation at the time when the conversion process is initiated. In another embodiment, the entire graphical program is selected for conversion to a hardware implementation, and thus step 522 is not performed.

In step 506 the graphical program portion selected in step 504 may first be processed to create an abstract hardware graph called a VDiagram tree which serves as an intermediate data structure. The VDiagram tree may contain a complete hardware representation of the program, but may not be specific to any hardware description language. For example, the VDiagram tree may comprise data structures representing hardware signals that implement the data flow within the graphical program, as well as data structures representing hardware signals that are added to preserve the proper execution flow (enable signals). For more information related to the VDiagram tree, please refer to the U.S. patent application Ser. No. 09/499,503, which is incorporated by reference.

In step 508, a back end program may be called to parse the VDiagram tree and generate a hardware description from it. The back end may translate the information contained in the VDiagram tree into a specific hardware description language. For example, a VHDL back end may be called to generate a VHDL file or set of files describing the program. The generated hardware description may comprise a high-level hardware description of function blocks, logic, inputs, and outputs which perform the operation indicated by the portion of the graphical program selected in step 504.

Various types of back end programs may be present. Back end programs may generate software source code descriptions as well as hardware description language descriptions. For example, in addition to the VHDL back end, an EDIF back end may generate one or more EDIF files, and a C back end may generate one or more C files. These three back ends are representative only. Other back ends may generate other types of descriptions for the program. For example, a Verilog back end may generate a Verilog file for the program. Also, more than one back end may be called to generate different program descriptions. In the preferred embodiment, a VHDL back end generates a VHDL description which may then be compiled and used to program a programmable logic device such as an FPGA.

In step 510, the method may operate to convert the hardware description into an FPGA-specific netlist. The netlist may describe the components required to be present in the hardware as well as their interconnections. Conversion of the hardware description into the FPGA-specific netlist is preferably performed by any of various types of commercially available synthesis tools, such as those available from Xilinx, Altera, etc.

In one embodiment, the converting step 510 may utilize one or more pre-compiled function blocks from a library of pre-compiled function blocks 542. Thus, for certain function blocks which are difficult to compile, or less efficient to compile, from a hardware description into a netlist format, the hardware description created in step 508 may include a reference to a pre-compiled function block from the library 542. Alternatively, hardware implementations for all of the function blocks may be included in the function library. The respective pre-compiled function blocks may then be simply inserted into the netlist in place of these references in step 510. Also, in one embodiment, hardware target specific information 544 may be used by step 510 in converting the hardware description into a netlist which is specific to a certain type or class of FPGA.

In step 512, the method may operate to compile the netlist into an FPGA program file, also referred to as a software bit stream. The FPGA program file may comprise a file that can be readily uploaded to program an FPGA.

After the netlist has been compiled into an FPGA program file in step 512, then in step 514 the method may operate to transfer the FPGA program file to the FPGA, to produce a programmed hardware equivalent operable to perform at least a portion of the application specified by the prototype. In the preferred embodiment, the hardware description is passed transparently through the FPGA vendor's synthesis tools. Because the vendor's tools may take a considerable amount of time to process the design and generate a programming bitstream, it is recommended that this only be done after the design has been debugged using traditional software-compilation techniques.

Thus, upon completion of step 514, the portion of the graphical program referenced in step 504 may be comprised as a hardware implementation in an FPGA or other programmable hardware element. If a portion of the graphical program executes on the host CPU, then the graphical programming system with which the graphical program is associated may coordinate data flow between the FPGA and the host CPU. For example, if a LabVIEW graphical program was programmatically generated from the prototype in step 502, then the LabVIEW graphical programming system may perform this coordination. (A version of LabVIEW called FPGA LabVIEW is designed to work with FPGA devices.)

It is noted that various of the above steps can be combined and/or can be made to appear invisible to the user. For example, steps 510 and 512 can be combined into a single step, as can steps 502-510. In the preferred embodiment, after the user creates the prototype, the user simply selects a hardware export option and indicates the hardware target or destination, causing steps 502-514 to be automatically performed.

In one embodiment, it may be desirable to perform a sequence developed in the prototyping environment on multiple embedded devices. As described above, a MC/MV/DAQ sequence may include different types of operations such as motion control, machine vision, DAQ, and/or other types of operations. In one embodiment, different types of operations in the sequence may be performed on different embedded devices. For example, configurable hardware of a motion control device may be programmed to perform motion control operations of the sequence, while configurable hardware of a DAQ device may be programmed to perform DAQ operations of the sequence. The method may automatically partition the sequence so that the operations are performed on the appropriate devices, or the user may specify the partitioning among the devices.

FIG. 11 applies to the preferred embodiment in which the programmable hardware element is an FPGA. However, the same or similar steps may be applied to convert a prototype into a hardware implementation for other types of programmable or (re)configurable hardware, such as a CPLD.

Component Implementation

A high-level user application for prototyping motion control sequences, referred to as a motion control prototyping environment, is described above. In one embodiment, the user may desire to create a motion control sequence from within an application development environment (ADE) that the user is accustomed to, such as Visual Basic. However, the user may still desire to be able to define the motion control sequence at a high level using a graphical user interface. This section describes a set of ActiveX components which enable a user to create a motion control sequence similarly as for the motion control prototyping environment described above. These components may be used within any of various kinds of ActiveX containers. The components may enable the user to:

Group a set of axes into a motion task and specify multiple moves that execute in a sequence.

Use interactive property pages to quickly configure moves, including point-to-point, helical arc, circular arc, spherical arc, and velocity moves.

Set task and move breakpoints and captures.

Use advanced motion functionality, including contour moves, buffered position breakpoints, and buffered high-speed captures.

NIMotionMove

A move specifies the trajectory parameters that describe how a set of axes go from a starting position to a destination. The NIMotionMove object contains all of the characteristics of a move. The NIMotionMove object includes a move type and all of the properties associated with the move type. With the NIMotion control, the user can configure many different types of moves. The type of move chosen determines the properties the user must set for that move. For example, the user can define the move type as point-to-point and then set the position, acceleration, deceleration, and maximum velocity for the move. The following table includes more information about move types and associated properties.

| Move Type | Number of Axes | Description | Properties |
|---|---|---|---|
| Point-to-Point Move | 1,2, or 3 | Move from a starting position to a target position. | Position, PositionMode, PositionModulus, Velocity, Acceleration, Deceleration, and Scurve |
| Circular Arc | 2 | Move using circular interpolation in the xy plane. | Radius, StartAngle, TravelAngle, Velocity, Acceleration, Deceleration, and Scurve |
| Helical Arc | 3 | Move that defines a circular arc in the xy plane with synchronized linear travel along the z axis. | Radius, StartAngle, TravelAngle, LinearTravel, Velocity, Acceleration, Deceleration, and Scurve |
| Spherical Arc | 3 | Move that defines a circular arc rotated through an angle about the x and y axes. | Radius, StartAngle, TravelAngle, Velocity, PlanePitch, PlaneYaw, Acceleration, Deceleration, and Scurve |

-continued

| Move Type | Number of Axes | Description | Properties |
|---|---|---|---|
| Velocity Move | 1 | Move at a constant velocity. | Velocity, Acceleration, Deceleration, and Scurve |
| Contour Move | 1,2, or 3 | Move of arbitrary position data that is splined to create a single move. | ContourData, ContourInterval, ContourMode, TotalPoints, Velocity, Acceleration, Deceleration, and Scurve |

NIMotionTask

The NIMotionTask object includes a collection of one or more axes and a collection of one or more moves. The number of axes specified determines the types of moves the user can use. A sequence includes two or more moves within a task. Depending on the type of task selected, the user can create sequences that include different types of moves.

To illustrate tasks and sequences, consider an assembly line machine that cuts out a part with specific dimensions. Each finished piece must be the exact same size and shape, and the machine must quickly repeat the operation continuously. With the NIMotion control, the user can create a task that contains the precise sequence of moves necessary to cut out the part and configure the task to repeat a specific number of times.

Motion tasks can be of three types—complete moves, blended moves, and velocity move. The user uses a complete move if the task contains a single move or a sequence in which the next move in the sequence is sent to the motion controller and starts when the previous move is completed. The user uses a blended move if the task contains a sequence and the user wants the motion controller to blend the deceleration portion of the previous move with the acceleration portion of the next move to create the trajectory profile. The user uses a velocity move to move along a single axis at a constant velocity. During a velocity move, the user can change the Velocity, Acceleration, or Deceleration properties and call the Start method to update the move.

Example

Configuring a Task

In this example, the user configures a motion task in Visual Basic having one axis and one move. By default, the NIMotion control contains a task with one move and one axis.

1. The user places the NIMotion control on the Visual Basic form. The user right clicks the control and selects Properties to configure the move type, destination, and velocity of the move.

2. The user right clicks the NIMotion control and selects Properties. On the Tasks property page, the user chooses his controller from the pulldown menu.

3. The user sets Number to an axis number that is valid for his motion controller.

4. The user sets Type to Complete moves and accept the Units default value of counts/s.

Figure 12:
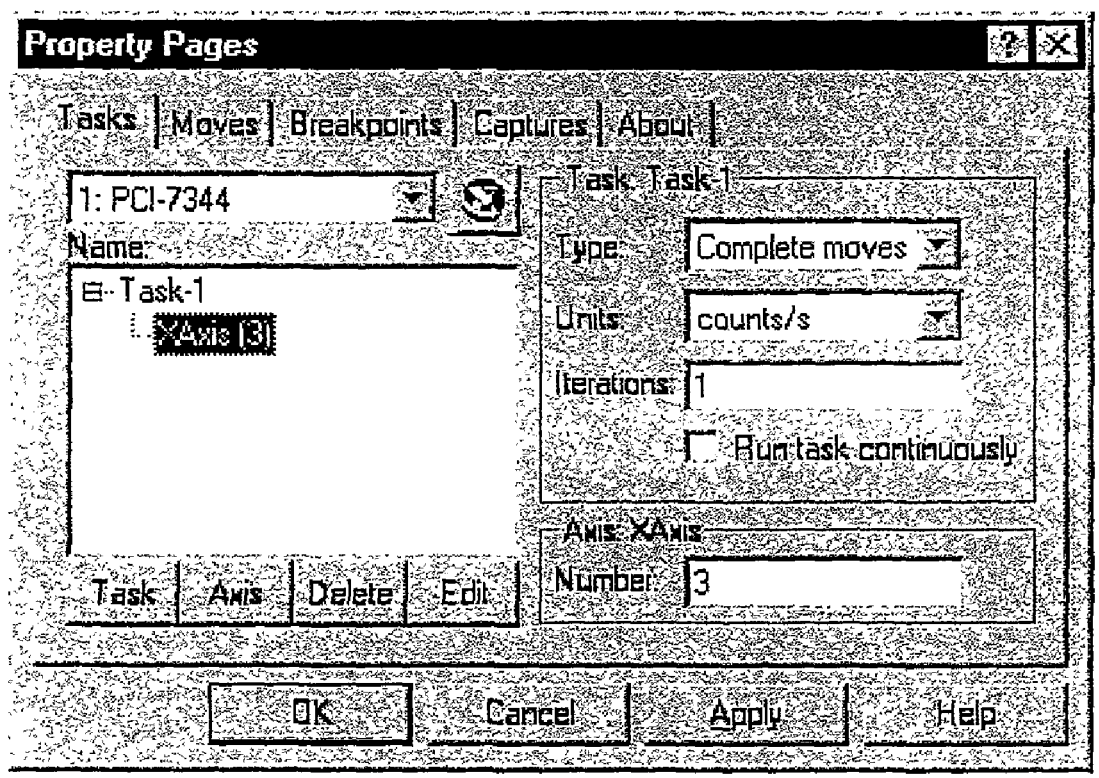
FIGS. 12-16 illustrate an exemplary graphical user interface and property pages associated with a set of ActiveX components which are useable for creating a motion control sequence.

5. The user uses the default values of all other properties on the page, as shown in FIG. 12.

Example

Creating a Point-to-Point Move

In this example, the user creates a point-to-point move.

1. On the Moves property page, the user selects Move1, clicks the Edit button, and renames the move PointToPoint1. The user can use this new name to access the move in the property pages or programmatically.

Figure 13:
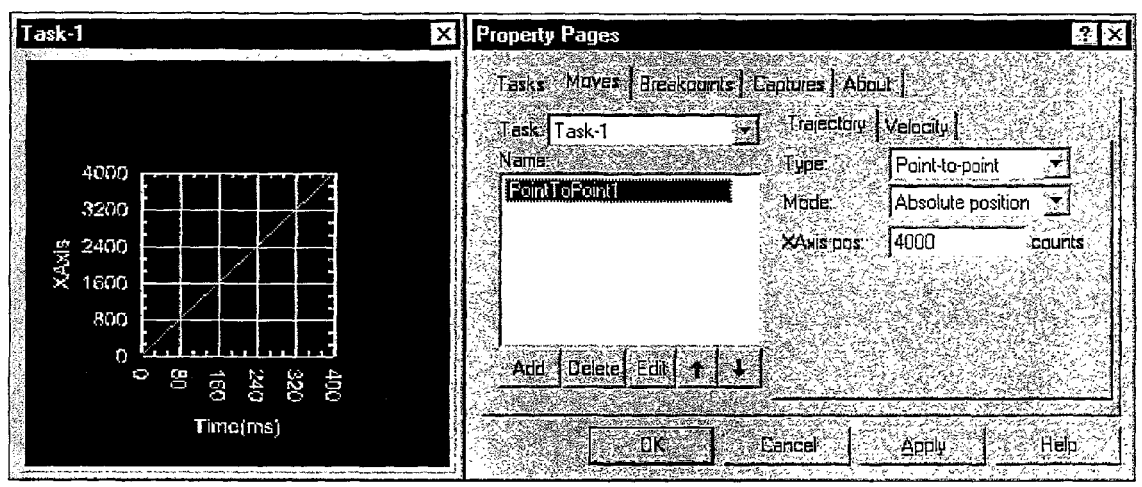

2. On the Trajectory subtab, the user sets Type to Point-to-point, Mode to Relative position, and XAxis pos to 4000 counts. As shown in FIG. 13, the move is now configured to move to encoder position 4000. As the user enters the destination value, the NIMotion preview window interactively changes to reflect the velocity and position of the move.

3. The user switches to the Velocity subtab and sets the Velocity property to 1000 counts/s, and accepts the default values for acceleration, deceleration, and s-curve.

4. The user clicks OK to close the property pages.

5. The user places a Visual Basic CommandButton on the project form and changes Name to cmdStart and Caption to Start.

6. The user adds Visual Basic code to configure and start the motion move. The user double clicks the Start button and adds the following code:

```
Private Sub cmdStart_Click( )
NIMotion1.Configure
NIMotion1.Start
End Sub
```

7. The user places another CommandButton on the project form. The user changes Name to cmdStop and Caption to Stop.

8. The user adds Visual Basic code to stop the motion move. The user double clicks the Stop button and add the following code:

```
Private Sub cmdStop_Click( )
NIMotion1.Stop
End Sub
```

9. The user selects Run>>Start to run the program. The user clicks the Start button to configure and start the move and stops the program when finished testing.

Example

Using the MoveCompleted and TaskCompleted Events

When a single move is completed, the MoveCompleted event is generated. The MoveCompleted event returns the move and task objects. As a result, the user can add code to the MoveCompleted event procedure that prints the name of the completed move on the form. When a motion task is completed, the TaskCompleted event is generated. The user also can add code to the TaskCompleted event procedure to notify when the task is finished. Example:

1. The user places a Visual Basic TextBox on the project form and changes Name to txtStatus and deletes the text from Text. The user places a Visual Basic Label on the form and changes Caption to Status.

2. In the code window, the user selects NIMotion1 from the object listbox and MoveCompleted from the procedure listbox to create the MoveCompleted event procedure. The user adds the fourth line of code shown below to the MoveCompleted event procedure to make it read as:

```
Private Sub NIMotion1_MoveCompleted(ByVal Move As
NIMotionControlLib.NIMotionMove, ByVal Task As
NIMotionControlLib.NIMotionTask)
txtStatus.Text=Move.Name & "completed."
End Sub
```

Figure 14:
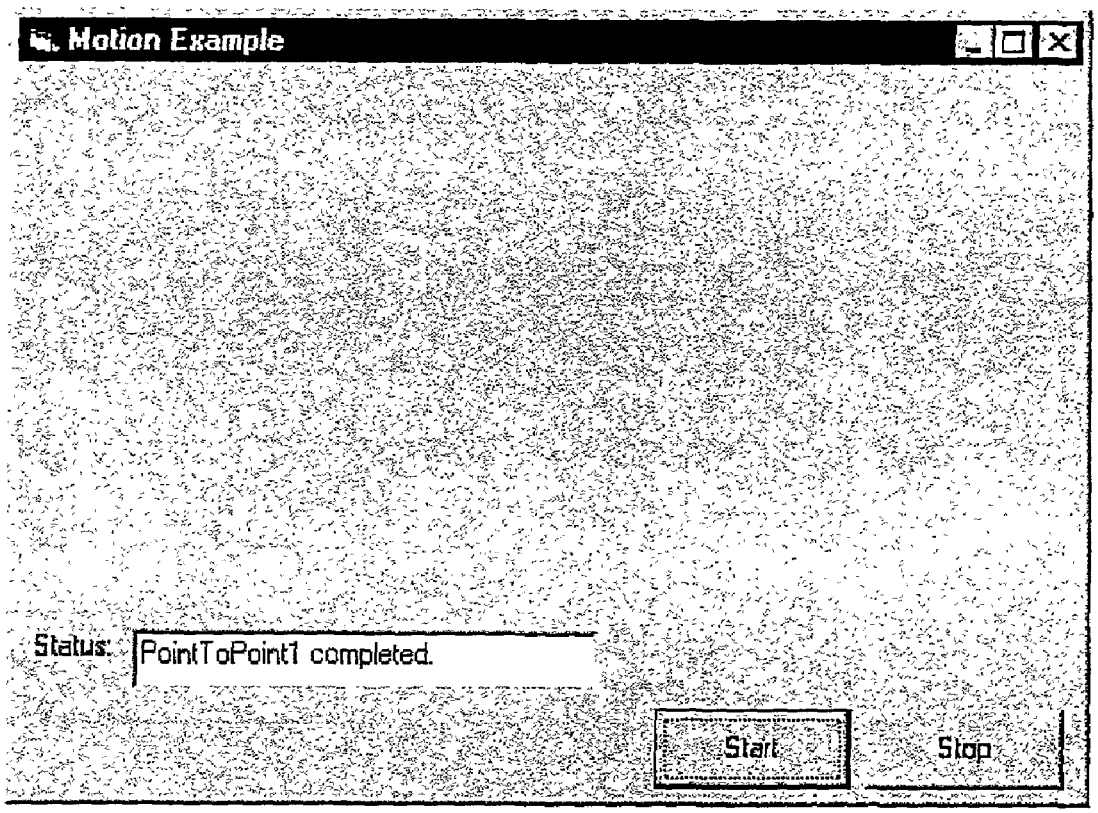

4. The user runs the program. As shown in FIG. 14, "Point-ToPoint1 completed" is printed in the Status textbox after the move completes. The user stops the program when finished testing.

TaskCompleted Event

The user uses the TaskCompleted event to turn off an LED indicator when the task is complete. Example:

1. The user places a CWButton control on the project form. By default, Visual Basic names the control CWButton1. The user places a Label on the form and changes Caption to Task in Progress.

2. The user right clicks the CWButton control and selects Properties to configure the control. On the Style property page, the user selects the 3D Round LED style and clicks OK.

3. The user adds the fourth line of code shown below to the cmdStart_Click event procedure to turn on the LED when the task begins:

```
Private Sub cmdStart_Click( )
NIMotion1.Configure
NIMotion1.Start
CWButton1.Value=True
End Sub
```

4. The user adds the TaskCompleted event to the program. In the code window, the user selects NIMotion1 from the object listbox and TaskCompleted from the procedure listbox to create the TaskCompleted event procedure.

5. To turn off the LED when the task completes, the user adds the third line of code shown below to the TaskCompleted event procedure:

```
Private Sub NIMotion1_TaskCompleted(ByVal Task As
NIMotionControlLib.NIMotionTask)
CWButton1.Value=False
End Sub
```

6. The user runs the program. After the move is completed, the MoveCompleted event is generated and a message appears in the Status textbox. The LED turns off when the TaskCompleted event is generated. The user stops the program when finished testing.

Example

Creating a Sequence

To create a sequence, the user must add additional moves. In this example, the sequence will contain two point-to-point moves and a circular arc:

1. On the Tasks property page, the user clicks the Axis button to add a second axis to the task. (Circular arcs require two axes.) The user sets Number to a value that is valid for his motion controller. When the user adds an additional axis to a task, that axis becomes part of all moves.

2. The user changes the PointToPoint1 move to reflect the added axis. On the Moves property page the user selects PointToPoint1 and ensures that Mode is set to Relative position. The user sets XAxis pos to 3845 and YAxis pos to 5000. The first move now moves 3845 encoder positions along the XAxis and 5000 encoder positions along the YAxis.

3. The user switches to the Velocity subtab. The user sets the Velocity property to 4000 counts/s and sets Acceleration to 20000 counts/s2 and Deceleration to 5000 counts/s2.

4. On the Moves property page, the user clicks the Add button to add a second move. The user renames this move PointToPoint2 and sets Mode to Relative position. The user sets XAxis pos to 3845 and YAxis pos to −5000.

5. The user switches to the Velocity subtab. The user sets the Velocity property to 4000 counts/s and sets Acceleration to 20000 counts/s2 and Deceleration to 5000 counts/s2.

6. On the Moves property page, the user clicks the Add button to add a third move. The user renames the move CircularArc.

7. On the Trajectory subtab, the user sets Type to Circular arc. The user sets Radius to 5000, Start angle to 40 degrees, and Travel angle to −260 degrees.

8. The user switches to the Velocity subtab. The user sets the Velocity property to 4000 counts/s and sets Acceleration to 10000 counts/s2 and Deceleration to 10000 counts/s2.

Figure 15:
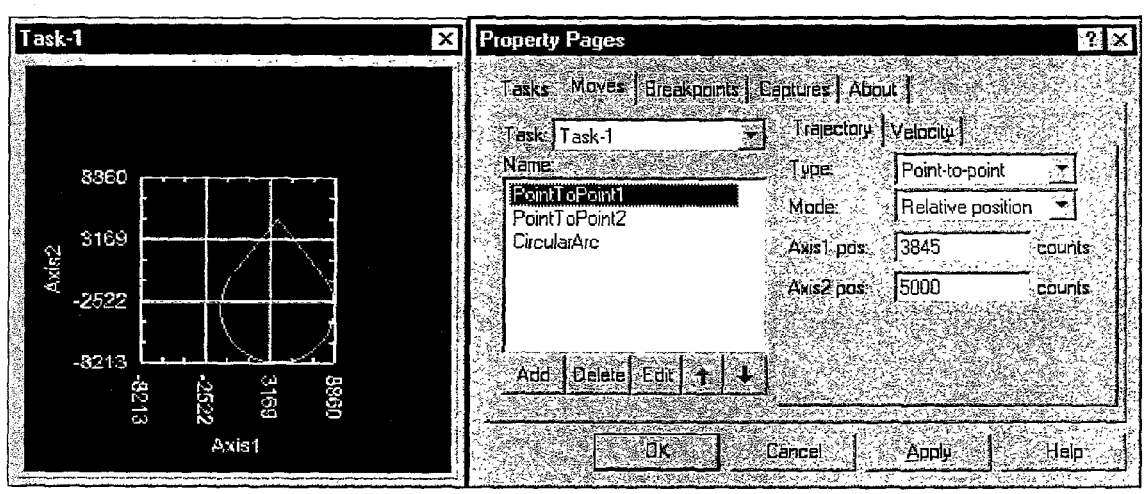

After the user configures the sequence, the preview window displays the completed sequence, as shown in FIG. 15.

9. The user runs the program. As each move is completed, the MoveCompleted event is generated and the name of the completed move is printed in the Status textbox. The LED turns off after the task is completed. The user stops the program when finished testing.

Example

Reading and Displaying Status

The user can track the velocity and position of a motion task with the GetCurrentVelocity and GetCurrentPosition methods. The GetCurrentVelocity method returns the velocity of the entire task. The GetCurrentPosition method returns an array containing the current position on each axis. In this example, the user uses a textbox to display the velocity and the Measurement Studio Graph (CWGraph) control to chart the current position.

1. The user places a TextBox on the project form. The user changes Name to txtVelocity and deletes the text from Text. The user places a Label on the form and changes Caption to Current Velocity.

2. The user places a CWGraph control on the form. By default, Visual Basic names the control CWGraph1. The user right clicks the control and selects Properties to configure the control. On the Ticks property page, the user sets Axis caption to XAxis for the XAxis. In the listbox, the user selects YAxis-1 and sets Axis caption to YAxis. Both axes display captions labeling each axis. On the Graph property page, the user sets Chart history to Fixed and sets the Fixed value to 2000. When the user runs the program, the graph stores 2000 points before deleting old data. The user then clicks OK.

3. To ensure the plot is cleared each time the user clicks the Start button, the user adds the third line of code shown below to the cmdStart_Click event procedure:

```
Private Sub cmdStart_Click( )
NIMotion1.Configure
CWGraph1.ClearData
NIMotion1.Start
CWButton1.Value=True
End Sub
```

4. Because there are several sections of code that must call the GetCurrentVelocity and GetCurrentPosition methods, the user creates a new Visual Basic procedure. From the Visual Basic menu, the user selects Tools>>Add Procedure. The user names the procedure DisplayPositionVelocity, sets Type to Sub, and sets Scope to Public. The user then clicks OK.

5. In the DisplayPositionVelocity procedure, the user adds code to display the current velocity in the Current Velocity textbox:

```
Public Sub DisplayPositionVelocity( )
Dim velocity As Variant
NIMotion1.Tasks("Task-1").GetCurrentVelocity velocity
'Display the velocity returned from the method.
txtVelocity.Text=velocity
End Sub
```

6. The user adds the code to chart the current position of the moves. To chart the data, the user uses the CWGraph ChartXvsY method. This method charts an array of Y data against an array of X data. In this case, the position on XAxis is charted against the position on YAxis. The GetCurrentPosition method returns an array. Each element in the array corresponds to the current position for an axis in the task. The user adds the third, seventh, eighth, and ninth lines of code shown below:

```
Public Sub DisplayPositionVelocity( )
Dim velocity As Variant
Dim position As Variant
NIMotion1.Tasks("Task-1").GetCurrentVelocity velocity
'Display the velocity returned from the method.
txtVelocity.Text=velocity
NIMotion1.Tasks("Task-1").GetCurrentPosition position
'Chart the position on XAxis versus the position on YAxis.
CWGraph1.ChartXvsY position(0), position(1)
End Sub
```

Now it is necessary to determine when the DisplayPositionVelocity procedure is called. When the application is run, the program should begin returning the velocity and position when the user clicks the Start button. The program should return these values at a specific interval, which means the user must add a Visual Basic Timer control to the project form and specify the interval at which values are returned.

7. The user adds the fourth line of code shown below to the cmdStart_Click event procedure to call DisplayPositionVelocity immediately before the task begins:

```
Private Sub cmdStart_Click( )
NIMotion1.Configure
CWGraph1.ClearData
DisplayPositionVelocity
NIMotion1.Start
CWButton1.Value=True
End Sub
```

8. The user places a Visual Basic Timer control on the project form. By default, Visual Basic names the control Timer1.

9. In the Properties window, the user sets Enabled to False. The timer is enabled when the Start button is clicked.

10. The user adds code to enable the timer when the user clicks the Start button and to set the Timer to go off every 200 ms. The user adds the fifth and sixth lines of code shown below:

```
Private Sub cmdStart_Click( )NIMotion1.Configure
DisplayPositionVelocity
NIMotion1.Start
CWButton1.Value=True
Timer1.Interval=200
Timer1.Enabled=True
End Sub
```

11. When the timer goes off, the DisplayPositionVelocity procedure is called. The user double clicks the Timer control to create a new procedure that reads as:

```
Private Sub Timer1_Timer( )
DisplayPositionVelocity
End Sub
```

Figure 16:
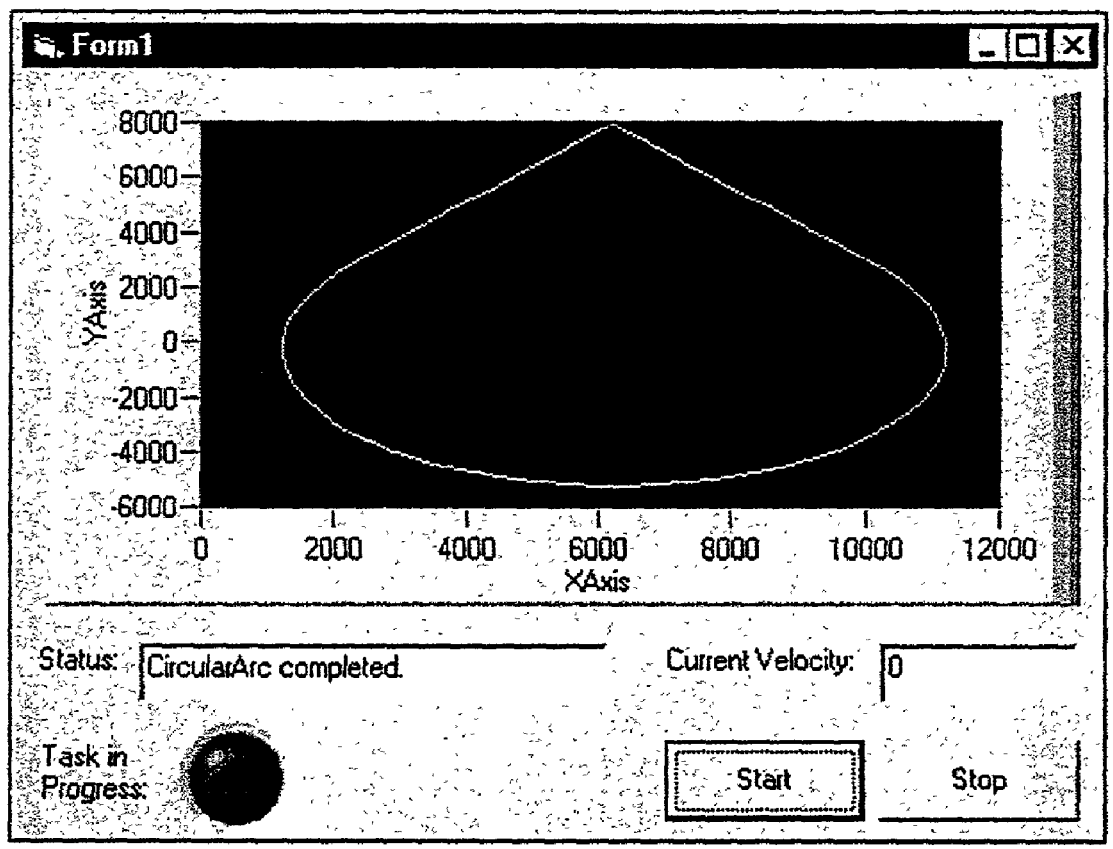

12. To stop the timer and cease acquiring position and velocity, the user adds the second line of code shown below to the cmdStop_Click event procedure:
Private Sub cmdStop_Click( )
Timer1.Enabled=False
NIMotion1.Stop
End Sub 13. The user runs the program and clicks the Start button. As shown in FIG. 16, the graph plots the task while the Current Velocity textbox displays the velocity of the moves. The user stops and ends the program when finished testing.

While running the program, the user might notice that the transitions between moves are not smooth. With the task type set to complete moves, the next move is not sent to the motion controller until the MoveCompleted event is generated for the previous move. As a result, there is a short pause between moves. For smoother transitions between moves, the user can set the task type to blended moves and configure when moves are blended in the task. The user can specify if blending begins before or after deceleration or after a delay specified by the blend factor. The blend factor, or dwell time, determines how long the transition between moves takes.

Example

Blending Moves

In this example, the user uses the NIMotion control property pages to change the previously configured task so that it uses blended moves.

1. On the Tasks property page, the user sets Type to Blended moves.

2. The user switches to the Moves property page and selects the first move. In this task, the moves should begin blending before the previous move starts decelerating. On the Velocity subtab, the user sets Blend to before decelerating.

3. Because the user specified that he wants to start blending before decelerating, the blend factor is automatically set to −1. This value causes the pending move to start when the previous move finishes its constant velocity segment and starts to decelerate.

4. The user configures each move in the task with the same three settings.

5. The user runs the program. Now the moves transition more smoothly. The user stops the program when finished testing.

The BlendCompleted Event

If the user sets the task type to blended moves, the control generates the BlendCompleted event. The BlendCompleted event is generated after each move finishes blending. While blending, the control does not generate the MoveCompleted event. The user can add code to the application to notify when each pending move has completed blending into the previous move. Example:

1. In the code window, the user selects NIMotion1 from the object listbox and BlendCompleted from the procedure listbox to create the BlendCompleted event procedure.

2. The user adds the fourth line of code shown below to the BlendCompleted event procedure:
Private Sub NIMotion1_BlendCompleted(ByVal Move As NIMotionControlLib.NIMotionMove, ByVal Task As NIMotionControlLib.NIMotionTask)
txtStatus.Text=Move.Name & "blend completed."
End Sub 3. The user runs the program. After each move finishes blending, the Status textbox displays the statement added to the BlendCompleted event. The user stops the program when finished testing.

Handling Errors and Exceptions with the Motion Control
Error Handling

The NIMotion control provides numerous properties, methods, and events for handling errors and exceptions in applications. Every method on the NIMotion control has a return value that indicates the success or failure of the operation. If a method fails, the NIMotion control returns either a FlexMotion driver error or an NIMotion-specific error. The user can check the return value from each method and handle any errors immediately following the method call. For example, in the following section of code, any errors returned by the Configure method are printed in a textbox on the form:
Private Sub cmdStart_Click( )
Dim motionErr as Long
motionErr=NIMotion1.Configure( )
If (motionErr=0) Then
motionErr=NIMotion1.Start( )
Else
txtError="The Configure method returned error code"+Str (motionErr)+". Please correct the error and restart the operation."
End If
End Sub With the GetErrorDescription method, the user also can retrieve the error string corresponding to the error code:
txtError=NIMotion1.GetErrorDescription(motionErr)

Exception Handling

Instead of checking the return value from each method call, the user can specify that execution moves to a label in the procedure and perform all error handling in that section of the procedure. The ExceptionOnError property specifies if NIMotion methods raise an exception on an error condition. The user must set ExceptionOnError to True to raise exceptions. In the following code sample, textboxes display messages if the Configure and Start methods succeed. If either method fails, the program goes to the ErrHandler label, which prints the returned error code in another textbox:
Private Sub cmdStart_Click( )
NIMotion1.ExceptiononError=True
On Error GoTo ErrHandler
NIMotion1.Configure
txterror="configure Succeeded"
NIMotion1.Start
txterror="Start Succeeded"
'If no error occurs, the procedure is finished.
Exit Sub
ErrHandler:
txtError="The Motion Control generated run time error"+Str(Err.Number)
End Sub MotionError Event While return values and exceptions are useful for responding to synchronous errors, the MotionError event is the primary mechanism for notifying the user of asynchronous errors and other run-time errors that occur during the execution of the control. For example, suppose the user creates a sequence containing a point-to-point move followed by a circular arc. The Start method is called, which begins the first move and returns without error. If the user uses an invalid travel angle value for the circular arc, the MotionError event is generated when the circular arc move is sent to the controller. To manage such errors, the user can write the following code in the event handler for the MotionError event:

Private Sub NIMotion1_MotionError(ByVal ErrorCode As Long, ByVal
    ErrorDescription As String, ByVal ErrorContextID As Long, ByVal
    ErrorContextDescription As String)
    MsgBox "Motion Error Event:"+ErrorContextDescription+vbCrLf+ErrorDescription
    End Sub The MotionError event returns all the relevant information on the error. In addition to returning the error code and error description, the event also returns error contexts and error context descriptions. Error contexts provide more information about the circumstances leading to an error. The user sets error contexts with the ErrorEventMask property. This property stores all possible contexts in which the user wants the MotionError event generated. For example, if the user wants the MotionError event generated if an error occurs during the Configure method, while the sequence is executing, or during the GetCurrentPosition and GetCurrentVelocity methods, the user adds the following line of code:

NIMotion1.ErrorEventMask=nimotionConfiguring+nimotionRunning+nimotionReadingCurrentStatus If the user does not specify any values for ErrorEventMask, the MotionError event is not generated. Alternatively, the user can set ErrorEventMask to −1, and all errors generate the MotionError event. The MotionError event then becomes the primary mechanism for responding to all motion errors.

NIMotion

The NIMotion object controls motion by sending commands to a National Instruments Motion controller.

Properties:

BoardID—Specifies a unique number that identifies a controller installed in the computer.

ErrorEventMask—Selects contexts for which the control generates error events.

ExceptionOnError—Specifies if methods raise an exception on an error condition or return a negative number to indicate an error.

Tasks—Specifies a collection of motion tasks that begin executing when the Start or Blend method is called.

Methods:

AboutBox—Displays the About Box for the control.

Blend—Blends motion on all configured motion tasks. If the motion controller is not configured, the Configure method is called automatically before the Blend method.

Configure—Configures the FlexMotion driver and reserves hardware resources on the motion controller.

ExportStyle—Exports the style of the Measurement Studio control to a file.

GetErrorDescription—Returns a string containing an error description for the given error code.

GetLastError—Returns the error code corresponding to the last exception.

ImportStyle—Imports a previously exported style.

InitializeController—Initializes the motion controller using the default values specified in Measurement & Automation Explorer.

Reset—Stops all motion tasks, resets any internally configured resources to their default values, and frees any resources reserved during configuration.

Start—Starts all configured motion tasks. If the motion controller is not configured, the Configure method is called automatically before the Start method.

Stop—Stops all executing motion tasks. Use the StopType parameter to specify how the controller stops.

Events:

AxisStateChanged—Generated when one of the attributes in the AttributeMask of an NIMotionAxis object changes state.

BlendCompleted—Generated after a move has finished blending.

BreakpointProgress—Generated after the number of breakpoints specified in the ProgressInterval property have been reached.

CaptureProgress—Generated after the specified number of points have been captured.

MotionError—Generated after a motion error occurs, subject to the value of the ErrorEventMask property.

MoveCompleted—Generated after a move has completed.

MoveProgress—Generated during a contour move after the controller has used the number of points specified by the ProgressInterval property.

TaskCompleted—Generated after a task has completed.

NIMotionAxes

NIMotionAxes is a collection of NIMotionAxis objects. The user adds an NIMotionAxis object to the collection for each axis in a task.

Properties:

Count—Returns the number of objects in the collection.

Methods:

Add—Creates and appends a new axis object to the NIMotionAxes collection.

Item—Returns the specified object from the collection.

Remove—Removes the specified item from the collection.

RemoveAll—Removes all objects from the collection.

ResetPositions—Resets the position of each axis in the collection.

NIMotionAxis

The NIMotionAxis object defines an axis on the motion controller and associates it with an NIMotionTask. The user sets the Number property to the physical axis number that the user wants to control.

Properties:

AttributeMask—Selects the hardware attributes of an axis for which the control generates the AxisStateChanged event.

Name—Specifies the user-defined name of an axis.

Number—Specifies an axis number on the motion controller.

Methods:

ResetPosition—Resets the axis position to a desired value.

TaskBreakpoint—Configures a task breakpoint on the axis.

TaskCapture—Configures a task capture on the axis.

NIMotionBreakpoint

The NIMotionBreakpoint object configures a breakpoint output operation for an axis in a motion task. The user can use this object to specify the axis name, position, and action. When the axis reaches the specified encoder position, the breakpoint output line changes to the state specified by action.

Properties:

Action—Specifies the action on the breakpoint output when a breakpoint occurs.

AutoEnable—Specifies if the breakpoint object is configured automatically or when the Enable method is called.

AxisName—Specifies the axis on which the breakpoint is configured. The user uses a valid name from an axis object in the NIMotionAxes collection.

Destination—Specifies the breakpoint output line.

Mode—Determines how breakpoint positions are interpreted by the motion controller.

Modulus—Specifies the repeat period for modulo breakpoints.

Name—Specifies the name of the breakpoint.

Positions—Specifies a single position or an array of positions where breakpoints should occur.

ProgressInterval—Specifies the interval for generating BreakpointProgress events.

ReuseData—Specifies if the data specified by the Positions property is reused.

TotalPoints—Specifies the number of breakpoints.

Methods:

AppendPositions—Appends new breakpoint positions to a circular buffered breakpoint operation.

Enable—Activates the breakpoint object.

NIMotionBreakpoints

NIMotionBreakpoints is a collection of NIMotionBreakpoint objects associated with a specific move.

Properties:

Count—Returns the number of objects in the collection.

Methods:

Add—Creates and appends a new breakpoint to the NIMotionBreakpoints collection on a move.

Item—Returns the specified object from the collection.

Remove—Removes the specified item from the collection.

RemoveAll—Removes all objects from the collection.

NIMotionCapture

The NIMotionCapture object configures a high-speed capture operation for an axis in a motion task. With this object, the user can specify the axis name and the source and mode for the high-speed capture input signal. When the input signal is in the specified state, the encoder position is instantaneously stored into memory. Captured encoder positions are returned through the NIMotion.CaptureProgress event.

Properties:

AutoEnable—Specifies if the capture object is configured automatically or when the Enable method is called.

AxisName—Specifies the axis on which the capture is configured. The user uses a valid name from an axis object in the NIMotionAxes collection.

Mode—Specifies how the incoming high-speed capture signal is interpreted by the motion controller.

Name—Specifies the name of a capture object.

ProgressInterval—Specifies the interval for generating CaptureProgress events.

Source—Specifies the input line that triggers a high-speed capture.

TotalPoints—Specifies the number of positions to acquire.

Methods:

Enable—Activates the capture object.

NIMotionCaptures

NIMotionCaptures is a collection of NIMotionCapture objects associated with a specific move.

Properties:

Count—Returns the number of objects in the collection.

Methods:

Add—Creates and appends an NIMotionCapture object to the collection.

Item—Returns the specified object from the collection.

Remove—Removes the specified item from the collection.

RemoveAll—Removes all objects from the collection.

NIMotionMove

The NIMotionMove object specifies the properties for a move in a motion task. With this object, the user can specify the move type and then set the appropriate parameters for that move.

Properties:

Acceleration—Specifies the maximum rate of acceleration for a move.

ActualContourInterval—Returns the actual interval used by the motion controller between successive points specified by the ConitourData property.

BlendFactor—Specifies the blend factor mode, or dwell time, for the move.

Breakpoints—Collection of NIMotionBreakpoint objects that can be active only during the execution of the specified move.

Captures—Collection of NIMotionCapture objects that can be active only during the execution of the specified move.

ContourData—Specifies the initial buffer of position data used for a contour move.

ContourInterval—Specifies the requested time in milliseconds between contouring data points.

ContourMode—Specifies how the contour data is interpreted by the motion controller.

Deceleration—Specifies the maximum rate of deceleration for a move.

LinearTravel—Specifies the linear travel of a helical arc move.

Name—Specifies the name of the move.

PlanePitch—Specifies the angular rotation from the x axis in the xz plane.

PlaneYaw—Specifies the angular rotation from the x axis in the xy plane.

Position—Specifies the axis target position(s) for the move.

PositionMode—Specifies how position is interpreted for a point-to-point move.

PositionModulus—Specifies the modulus range for a position modulus move.

ProgressInterval—Specifies how often the MoveProgress event is generated.

Radius—Specifies the radius for circular arc, spherical arc or helical arc moves.

ReuseData—Specifies how the motion controller generates data for buffered contour moves.

SCurve—Specifies the s-curve time for a move.

StartAngle—Specifies the start angle for circular arc, spherical arc or helical arc moves.

TotalPoints—Specifies the total number of points in a contour move.

TravelAngle—Specifies the travel angle for circular arc, spherical arc or helical arc moves.

Type—Specifies the type of the move. The move type defines which parameters are sent to the motion controller for the move.

Velocity—Specifies the maximum velocity for a move.

Methods:

AppendContourData—Appends new target positions to a contour move.

NIMotionMoves

NIMotionMoves is a collection of NIMotionMove objects. The NIMotionMoves collection of a task defines the move sequence.

Properties:

Count—Returns the number of objects in the collection.

Methods:

Add—Adds an object to the collection and returns the new object.

AddCircularArc—Adds a circular arc move to the NIMotionMoves collection.

AddContour—Adds a contour move to the NIMotionMoves collection.

AddHelicalArc—Adds a helical arc move to the NIMotionMoves collection.

AddPointToPoint—Adds a point-to-point move to the NIMotionMoves collection.

AddSphericalArc—Adds a spherical arc move to the NIMotionMoves collection.

AddVelocity—Adds a velocity move to the NIMotionMoves collection.

Item—Returns the specified object from the collection.

Remove—Removes the specified item from the collection.

RemoveAll—Removes all objects from the collection.

NEMotionTask

The NIMotionTask object defines a motion task. Each motion task consists of a group of axes and a sequence of moves which are executed on those axes. The task type specifies how individual moves in the move sequence are sent to a motion controller.

Properties:

Axes—A collection of NIMotionAxis objects that define the axes on which the moves in the task are executed.

Iterations—Specifies the number of times the move sequence is executed.

Moves—A collection of NIMotionMove objects that define the move sequence of the task.

Name—Specifies a user-defined name for the task.

Type—Specifies the types of moves in the task.

Units—Specifies the velocity units (RPM or counts) used for all moves in the task.

VectorSpace—Specifies a vector space resource on the motion controller.

Methods:

GetCurrentPosition—Returns the current position of all axes in the task.

GetCurrentVelocity—Returns the current velocity of the task.

NIMotionTasks

NIMotionTasks is a collection of NIMotionTask objects.

Properties:

Count—Returns the number of objects in the collection.

Methods:

Add—Creates and appends an NIMotionTask object to the collection.

Item—Returns the specified object from the collection.

Remove—Removes the specified item from the collection.

RemoveAll—Removes all objects from the collection.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for creating a prototype that includes motion control, machine vision, and Data Acquisition (DAQ) functionality, the method comprising:

displaying a graphical user interface (GUI) that provides GUI access to a set of operations, wherein the set of operations includes one or more motion control operations, one or more machine vision operations, and one or more DAQ operations;

creating a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;

wherein the plurality of operations included in the sequence includes at least one motion control operation, at least one machine vision operation, and at least one DAQ operation, wherein at least one of the DAQ operations included in the sequence is operable to control a DAQ measurement device to acquire measurement data of a device under test;

wherein the method further comprises storing information representing the sequence of operations in a data structure, wherein the sequence of operations comprises the prototype.

2. The method of claim 1, further comprising:
accessing the data structure to determine the plurality of operations in the sequence;
determining software routines to execute in order to perform the plurality of operations in the sequence; and
executing the software routines.

3. The method of claim 1, further comprising:
receiving user input specifying a first parameter value for a first operation in the sequence;
wherein said storing the information representing the sequence of operations in the data structure comprises storing the first parameter value in the data structure;
wherein the method further comprises executing software routines corresponding to operations in the sequence, wherein executing the software routines comprises executing a first software routine corresponding to the first operation, wherein said executing the first software routine comprises passing the first parameter value to the first software routine.

4. The method of claim 1,
wherein the information representing the sequence of operations in the data structure does not comprise program code.

5. The method of claim 1,
wherein the machine vision operation(s) in the sequence are operable to perform one or more of:
acquire one or more images of the device under test; and/or
analyze one or more acquired images of the device under test.

6. The method of claim 1,
wherein the motion control operation(s) in the sequence are operable to control a motion control device in order to move the device under test.

7. The method of claim 1,
wherein the machine vision operation(s) in the sequence are operable to analyze one or more acquired images of the device under test; and
wherein the motion control operation(s) in the sequence are operable to control a motion control device in order to move the device under test.

8. The method of claim 1,
wherein the prototype is operable to:
control a motion control device to move the device under test;
control an image acquisition device to acquire one or more images of the device under test; and
control the DAQ measurement device to acquire the measurement data of the device under test.

9. The method of claim 1, further comprising:
performing the sequence of operations;
wherein said performing the sequence of operations comprises executing software routines in order to perform each operation in the sequence.

10. The method of claim 1, further comprising:
creating program instructions executable to perform the sequence of operations; and
executing the program instructions.

11. The method of claim 1, further comprising:
configuring a first operation in the sequence in response to user input specifying configuration information for the first operation, wherein configuring the first operation changes a function performed by the first operation; and
displaying information in response to the user input specifying the configuration information in order to visually indicate the change in the function performed by the first operation.

12. The method of claim 11,
wherein the user input specifying the configuration information for the first operation does not include user input specifying program code.

13. The method of claim 11, further comprising:
displaying a graphical panel including graphical user interface elements for setting properties of the first operation, wherein the user input specifying the configuration information for the first operation comprises user input to the graphical panel to set one or more properties of the first operation.

14. The method of claim 13,
wherein the graphical panel is automatically displayed in response to including the first operation in the sequence.

15. The method of claim 13, further comprising:
receiving user input requesting to configure the first operation; and
displaying the graphical panel for configuring the first operation in response to the request.

16. The method of claim 1,
wherein the GUI includes an area which visually represents the operations in the sequence;
wherein the method further comprises:
for each operation included in the sequence, updating the area visually representing the operations in the sequence to illustrate the included operation, in response to the user input selecting the operation from the GUI.

17. The method of claim 16,
wherein the area visually representing the operations in the sequence displays a plurality of icons, wherein each icon visually indicates one of the operations in the sequence;
wherein said updating the area visually representing the operations in the sequence to illustrate the included operation comprises displaying a new icon to visually indicate the included operation.

18. The method of claim 1,
wherein the GUI displays a plurality of buttons, wherein each button corresponds to a particular operation and is operable to add the operation to the sequence in response to user input selecting the button;
wherein said including the plurality of operations in the sequence in response to the user input selecting each operation in the plurality of operations from the GUI comprises including the plurality of operations in the sequence in response to user input selecting corresponding buttons from the plurality of buttons.

19. The method of claim 1,
wherein the one or more motion control operations in the set of operations to which the GUI provides GUI access include:
a straight line move operation;
an arc move operation; and
a contoured move operation.

20. The method of claim 1, wherein the sequence includes two or more motion control operations, and wherein the method further comprises:
displaying a graph illustrating a spatial trajectory cumulatively performed by the two or more motion control operations, wherein the graph provides a visual preview of the spatial trajectory cumulatively performed by the two or more motion control operations.

21. The method of claim 20,
wherein the displayed graph comprises a two-dimensional graph illustrating a two-dimensional display of the spatial trajectory performed by the two or more motion control operations.

22. The method of claim 20,
wherein the displayed graph comprises a three-dimensional graph illustrating a three-dimensional display of the spatial trajectory performed by the two or more motion control operations.

23. The method of claim 1, further comprising:
automatically generating a graphical program based on the sequence of operations, wherein the graphical program is executable to perform the sequence of operations, wherein the graphical program comprises a plurality of interconnected nodes visually indicating functionality of the graphical program, wherein automatically generating the graphical program comprises automatically including the plurality of interconnected nodes in the graphical program without user input specifying the nodes.

24. The method of claim 23,
wherein the graphical program comprises a graphical data flow program, wherein the plurality of interconnected nodes visually indicates data flow that occurs among the nodes.

25. The method of claim 1, further comprising:
automatically generating a text-based program based on the sequence of operations, wherein the text-based program is executable to perform the specified sequence of operations, wherein the text-based program comprises a plurality of lines of textual source code, wherein automatically generating the text-based program comprises automatically including the lines of textual source code in the text-based program without user input specifying the lines of textual source code.

26. The method of claim 1,
wherein said displaying the GUI comprises a first application displaying the GUI;
wherein said creating the sequence comprises the first application creating the sequence;
wherein the method further comprises:
the first application receiving a request to invoke execution of the sequence from a second program external to the first application; and
the first application executing the sequence of operations in response to the request from the second program, wherein the first application executing the sequence comprises the first application invoking execution of software routines to perform the plurality of operations in the sequence.

27. The method of claim 1, further comprising:
automatically converting the sequence of operations to a hardware configuration format usable for configuring configurable hardware of an embedded device to perform the sequence of operations; and
configuring the configurable hardware of the embedded device to perform the sequence of operations using the hardware configuration format.

28. The method of claim 1, further comprising:
displaying a visual indication of results of performing the sequence while the sequence is being created, wherein the visual indication enables a user to evaluate the results of performing the sequence, wherein interactively displaying the visual indication comprises:
for each operation in at least a subset of the operations included in the sequence, updating the displayed visual indication in response to including the operation in the sequence in order to visually indicate a change in the results of performing the sequence, wherein the change is caused by including the operation in the sequence, wherein updating the displayed visual indication provides interactive visual feedback to the user indicating the change caused by including the operation in the sequence.

29. The method of claim 1,
wherein the plurality of operations included in the sequence includes a plurality of motion control operations;
wherein the method further comprises interactively displaying a graph illustrating a spatial trajectory cumulatively performed by the plurality of motion control operations, wherein interactively displaying the graph comprises:
for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

30. The method of claim 1, further comprising:
automatically converting the sequence of operations to a hardware configuration format usable for configuring a Field Programmable Gate Array (FPGA) device to perform the sequence of operations; and
configuring the FPGA device to perform the sequence of operations using the hardware configuration format.

31. The method of claim 1,
wherein said controlling the DAQ measurement device to acquire the measurement data of the device under test comprises controlling the DAQ measurement device to acquire waveform data of the device under test.

32. A computer-implemented method for creating a prototype that includes motion control, machine vision, and Data Acquisition (DAQ) functionality, the method comprising:
displaying a graphical user interface (GUI) that provides GUI access to a set of operations, wherein the set of operations includes one or more motion control operations, one or more machine vision operations, and one or more DAQ operations;
creating a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;

wherein the plurality of operations included in the sequence includes at least one motion control operation, at least one machine vision operation, and at least one DAQ operation, wherein at least one of the DAQ operations included in the sequence is operable to control a DAQ measurement device to acquire measurement data of a device under test;

wherein the method further comprises performing the specified sequence of operations, wherein the operations in the sequence implement the motion control, machine vision, and DAQ functionality of the prototype.

33. The method of claim 32, further comprising:
storing information representing the sequence of operations in a data structure.

34. The method of claim 33,
wherein the information representing the sequence of operations in the data structure does not comprise program code.

35. The method of claim 33, wherein said performing the sequence of operations comprises:
accessing the data structure to determine the plurality of operations in the sequence;
determining software routines to execute in order to perform the plurality of operations in the sequence; and
executing the software routines.

36. The method of claim 33, further comprising:
receiving user input specifying a first parameter value for a first operation in the sequence;
wherein said storing the information representing the sequence of operations in the data structure comprises storing the first parameter value in the data structure;
wherein said performing the sequence of operations comprises executing software routines corresponding to operations in the sequence, wherein executing the software routines comprises executing a first software routine corresponding to the first operation, wherein said executing the first software routine comprises passing the first parameter value to the first software routine.

37. The method of claim 32, further comprising:
displaying a visual indication of results of performing the sequence while the sequence is being created, wherein the visual indication enables a user to evaluate the results of performing the sequence, wherein interactively displaying the visual indication comprises:
for each operation in at least a subset of the operations included in the sequence, updating the displayed visual indication in response to including the operation in the sequence in order to visually indicate a change in the results of performing the sequence, wherein the change is caused by including the operation in the sequence, wherein updating the displayed visual indication provides interactive visual feedback to the user indicating the change caused by including the operation in the sequence.

38. The method of claim 32,
wherein the plurality of operations included in the sequence includes a plurality of motion control operations;
wherein the method further comprises interactively displaying a graph illustrating a spatial trajectory cumulatively performed by the plurality of motion control operations, wherein interactively displaying the graph comprises:
for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

39. A computer-implemented method for creating a prototype that includes motion control, machine vision, and Data Acquisition (DAQ) functionality, the method comprising:
creating a sequence of operations, wherein creating the sequence comprises including a plurality of operations in the sequence in response to user input selecting each operation in the plurality of operations, wherein including the plurality of operations in the sequence in response to the user input selecting each operation in the plurality of operations comprises including the plurality of operations in the sequence without receiving user input specifying program code for performing the plurality of operations;
wherein the method further comprises recording the sequence of operations in a data structure, wherein the sequence of operations comprises the prototype;
wherein the operations in the sequence include at least one motion control operation, at least one machine vision operation, and at least one DAQ operation, wherein the operations in the sequence are operable to:
control a motion control device to move an object;
control an image acquisition device to acquire one or more images of the object; and
control a DAQ measurement device to acquire measurement data of the object.

40. The method of claim 39,
wherein the plurality of operations included in the sequence includes a plurality of motion control operations;
wherein the method further comprises interactively displaying a graph illustrating a spatial trajectory cumulatively performed by the plurality of motion control operations, wherein interactively displaying the graph comprises:
for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

41. A memory medium for creating a prototype that includes motion control, machine vision, and Data Acquisition (DAQ) functionality, the memory medium comprising program instructions executable to:
display a graphical user interface (GUI) that provides access to a set of operations, wherein the set of operations includes one or more motion control operations, one or more machine vision operations, and one or more DAQ operations;

create a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;

wherein the plurality of operations included in the sequence includes at least one motion control operation, at least one machine vision operation, and at least one DAQ operation, wherein at least one of the DAQ operations included in the sequence is operable to control a DAQ measurement device to acquire measurement data of a device under test;

wherein the program instructions are further executable to store information representing the sequence of operations in a data structure, wherein the sequence of operations comprises the prototype.

42. The memory medium of claim 41, wherein the program instructions are further executable to:

access the data structure to determine the plurality of operations in the sequence;

determine software routines to execute in order to perform the plurality of operations in the sequence; and execute the software routines.

43. The memory medium of claim 41, wherein the program instructions are further executable to:

receive user input specifying a first parameter value for a first operation in the sequence;

wherein said storing the information representing the sequence of operations in the data structure comprises storing the first parameter value in the data structure;

wherein the program instructions are further executable to execute software routines corresponding to operations in the sequence, wherein executing the software routines comprises executing a first software routine corresponding to the first operation, wherein said executing the first software routine comprises passing the first parameter value to the first software routine.

44. The memory medium of claim 41, wherein the information representing the sequence of operations in the data structure does not comprise program code.

45. The memory medium of claim 41, wherein the prototype is operable to:

control a motion control device to move the device under test;

analyze one or more acquired images of the device under test; and control the DAQ measurement device to acquire the measurement data of the device under test.

46. The memory medium of claim 41, wherein the program instructions are further executable to:

display a visual indication of results of performing the sequence while the sequence is being created, wherein the visual indication enables a user to evaluate the results of performing the sequence, wherein interactively displaying the visual indication comprises:

for each operation in at least a subset of the operations included in the sequence, updating the displayed visual indication in response to including the operation in the sequence in order to visually indicate a change in the results of performing the sequence, wherein the change is caused by including the operation in the sequence, wherein updating the displayed visual indication provides interactive visual feedback to the user indicating the change caused by including the operation in the sequence.

47. The memory medium of claim 41, wherein the plurality of operations included in the sequence includes a plurality of motion control operations;

wherein the program instructions are further executable to interactively display a graph illustrating a spatial trajectory cumulatively performed by the plurality of motion control operations, wherein interactively displaying the graph comprises:

for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

48. A system for creating a prototype that includes motion control, machine vision, and Data Acquisition (DAQ) functionality, the system comprising:

a processor;

a memory storing program instructions;

a display device;

wherein the processor is operable to execute the program instructions stored in the memory to:

display a graphical user interface (GUI) on the display device that provides GUI access to a set of operations, wherein the set of operations includes one or more motion control operations, one or more machine vision operations, and one or more DAQ operations;

create a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;

wherein the plurality of operations included in the sequence includes at least one motion control operation, at least one machine vision operation, and at least one DAQ operation, wherein at least one of the DAQ operations included in the sequence is operable to control a DAQ measurement device to acquire measurement data of a device under test based on an electrical signal from a sensor device coupled to the device under test;

wherein the processor is operable to further execute the program instructions stored in the memory to store information representing the sequence of operations in a data structure, wherein the sequence of operations comprises the prototype.

49. The system of claim 48, wherein the processor is operable to further execute the program instructions stored in the memory to:

display a visual indication of results of performing the sequence while the sequence is being created, wherein the visual indication enables a user to evaluate the results of performing the sequence, wherein interactively displaying the visual indication comprises:

for each operation in at least a subset of the operations included in the sequence, updating the displayed visual indication in response to including the operation in the sequence in order to visually indicate a change in the results of performing the sequence, wherein the change is caused by including the operation in the sequence, wherein updating the displayed visual indication provides interactive visual feedback to the user indicating the change caused by including the operation in the sequence.

50. The system of claim 48, wherein the plurality of operations included in the sequence includes a plurality of motion control operations;

wherein the processor is operable to further execute the program instructions stored in the memory to interactively display a graph illustrating a spatial trajectory cumulatively performed by the plurality of motion control operations, wherein interactively displaying the graph comprises:

for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

51. A system for creating a prototype that includes motion control, machine vision, and Data Acquisition (DAQ) functionality, the system comprising:

means for displaying a graphical user interface (GUI) that provides GUI access to a set of operations, wherein the set of operations includes one or more motion control operations, one or more machine vision operations, and one or more DAQ operations;

means for creating a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;

wherein the plurality of operations included in the sequence includes at least one motion control operation, at least one machine vision operation, and at least one DAQ operation, wherein at least one of the DAQ operations included in the sequence is operable to control a DAQ measurement device to acquire measurement data of a device under test;

wherein the system further comprises means for storing information representing the sequence of operations in a data structure, wherein the sequence of operations comprises the prototype.

52. A computer-implemented method for creating a prototype that includes motion control and machine vision functionality, the method comprising:

displaying a graphical user interface (GUI) that provides GUI access to a set of operations, wherein the set of operations includes one or more motion control operations and one or more machine vision operations;

creating a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;

wherein the plurality of operations included in the sequence includes at least one motion control operation and at least one machine vision operation;

wherein the method further comprises storing information representing the sequence of operations in a data structure, wherein the sequence of operations comprises the prototype.

53. The method of claim 52, further comprising:

accessing the data structure to determine the plurality of operations in the sequence;

determining software routines to execute in order to perform the plurality of operations in the sequence; and executing the software routines.

54. The method of claim 52, wherein the prototype is operable to perform one or more of:

control motion of a device;

acquire images; and analyze the acquired images.

55. The method of claim 52, wherein the prototype is operable to:

control motion of a device;

acquire images; and analyze the acquired images.

56. The method of claim 52, wherein the prototype is operable to:

control a motion control device to move an object; and control an image acquisition device to acquire one or more images of the object.

57. The method of claim 52, further comprising:

performing the sequence of operations;

wherein said performing the sequence of operations comprises executing software routines in order to perform each operation in the sequence.

58. The method of claim 52, further comprising:

automatically generating a graphical program based on the sequence of operations, wherein the graphical program is executable to perform the sequence of operations, wherein the graphical program comprises a plurality of interconnected nodes that visually indicate functionality of the graphical program, wherein automatically generating the graphical program comprises automatically including the plurality of interconnected nodes in the graphical program without user input specifying the nodes.

59. The method of claim 52, wherein the plurality of operations included in the sequence includes a plurality of motion control operations;

wherein the method further comprises interactively displaying a graph illustrating a spatial trajectory cumulatively performed by the plurality of motion control operations, wherein interactively displaying the graph comprises:
  for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

60. A computer-implemented method for creating a prototype that includes motion control and Data Acquisition (DAQ) functionality, the method comprising:
  displaying a graphical user interface (GUI) that provides GUI access to a set of operations, wherein the set of operations includes one or more motion control operations and one or more DAQ operations;
  creating a sequence of operations, wherein creating the sequence comprises including a plurality of operations in the sequence in response to user input selecting each operation in the plurality of operations from the GUI, wherein including the plurality of operations in the sequence in response to the user input selecting each operation in the plurality of operations from the GUI comprises including the plurality of operations in the sequence without receiving user input specifying program code for performing the plurality of operations;
  wherein the plurality of operations included in the sequence includes at least one motion control operation and at least one DAQ operation, wherein at least one of the DAQ operations included in the sequence is operable to control a DAQ measurement device to acquire measurement data of a device under test;
  wherein the method further comprises storing information representing the sequence of operations in a data structure, wherein the sequence of operations comprises the prototype.

61. The method of claim 60, further comprising:
  accessing the data structure to determine the plurality of operations in the sequence;
  determining software routines to execute in order to perform the plurality of operations in the sequence; and
  executing the software routines.

62. The method of claim 60,
  wherein the prototype is operable to:
    control a motion control device to move the device under test; and
    control the DAQ measurement device to acquire the measurement data of the device under test.

63. The method of claim 60, further comprising:
  performing the sequence of operations;
  wherein said performing the sequence of operations comprises executing software routines in order to perform each operation in the sequence.

64. The method of claim 60, further comprising:
  automatically generating a graphical program based on the sequence of operations, wherein the graphical program is executable to perform the specified sequence of operations, wherein the graphical program comprises a plurality of interconnected nodes that visually indicate functionality of the graphical program, wherein automatically generating the graphical program comprises automatically including the plurality of interconnected nodes in the graphical program without user input specifying the nodes.

65. The method of claim 60,
  wherein the plurality of operations included in the sequence includes a plurality of motion control operations;
  wherein the method further comprises interactively displaying a graph illustrating a spatial trajectory cumulatively performed by the plurality of motion control operations, wherein interactively displaying the graph comprises:
    for each motion control operation in the plurality of motion control operations included in the sequence, updating the graph in response to including the motion control operation in the sequence in order to visually indicate a change in the spatial trajectory, wherein the change in the spatial trajectory is caused by including the motion control operation in the sequence, wherein updating the graph provides interactive visual feedback to the user indicating the change caused by including the motion control operation in the sequence.

* * * * *